United States Patent [19]

Drori et al.

[11] Patent Number: 4,887,064
[45] Date of Patent: Dec. 12, 1989

[54] MULTI-FEATURED SECURITY SYSTEM WITH SELF-DIAGNOSTIC CAPABILITY

[75] Inventors: Ze'ev Drori, Chatsworth; Mansoor M. Amirpoor, Northridge, both of Calif.

[73] Assignee: Clifford Electronics, Inc., Chatsworth, Calif.

[21] Appl. No.: 138,828

[22] Filed: Dec. 28, 1987

[51] Int. Cl.$^4$ .............................................. B60R 25/00
[52] U.S. Cl. .................................... 340/426; 340/528; 340/825.31
[58] Field of Search ..................... 340/63, 64, 825.31, 340/825.32, 825.69, 513, 825.49, 524, 528, 654, 426, 430; 307/10 AT, 10.2

[56] References Cited

U.S. PATENT DOCUMENTS

| | | | |
|---|---|---|---|
| 3,588,891 | 6/1971 | Porter, Jr. | 340/513 |
| 3,691,396 | 9/1972 | Hinrichs | 340/64 X |
| 3,794,967 | 2/1974 | Fischer | 340/63 |
| 3,815,088 | 6/1974 | Kumpfbeck et al. | 340/63 |
| 3,858,175 | 12/1974 | Kopera, Jr. | 340/63 |
| 3,883,895 | 5/1975 | Fecteau | 340/224 |
| 4,141,009 | 2/1979 | Fowler | 340/63 X |
| 4,159,466 | 6/1979 | Mengel | 340/63 |
| 4,162,479 | 7/1979 | Nickell et al. | 340/63 |
| 4,174,516 | 11/1979 | Cleary | 340/63 |
| 4,314,232 | 2/1982 | Tsunoda | 340/52 F |
| 4,383,242 | 5/1983 | Sassover et al. | 340/64 |
| 4,506,253 | 3/1985 | Mande et al. | 340/513 X |
| 4,591,834 | 5/1986 | Kyle | 340/825.49 X |
| 4,663,626 | 5/1987 | Smith | 340/825.69 |
| 4,754,255 | 6/1988 | Sanders et al. | 340/64 |
| 4,794,368 | 12/1988 | Grossheim et al. | 340/63 |

OTHER PUBLICATIONS

"Car Intruder Alarm", *Practical Electronics*, vol. 15, No. 4, p. 22, Apr. 1979.
"Car Theft Alarm", *Practical Electronics*, vol. 17, No. 7, p. 9, Jul. 1981.

*Primary Examiner*—Joseph A. Orsino
*Assistant Examiner*—Brian R. Tumm
*Attorney, Agent, or Firm*—Roberts and Quiogue

[57] ABSTRACT

A multi-function security system for monitoring access to a protected area such as a vehicle. The system has a self-diagnostic capability for detecting defective sensor or trigger devices and bypassing such devices to allow the system to be armed. The system includes audible and visual message capability for providing an indication when the system is disarmed that an intrusion was attempted and identifying the particular intrusion point. Multiple levels of security are provided by programming the disarming event as either entry of a code via a remote transmitter or entry of the code via the transmitter and then entry of an authorization code manually via a key pad. Other features include a reset feature activating the alarm when power is removed and restored unless a predetermined switch is active, programmable door lock and unlock signals to adapt the system to a particular power door locking and unlocking system, programmability of the alarm siren code and duration, automatic activation of the vehicle courtesy light when the system is disarmed, selective disabling of the system audible indications of arming and disarming, and programmable sensor or trigger polarity.

67 Claims, 46 Drawing Sheets

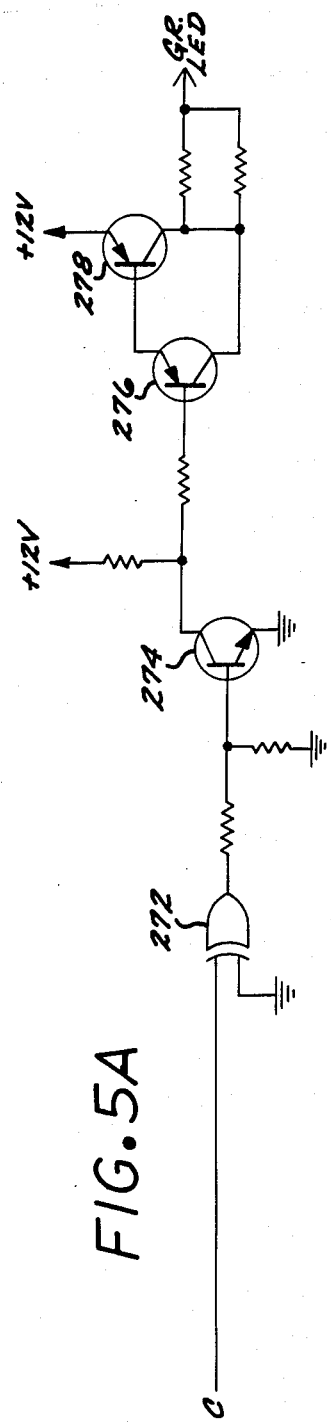
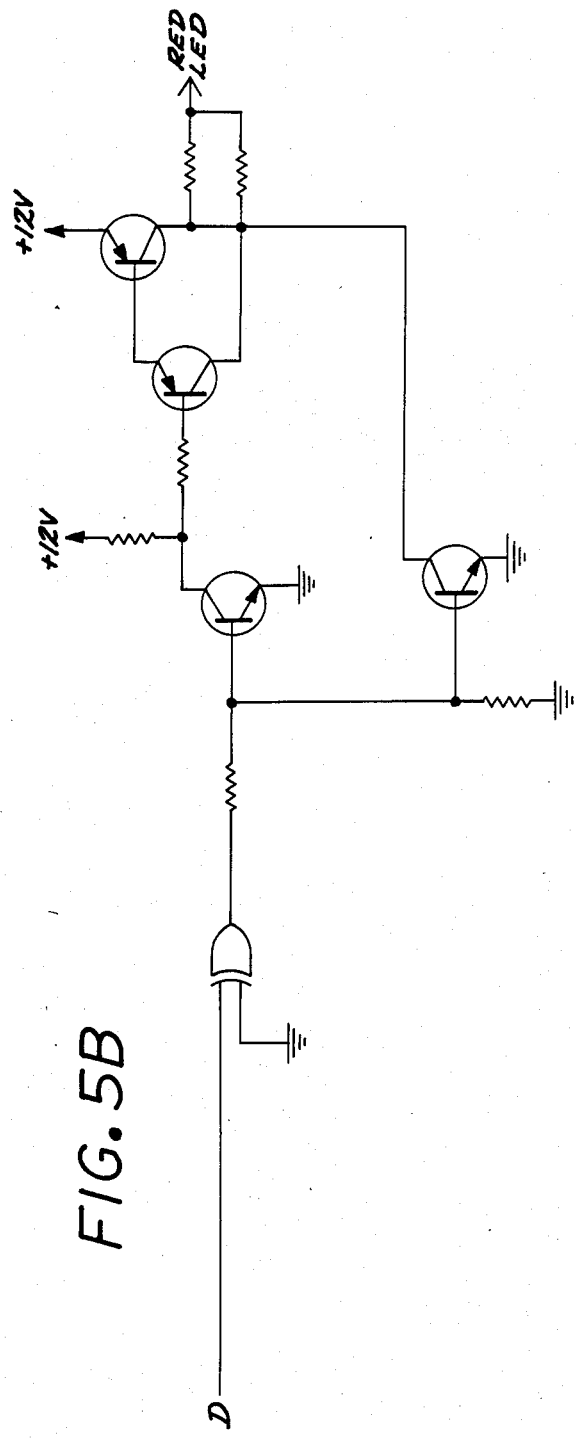
FIG. 5A
FIG. 5B

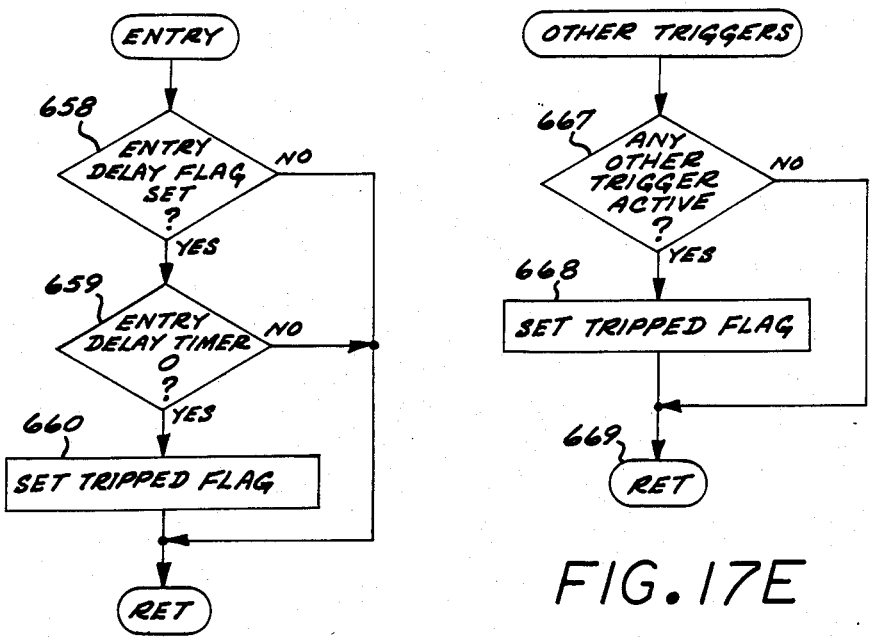
FIG.17C
FIG.17E
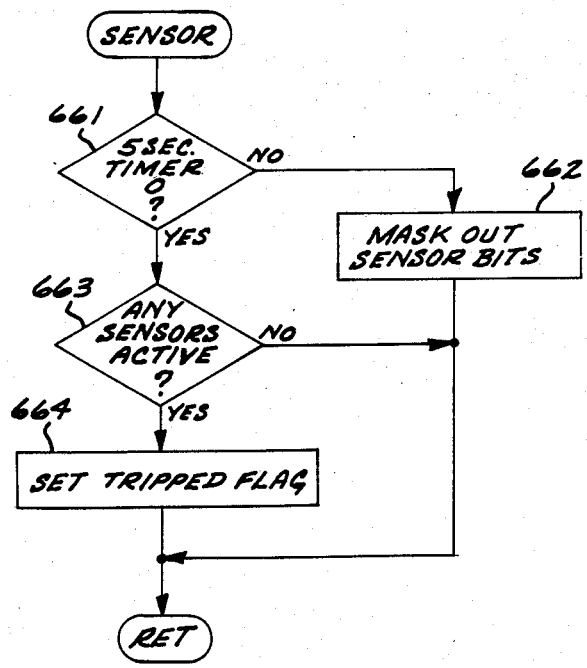
FIG.17D

MULTI-FEATURED SECURITY SYSTEM WITH SELF-DIAGNOSTIC CAPABILITY

BACKGROUND OF THE INVENTION

The present invention relates to the field of security systems for monitoring and controlling access to a secured or access restricted area, such as a vehicle of house, and more particularly to a multifunction system having the capability of self-diagnosing defective sensor and trigger devices and thereafter bypassing such defective equipment to allow the system to function.

Security systems are in wide use today to control and/or monitor access to secured or access-restricted areas. Such systems typically employ one or more sensors and/or trigger switches which are monitored or controlled by a central controller to sense intrusion or to allow controlled access. Examples of such systems include vehicle security systems and building security systems, which may be activated by either a remote switch or transmitter or by a key pad to enter a predetermined code. Entrance of the correct code typically arms or disarms the systems, opens or closes a door or the like.

The sensors and trigger typically detect attempts to intrude into the protected area, such as by way of a door or window, forcing a hood or trunk open, lifting or moving the vehicle or the like. The trigger devices may take the form of switches which are activated by the opening or closing of a door or window. The sensor may comprise a motion detector. To allow access through doors or other access point, devices which release or position locking elements, such as solenoid switches, are typically employed. Such sensors and trigger switches are prone to inevitable failure, particularly those elements positioned to monitor or control access to a heavily used door or access point. Such failure typically is manifested as an open circuit condition for a normally closed switch or sensor, or a closed circuit for a normally open switch or sensor.

Conventional security systems will not arm when a sensor indicates that a door or window is open, or when a sensor indicates that there is presently an intrusion into the protected area. As an example, a vehicle door left open will typically prevent the security system from being armed, or a window left open in a building will prevent the building security system from being armed. For the same reason, a defective sensor which indicates that a door is open irrespective of the position of the door, i.e., open or closed, will also prevent the security system from being armed. The result is that the vehicle or building owner is deprived completely of the benefit of the security system until the defective sensor is repaired.

Another disadvantage of conventional vehicle security systems is the fact that the audible alarm signals are typically generated by a horn or siren, and each particular system generates the same or similar alarm signals. Thus, when the vehicle is in a crowded parking lot or structure, and an alarm signal is generated, the vehicle's owner may not be able to determine whether it is his vehicle's system alarm or that of another vehicle. Further, many cities or other regulating authorities have enacted rules which restrict the maximum duration of vehicle alarm cycles to minimize noise pollution. However, such rules are not uniform, so that different maximum alarm cycle duration regulations are imposed in different parts of the country. The disparity in these regulations creates difficulties for the manufacturers of vehicle security systems who seek to distribute their products throughout the country or in other countries.

Intruders have developed certain techniques for defeating vehicle security systems. One such technique is to disconnect and reconnect the vehicle battery, seeking to disrupt power to the security system and cause the system to be reset to the disarmed mode when power is restored.

Conventional vehicle security systems are disarmed by the use of handheld transmitter encoded with the particular authorization code, by a key or by a code entered manually via a key pad. Thus, the level of security, i.e., the actions necessary to disarm the system are typically fixed. Yet there are situations in which a lower level or security, with increased convenience in the system disarming, may be acceptable, as where the car is parked in a low risk area.

One object of the present invention is to provide a security system having diagnostic capabilities for identifying defective sensor and access control elements and bypassing such defective elements to allow the system to continue to provide some measure of protection.

Another object of the present invention is to provide a security system which upon disarming provides audible signals indicating that an intrusion was attempted while the system was armed, and to provide a visual signal when the system is disarmed to identify the intrusion point.

Yet another object of the invention is to provide a security system which allows the user to program a desired alarm siren code and or to provide an audible alarm condition may be programmed by the user, so as to provide a personalized alarm signal uniquely identifying to the user that his security system is in an alarm condition, as in the case for a vehicle parked in a crowded lot or parking structure.

Another object of the invention is to provide a security system which provides audible signals indicating the arming or disarming of the system, and which signals may be selectively disabled by the user.

Still another object of the invention is to provide a security system which provides a plurality of possible security levels, in that the user may programmably select a first disarming mode wherein the system may be disarmed simply by the use a remote handheld transmitter for transmitting a user authorization code, or a second disarming mode wherein the system is disarmed by the combination of the entry of an appropriate remote transmitter code and the subsequent manual entry of an appropriate key pad code.

Other objects of the invention include the provision of a security system which interprets the removal and restoration of system power as an unauthorized intrusion event unless a predetermined switch, such as the vehicle ignition switch, is activated when power is restored.

Still further objects of the invention are to provide a multifunction programmable security system which provides power door locking and unlocking signals to lock the doors upon system arming and to unlock the doors upon system disarming, and wherein the duration of said signals is selectively variable to adapt to door lock systems of different manufacturers; and wherein the system automatically activates the vehicle interior courtesy or dome light upon system disarming for a predetermined time interval or until the ignition is turned on.

Other objects of the invention are to provide a multi-function vehicle security system which is programmably adaptable to trigger or sensor devices of either positive or negative polarity.

SUMMARY OF THE INVENTION

A security system is disclosed for monitoring and controlling access to a protected area, such as a vehicle. The system includes a plurality of sensor devices, each for sensing an intrusion event and providing a sensor activated signal when the event is detected. Such sensors may take the form of motion detectors, sound discriminators or switches activated by the opening or closing of a door or window, or the like.

The system further comprises means for communicating alert signals, such as for example, a siren, horn, autodialer for initiation of telephone calls or the like.

A system controller is provided to control the operation of the security system so that the system may be operated in an armed mode or in a disarmed mode. When in the armed mode the controller monitors the sensors and causes the communicating device to issue an alert signal in response to a sensor activated signal.

The system includes a self-diagnostic capability for detecting defective sensor devices and then bypassing such defective devices automatically or upon command to allow the system to be placed in the armed mode and still provide protection. In the disclosed system, the controller includes means for monitoring the states of the sensor devices, and means responsive to a system arming signal when the system is in the disarmed mode for identifying any sensor providing a sensor activated signal. The system further comprises means for bypassing the identified sensor devices, and placing the system in the armed mode wherein the state of the bypassed sensor devices does not prevent the system from being armed and the bypassed sensor devices will not cause activation of the alert communicating device.

The system further comprises means for communicating to the system user a message indicating that a sensor is defective, and further specifying the particular defective sensor. This may take the form of an audio transducer for producing a particular audio tone or tones indicative of the defective sensor condition, such as siren chirps, and an LED for generating an optical light flash sequence for identifying the defective sensor, e.g., three light flashes indicates a failed door trigger switch, or a spoken language message generated by a voice synthesizer which specifies the defective device.

The system further comprises means for warning the system user, upon receipt of a system disarm signal, of an attempted intrusion during the armed mode, and for identifying the intrusion point. The warning means may comprise a voice message generated by a voice synthesizer or an audio transducer for providing a predetermined audio sound sequence indicative of an intrusion attempt, e.g., three chirps. The identifying means may take the form of an LED for signaling by a flash code the intrusion point. This feature provides the user with a warning that an intrusion attempt has been made, which when triggered by a remote disarming signal allows the user the opportunity to take precautions prior to entering or approaching his vehicle.

The system is interactive, allowing the capability of user programmability of the particular alarm alert signal, to personalize the siren sound sequence. The advantage of this feature is that the audio alert signal will remotely indicate to a user whether the alarm being sounded is from his vehicle, or from another vehicle, even if the vehicle is not within the owner's line of sight, as where the vehicle is parked in a crowded parking lot or parking structure.

Another feature of the invention is the means for automatically communicating an alert when the power to the system, after having been cutoff, is restored, unless the user has provided to the system a particular disarming signal, such as turning the vehicle ignition switch on prior to reconnecting power to the system. This prevents a thief from disconnecting and reconnecting power to defeat the security system.

Another feature of the invention is the provision of a user-selectable level of security, wherein the user selects whether the system may be disarmed by use of a remote transmitter alone, or in combination with a code subsequently manually entered via a keypad.

Other features of the invention include user programmability of the alarm signal duration, selective enabling or disabling of audible signals confirming the arming or disarming of the system, programmable means for providing door locking and unlocking signals of selectable duration to eliminate the need for adaptor devices for interacting with different door lock systems, selective disabling of the audible signals indicating that the system is being armed or disarmed, automatic activation of the vehicle interior courtesy light for a predetermined time interval or until the vehicle ignition is activated, and programmable sensor polarity.

BRIEF DESCRIPTION OF THE DRAWINGS

These and other features and advantages of the present invention will become more apparent from the following detailed description of exemplary embodiments thereof, as illustrated in the accompanying drawings, in which:

FIGS. 5A and 5B are schematic diagrams of LED driver circuits employed with the controller of FIG. 3.

DETAILED DESCRIPTION OF THE DISCLOSURE

Figure 1:
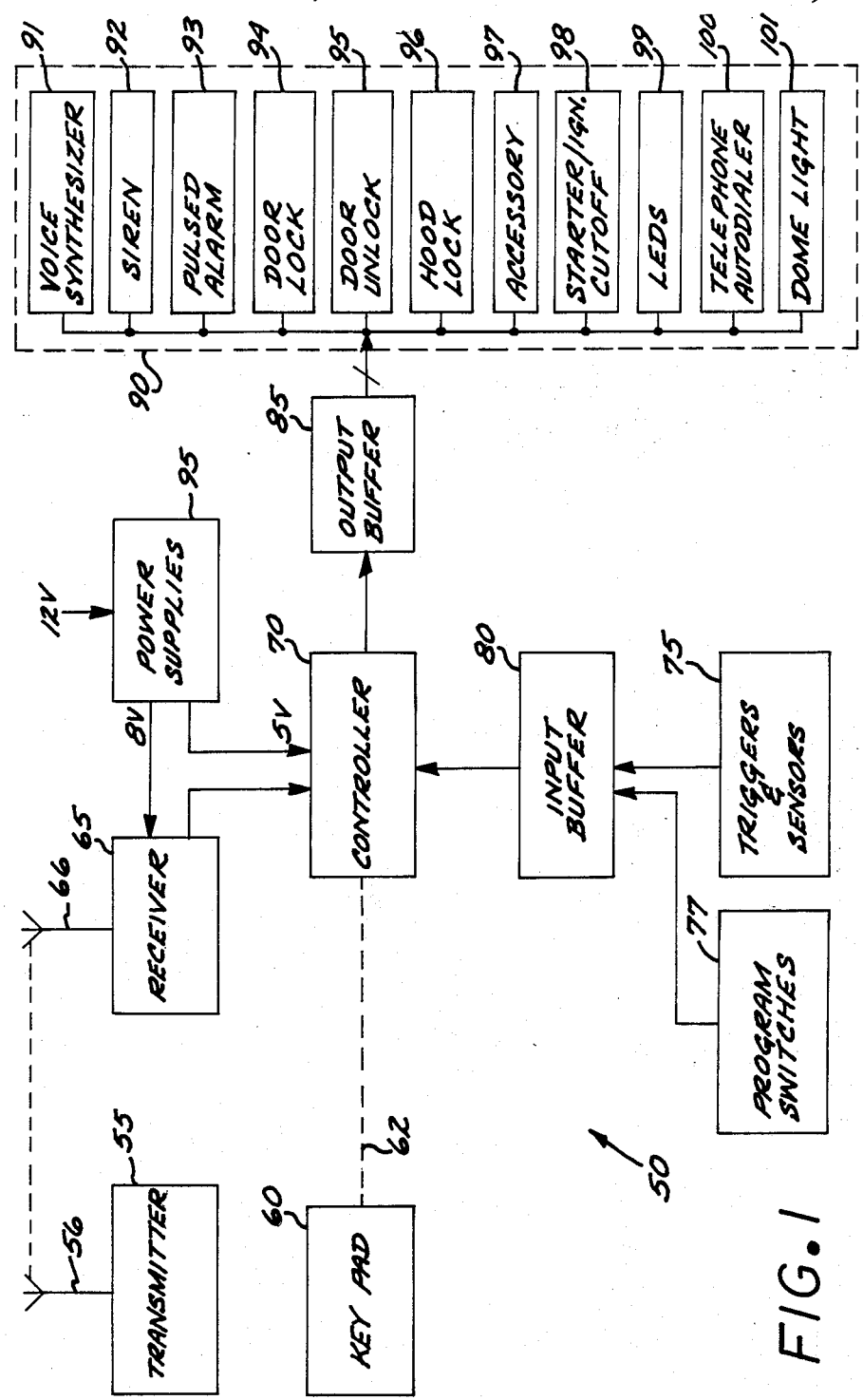
FIG. 1 is a simplified block diagram of a security system employing the present invention.

A simplified block diagram of the principal structural elements of a system embodying the invention is set forth in FIG. 1. The system includes a means for permitting the user to communicate with the system controller 70. This communicating means may take the form, in the conventional manner, of a transmitter device 55 for transmitting an encoded signal via an antenna 56. The transmitted signal is received by receiver 65 via antenna 66, and the received signal is provided in some form to the system controller 70. Additionally, or alternatively, the user communicating means may take the form of a key pad 60, which is coupled directly to the controller 70 by cable 62. The keypad 60 may comprise a plurality of digit keys 1–9, as well as additional keys or switches employed for various functions such as an "armed" switch for signaling the system to enter the armed mode. Additionally, or alternatively, the user communicating means may take the form of one or more program switches 77 manually manipulated by the user including a "valet" switch. With any one of the transmitter 55, which may be used remotely, the key pad 60, or the program switches 77, the user may input to the controller a predetermined coded message to cause the controller to initiate some action, e.g., arming or disarming the security system, sounding an alert, entering the programming mode, or the like. One type of coded message typically takes the form of a predetermined sequence of binary-valued signals, which collectively define a digital user authorization code, e.g., a predetermined N-bit word.

Power supplies 95 provide electrical power to the receiver 65 and the controller 70. In the case of a security system mounted in a vehicle, the power supplies receive the primary source of power from the vehicle battery, typically 12 volts, and convert that available power source into voltage levels required by the system, here regulated +5 volts and +8 volts.

The system triggers and sensors 75 are coupled to the system controller 70 through input buffer circuitry 80. In the case of a security system installed in a vehicle, the sensor elements may be motion sensors, door or hood position sensors, ignition switch sensors and the like. The triggers may be switches activated by a particular event such as opening or closing a door. The term "sensors" is used in a general sense in the accompanying claims to include both sensor devices and trigger devices described above.

The system 50 further employs a plurality of controlled devices, indicated generally in FIG. 1 as elements 90, which are coupled to the system controller by output buffer circuitry 85. In the case of a vehicle security system, the controlled devices may include one or more of the controlled devices 90 shown in FIG. 1, i.e., the voice synthesizer 91, siren 92, pulsed alarm 93, (hooked to parking light and/or air horns) door lock device 94, door unlock device 95, hood lock device 96, accessory 97, starter or ignition cutoff apparatus 98, LEDs 99, telephone autodialer 100, and the vehicle interior courtesy or dome light 101.

The transmitter 55 in a preferred form provides a pulse-width-modulated RF signal, wherein an RF carrier at some predetermined RF frequency is modulated by information from an internal encoder unit. As is well known in the art, the transmitter may be actuated by depressing a switch, thereby generating a transmit signal encoded with information such as a multi-bit code. The specific code may be determined by the status of switches or the like comprising the encoder. The width of each pulse determines its status as a digital "1" or "0." The particular circuit arrangement comprising the transmitter 55 per se forms no part of the invention, and is not described herein in further detail. An exemplary circuit arrangement is described in the co-pending application entitled "Electronically Programmable Remote Control Access Systems" by Ze'ev Drori, Ser. No. 094,395, the contents of which are incorporated herein by this reference.

Figure 2:
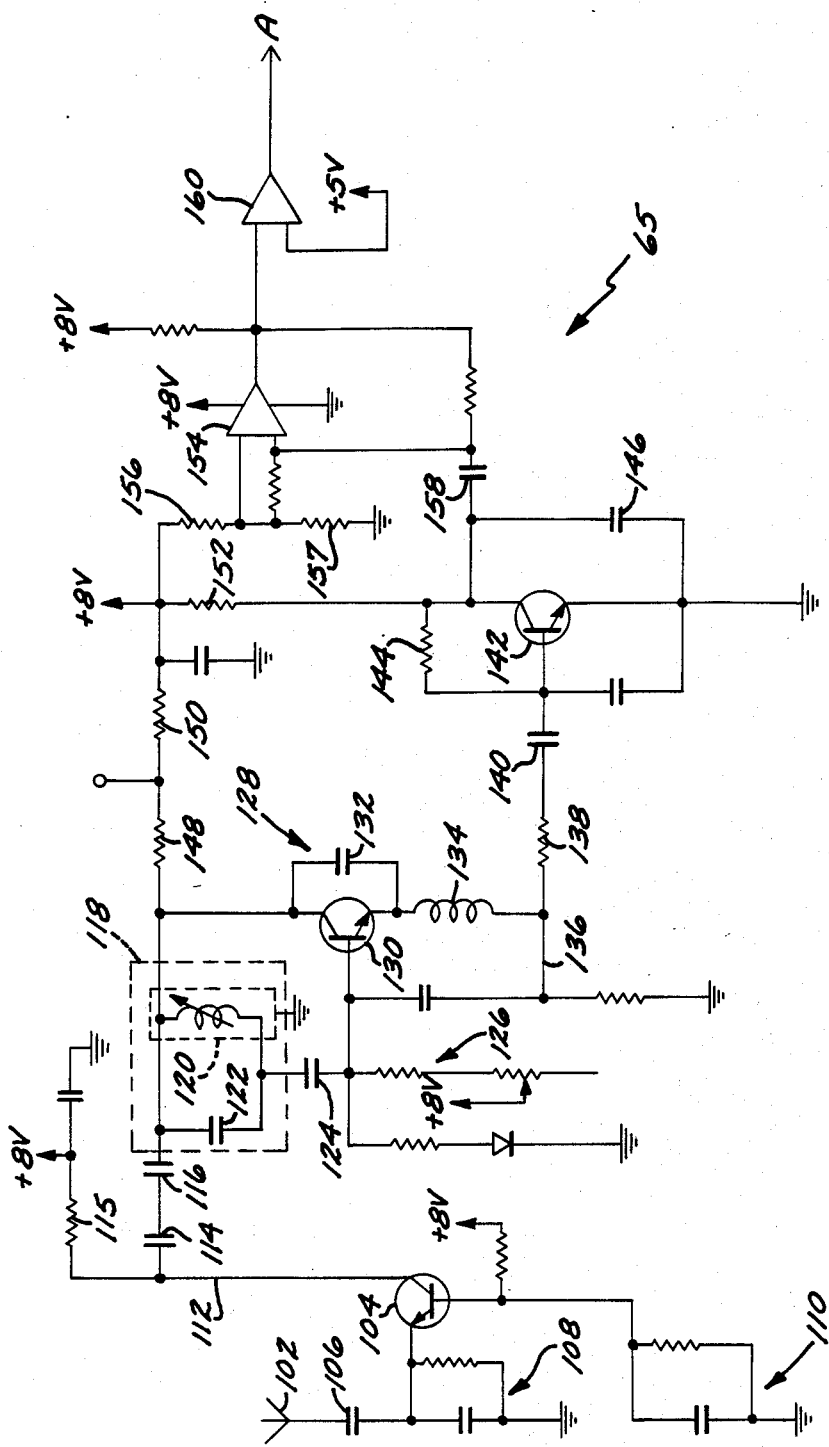
FIG. 2 is a schematic diagram of the receiver circuit of the security system depicted in FIG. 1.

The receiver 65 is more fully illustrated in FIG. 2 and generally comprises an antenna 102 for receiving the transmitted signals, which are coupled by capacitor 106 to an NPN transistor 104 which matches the impedance of the antenna 102, and operates as a radio frequency preamplifier. A resistor-capacitor network 108 is connected to the emitter of the transistor 104. A second resistor-capacitor network 110 is connected to the base of the transistor 104.

The collector of the transistor 104 is coupled via the conductor 112 to coupling capacitor 114. An 8-volt power source from power supplies 95 is connected to the collector of the transistor 104 through a resistor 115 which isolates the transistor 104 from the power supply and from the load.

Tank circuit 118 comprises a variable inductive device 120 for adjusting the receiver regenerative frequency. A capacitor 122 couples one end of the inductive device 120 to the conductor 112. The same end of the inductive device 120 is also coupled through capacitor 124 to a variable resistor 126, also connected to the 8-volt power source.

The conductor 112 is also connected to a local oscillator 128 which includes a transistor 130 having a capacitor 132 connected across its collector and emitter. The base of the transistor 130 is connected to the voltage source through the resistor 126. The emitter of the transistor 130 is connected to inductor 134. This arrangement of the local oscillator including the transistor 130, the capacitor 132 and the inductor 134 is designed to detect the pulses included in the received signal.

The inductor 134 is connected to conductor 136 which carries the detected signal. The detected signal pulses are passed through a resistor 138 and a capacitor 140 and to a signal amplifier 142 in the form of an NPN transistor. Another resistor 144 is connected across the collector and the base of the transistor 142, whose emitter is grounded and is also connected to a coupling capacitor 146.

The collector of the transistor 130 is connected to a pair of load resistors 148 and 150. The 8-volt power supply is connected through a load resistor 152 to the collector of the transistor 142. The reference voltage applied to the comparator 154 is developed by the voltage divider circuit comprising resistors 156 and 157. The comparator 154 receives a signal for comparison from the collector of the transistor 142 through a coupling capacitor 158. When the inputs to the comparator 154 compare, an output is generated and inverted by an inverter 160.

Figure 3:
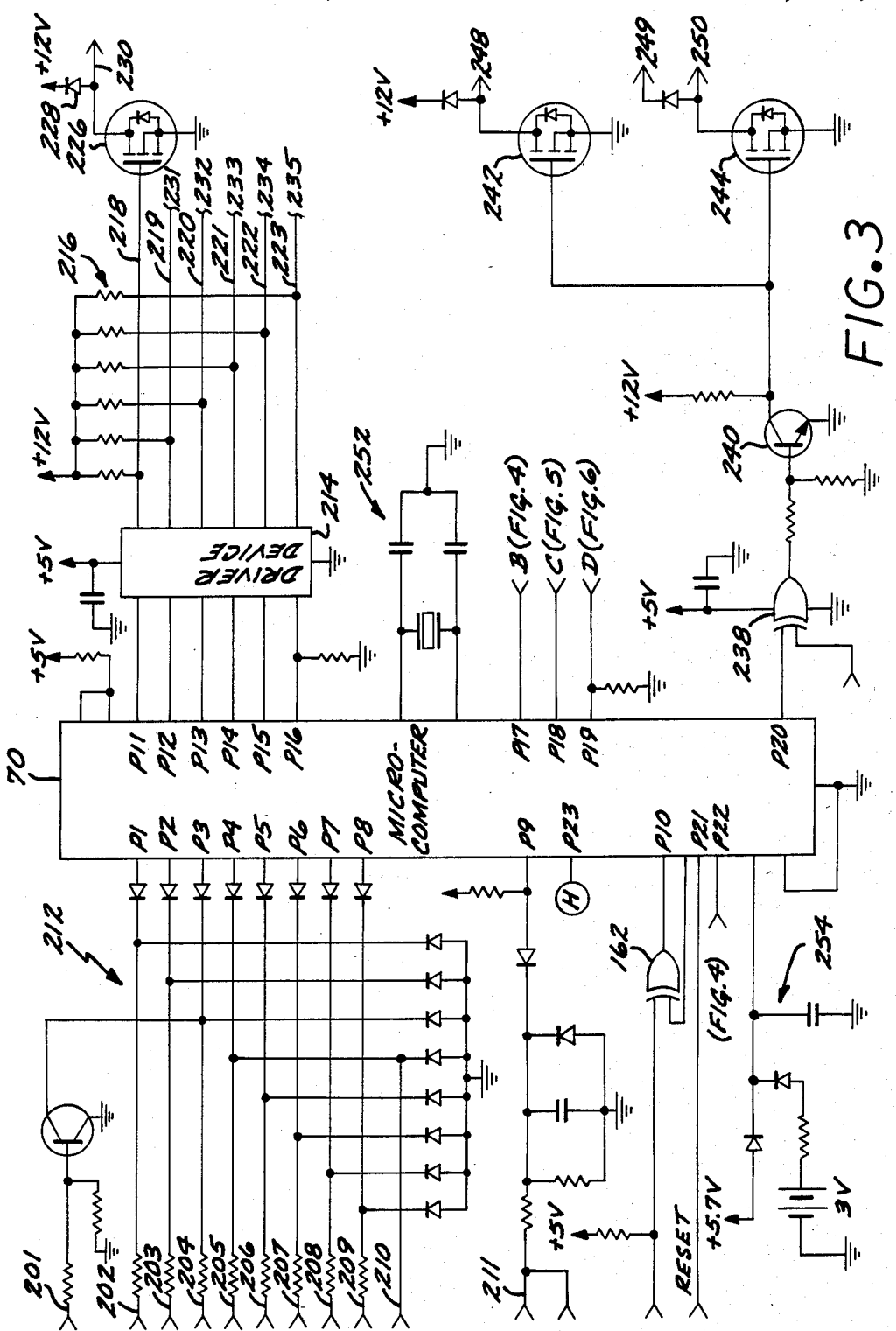
FIG. 3 is a schematic block diagram of the controller and input and output buffers of the security system of FIG. 1.

The output of the inverter 160 is then introduced into the controller 70, as is more fully illustrated in FIG. 3. In this case, the output from the receiver 65 is introduced into an exclusive OR gate 162 (acting as a programmable inverter) which has an output to the controller 70. The controller 70 comprises a microcomputer, with some internal RAM and nonvolatile memory capacity, such as the NEC 80C49H microcomputer.

The plurality of sensors and triggers 75 (FIG. 1) are coupled to the controller 70 by a buffer circuit 80 comprising the diode network 212 shown in FIG. 3. The trigger and sensor 75 are connected to nodes 201-210 which connect to the network 212 and to node 210. By way of example only, a positive trigger device may be connected to node 201, first and second sensor devices to nodes 202 and 203, a negative trigger at node 204, an "immediate" trigger device at node 205, a hood position sensor at node 206, an automatic arming disable switch at node 207, program switches 77 (the "valet" and "hood" switches) at nodes 208 and 209, a normally closed trigger at node 210, and an ignition switch "on" or "off" sensor at node 211. The pins P1-P8 are monitored by the microcomputer 70, enabling the microcomputer to monitor the states of the trigger and sensor devices, thereby monitoring the protected areas of the vehicle.

The particular triggers, sensors and switches are described by way of example for a vehicle security system implementation. Positive and negative triggers are provided so that the system may be employed with either a positive or negative polarity door trigger switch. The "immediate" trigger device is typically connected to the vehicle trunk or back door, for generating an immediate alarm when the trigger is activated. The hood position sensor provides a signal indicative of the position of the hood, i.e., closed or not closed. The normally closed trigger coupled to node 270 is a trigger device that is normally grounded, and is activated when the trigger is no longer grounded. Such a trigger is normally connected to the vehicle radio, to signal when the radio has been removed.

Significantly, the sensors and triggers 75 and program switches 77 are coupled to the controller 70 in such a way as to allow the controller to monitor the individual status of each device. This is an important element in implementing the self-diagnostic feature of the invention.

Pin P10 of the microcomputer 70 is also monitored to receive information from the receive 65.

Pins P11-P20 of the microcomputer 70 are employed as output pins to control the various controlled devices 90 employed with the system. The output buffer circuitry 85 comprises hex driver device 214, for example, a type 76C906 device, and pullup resister network 216 connected to output lines 218-223, which are in turn connected to a corresponding plurality of power TMOS transistor devices, one of which is indicated as device 226. The output of the power transistor 226 is diode-coupled to a 12 v power source and is connected to a controlled device at node 230. Thus, the driver circuit 214, network 216, power transistor 226 and diode connection to the power source serves as part of the output buffer circuit 85 to enable the low level microcomputer output signals to drive a controlled device such as, for example, a siren, pulsed alarm, door lock, door unlock, a hood lock, and the like which require substantial power to operate, e.g., by actuating relays. Nodes 231-235 are connected to similar power transistor devices, which for the sake of clarity are not shown. These nodes are also used to control various controlled devices.

For this example of the invention, line 218 controls the siren device 92, line 219 the pulsed alarm 93, line 220 the door lock device 94, line 221 the door unlock device 95, line 222 the hood lock device 96 and line 223 an accessory device 97, the dome light 101, or the autodialer 100.

Another output pin P20 of microcomputer 70 is coupled to an inverter circuit 238 whose output is connected to driver transistor 240. The collector of transistor 240 drives power transistors 242 and 244 to provide additional control nodes 248-250 to control various controlled devices, such as the starter/ignition cutoff device 98, accessory 97 and the like.

Figure 4:
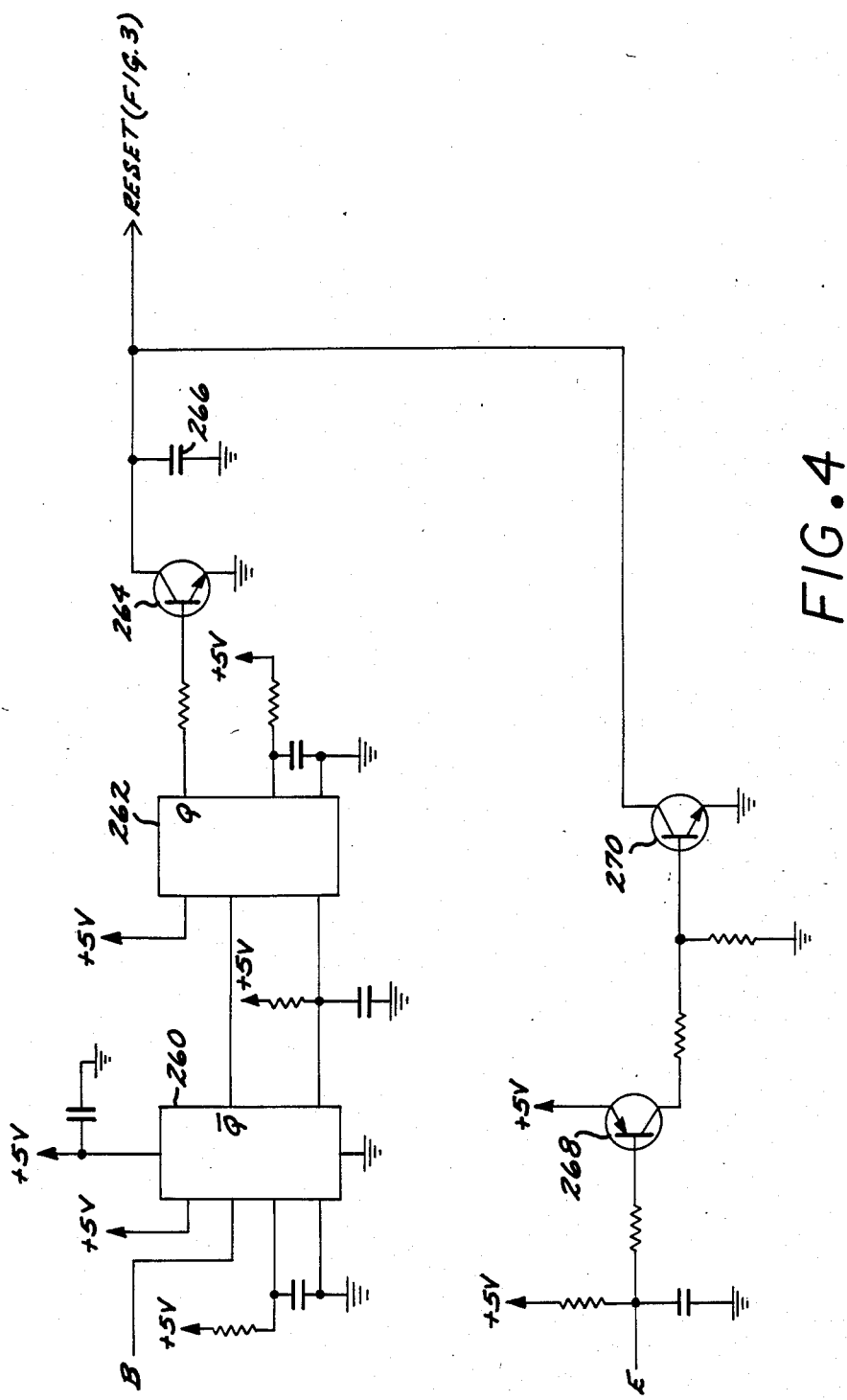
FIG. 4 is a schematic diagram of a reset signal generating circuit, employed with the controller of FIG. 3.

Output pins P17-P19 are connected respectively to the circuit shown in FIG. 4 and the LED driver circuits of FIGS. 5A and 5B.

An oscillator circuit 252 provides a stable oscillator frequency signal to the microcomputer for use as the device clock. The microcomputer 70 receives +5 volt power from battery circuit 254 and from power supplies 95.

The microcomputer 70 receives a reset signal on pin P21 from a reset signal generating circuit shown in FIG. 4. The reset signal generating circuit comprises a retriggerable one-shot CD4538 device 260 triggered by pin P17 of the microcomputer 70, which periodically (e.g., every 10 milliseconds) provides a pulse to one-shot device 260. The $\bar{Q}$ output of device 260 serves as the trigger to one-shot CD4538 device 262, whose Q output drives transistor 264. The collector of transistor 264 is coupled to ground through capacitor 266, with the reset signal being developed across the capacitor 266. In the event that the periodic pulses from the controller pin P17 are interrupted, the Q output of device 262 will go "high," turning on transistor 264 and generating a reset pulse. The signal "E" coupled to the base of transistor 268 is generated by the voltage supply 95, as will be described with respect to FIG. 6. The signal "E" goes active in the event the regulated 5-volt supply is not available from the supply 95, indicating that the vehicle power has been removed, or the vehicle battery voltage has been drained. The emitter of transistor 268 is coupled to the base of transistor 270, to provide a means for generating a reset pulse when the 5-volt supply (95) is no longer available.

Thus, the reset or "watchdog" circuit of FIG. 4 will generate a reset pulse when the controller pulses (pin P17) are no longer provided, or when power is removed or impaired.

FIGS. 5A and 5B illustrate respective driver circuits for the green and red LED devices 99 which are employed in the disclosed embodiment to provide a means for visually communicating with the user of the system. Pin P18 of the microcomputer 70 controls the green LED driver circuit of FIG. 5A and pin P19 controls the red LED driver of FIG. 5B. The green LED driver circuit comprises an inverter device 272, NPN transistor 274, PNP transistors 276 and 278 connected in the manner shown in FIG. 5A. The operation of the driver circuit of FIG. 5A as well as that of FIG. 5B will be readily understood by those skilled in the art. In the case of the security system installed in a vehicle, the LEDs 99 may be mounted on the vehicle instrument panel or dashboard.

Figure 6:
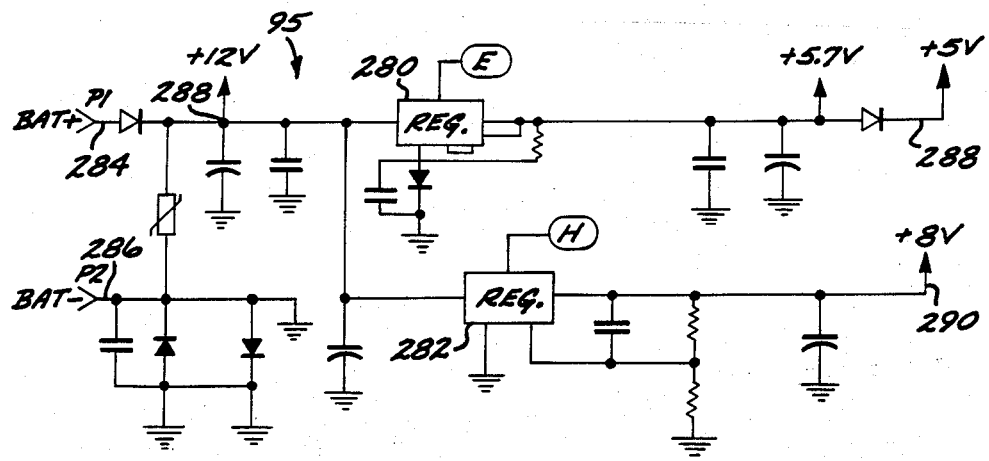
FIG. 6 is a circuit schematic illustrating an embodiment of the power supplies employed in the system of FIG. 1.
Figure 7:
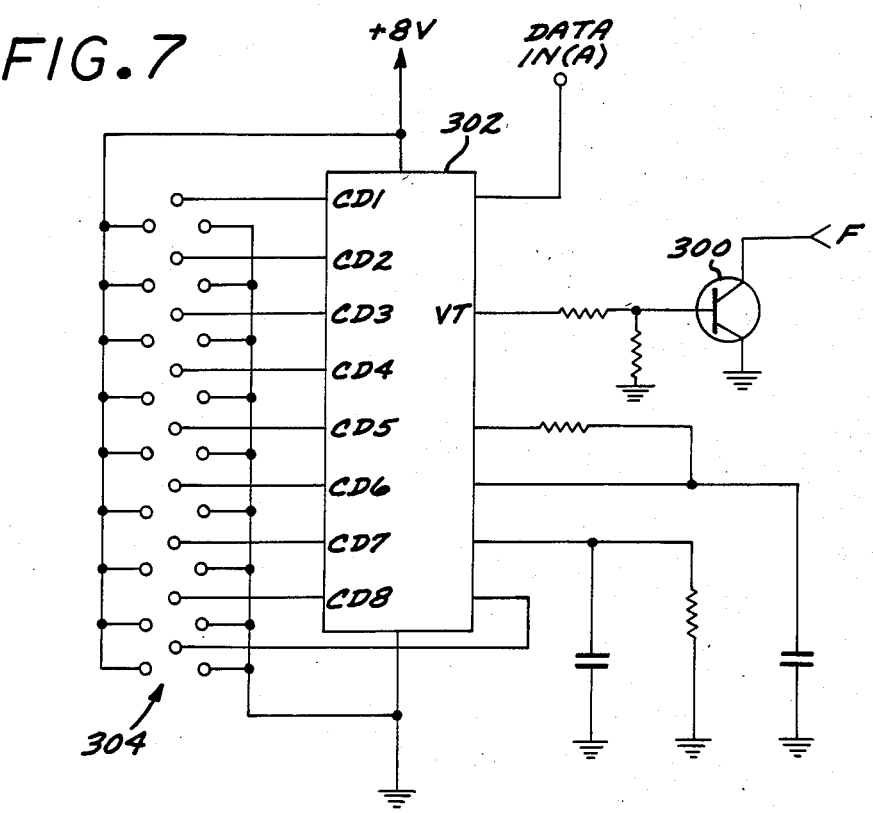
FIG. 7 is a schematic diagram of a receiver decoder circuit employed in an alternate embodiment of the security system of FIG. 1.

Referring now of FIG. 6, the circuitry for the power supplies 95 is shown. The circuitry develops regulated 5 and 8 volt sources, employing a pair of type LP2951 regulator devices 280 and 282. Nodes P1 and P2 are connected to the positive and negative terminals of the vehicle 12-volt battery, respectively. The positive terminal is a diode coupled to pin 8 of each of the regulator devices 280 and 282. As will be apparent to those skilled in the art, regulator device 280 is appropriately configured to provide a regulated +5 volt supply level at node 288, and device 282 is appropriately configured to provide a regulated +8 volt supply level at node 290. The devices 280 and 282 each provide error outputs at respective nodes "E" and "H," which are active when the +5 volt or +8 volt supply is not available, within some predetermined margin, e.g., ±5% of +5 volts or +8 volts. Node H, the error signal for the regulator 282 for the +8 volt supply, is coupled to pin P23 of the controller 70. By monitoring the state of the regulator error signal at pin P23, the controller determines when the +8 volt supply is no longer available. In such case, the controller will disable operation, as will be described more fully hereinafter with respect to the "battery check" function of the system.

In the embodiment of the receiver and controller set forth in FIGS. 2-6, the user's authorization code is entered via a remote transmitter 55. In an alternate embodiment, the user's authorization code may also be entered manually by the user via a key pad 60, which in the case of an automobile security system is typically mounted inside the vehicle in a location accessible to the vehicle driver. Thus, the system may comprise a remote transmitter 56 and a receiver 65, but also comprises the key pad 60 for allowing code and other information to be entered manually by the user into the controller 70. Such an alternate embodiment is illustrated in FIGS. 7-10.

The receiver employed with the alternate system may be identical to the receiver described with respect to FIG. 2, but may further comprise an external decoder circuit for comparing the received signal with the stored authorized code to determine whether the received signal matches the stored code. Thus, in FIG. 7, the received data from the receiver (FIG. 2) is provided to the type MC14502A device 302 which acts as a decoder, comparing the received data bits with the stored data bits defined at pins CD1-CD9 by the connections made between the node network 304. The connections are typically all made on the circuit board, and then personalized to provide a unique user code by scratching away the appropriate traces. If the input data bit sequence matches the stored code sequence, then node VT of the correlator device 302 is activated, turning on buffer transistor 300, whose collector output is in turn coupled to the microcomputer 304 (FIGS. 8A and 8B) which comprises the controller in this embodiment.

Figure 8A:
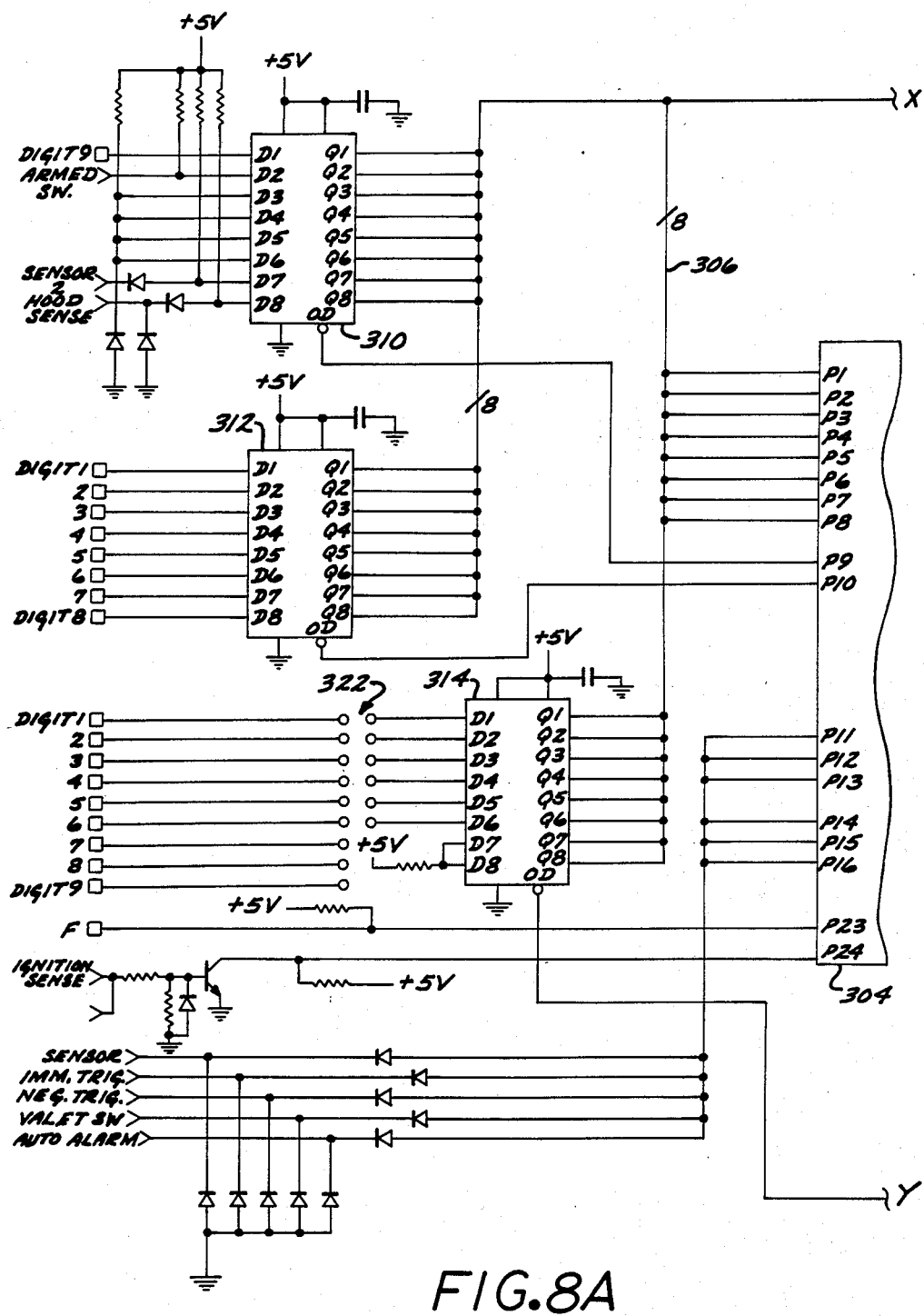
FIGS. 8A and 8B are schematic diagrams of a controller and peripheral input/output elements employed in the alternate embodiment of the security system of FIG. 1.
Figure 8B:
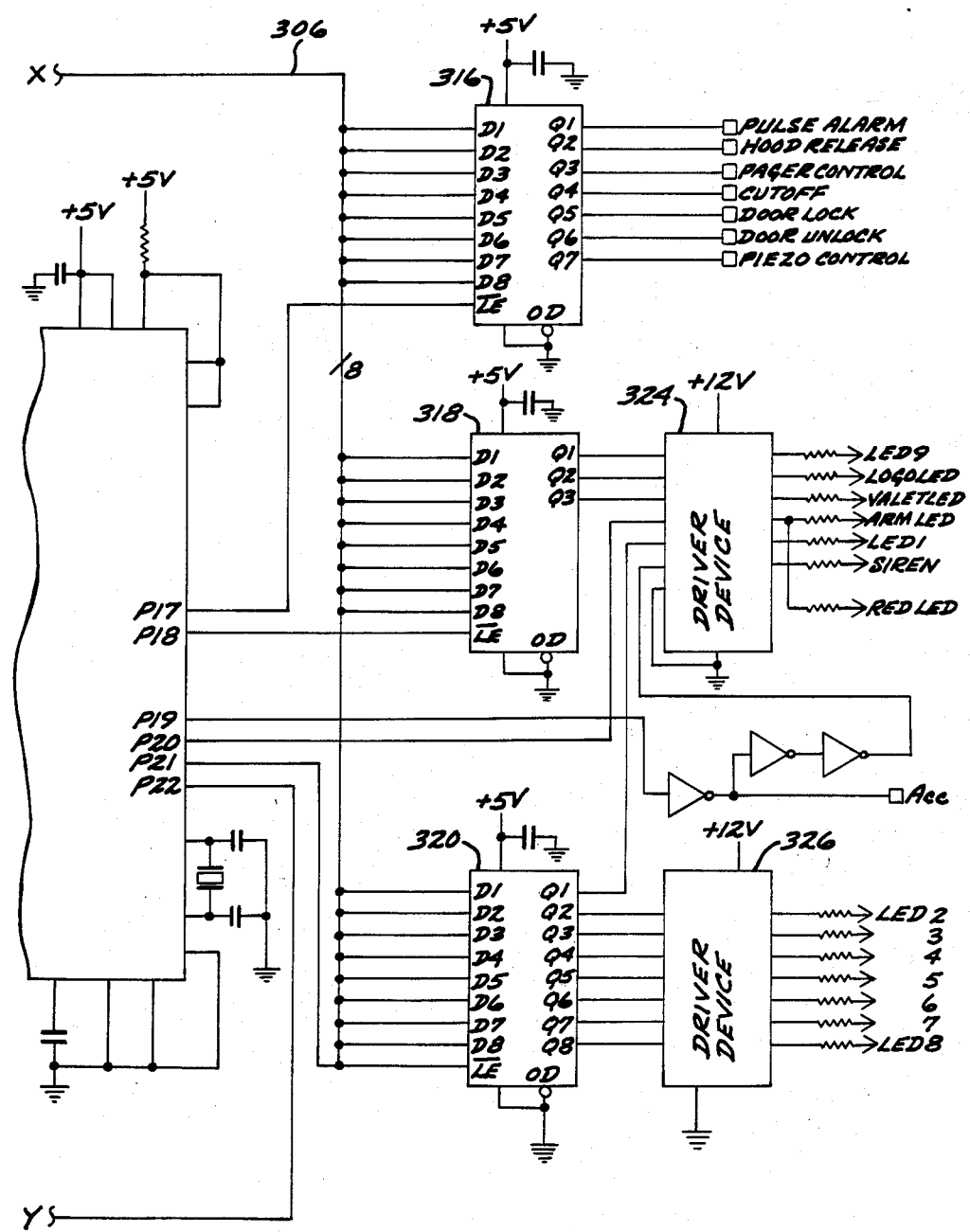

Referring now to FIGS. 8A and 8B, the controller and buffer circuitry for the alternate embodiment is disclosed. Here, a plurality of peripheral devices are arranged in a common bus arrangement to communicate with the microcomputer 304. Each of devices 310, 312, 314, 316, 318 and 320 are type 74HC373 devices having eight pins coupled to the 8-bit data bus 306 which is in turn connected to pins P1-P8 of the microcomputer 304. The output disable pin OD of device 310 is controlled by pin P9 of the microcomputer 304, the OD pin of the device 312 is controlled by pin P10, and the OD pin of the device 314 is controlled by pin P22. Similarly, the latch enable pins LE of devices 316, 318 and 320 are controlled respectively by pins P17, P18 and P22 of the microcomputer 304. Thus, only one of the six peripheral devices will be enabled by the microcomputer at any given time, so that the input/output pins P1-P8 of the microcomputer will be receiving data from one of devices 310, 312, or 314, or writing data to one of the devices 316, 318 or 320 via the data bus 306 at any given time.

The data input D1 of device 310 is coupled to the digit 9 signal associated with the key pad 60. Pin D2 is coupled to the "armed" switch on the keypad 60. Data input pins D3-D6 are pulled up to 5 volts. Pin D7 is coupled to the sensor "2" of the system. Pin D8 of device 310 is coupled to the hood sensor of the system. Thus, the states of these various switches and sensors may be read by the microcomputer by enabling the outputs of the device 310.

The data input pins D1-D8 of device 312 are coupled to the digit 1-8 signals associated with the key pad 60.

Six selected ones of the digit 1-9 signals are coupled to the data input pins D1-D6 of device 314 by wire wrap connection network 322. This allows a unique user code to be hardwired into the controller at the factory in dependence on the particular ones and sequence of the selected digits of the key pad.

The output from the external decoder (FIG. 7) is coupled to pin P23 of the microcomputer. The ignition sensor is coupled to pin P24.

A plurality of other sensors, switches and triggers are coupled to pins P11-16 of the microcomputer 304, including the ignition sensor, sensor 1, the "immediate" trigger, the negative trigger, the key pad program or "valet" switch and the key pad automatic alarm switch. The microcomputer 304 reads the states of these devices by interrogating pins P11-16.

As with the embodiment of FIGS. 2-6, the controller 304 is coupled to the sensors and triggers in such a way as to individually determine the status of the sensors and triggers, to implement the self-diagnostic feature as will be described in more detail hereinbelow.

The data on the 8-bit data bus 306 will be latched into the output pin latches of device 316 when the latch enable pin of the device is activated by the microcomputer. This provides the control signals for controlling certain of the controlled devices, including a pulsed alarm, hood release, pager control, ignition cutoff, door lock, door unlock and piezoelectric (buzzer) control. These control signals are coupled to a driver circuit (FIG. 9) to develop the appropriate voltage signals for controlling relays or driving the particular controlled element.

The data on the 8-bit data bus 306 will be latched into the output pin latches of device 318 when the latch enable pin of the device is activated by the microcomputer. This provides the control signals at pins Q1-Q3 which are converted by the hex driver device 324 into drive signals for driving the various key pad LEDs as illustrated in FIG. 8B. (In this embodiment, each digit key of the key pad has associated therewith a corresponding LED.) Pin 20 is also coupled to the hex driver device 324 to provide the drive signal for activating the "arm" switch or key LED on the key pad. The Q1 output of device 320 is also coupled to the driver device 324 to provide the drive signal for the LED 1 on the key pad. Pin P19 of the microcomputer is coupled through an inverter chain to the hex driver device 324 to provide the signal controlling the system siren.

The data on the 8-bit data bus 306 will be latched into the output pin latches of device 320 when the latch enable pin of the device is activated by the microcomputer. This provides the control signals at pins Q1-Q8.

The signals at pins Q2–Q8 are coupled to the hex driver device 326 to provide the drive signals for the key pad LEDs 2–8.

Figure 9:
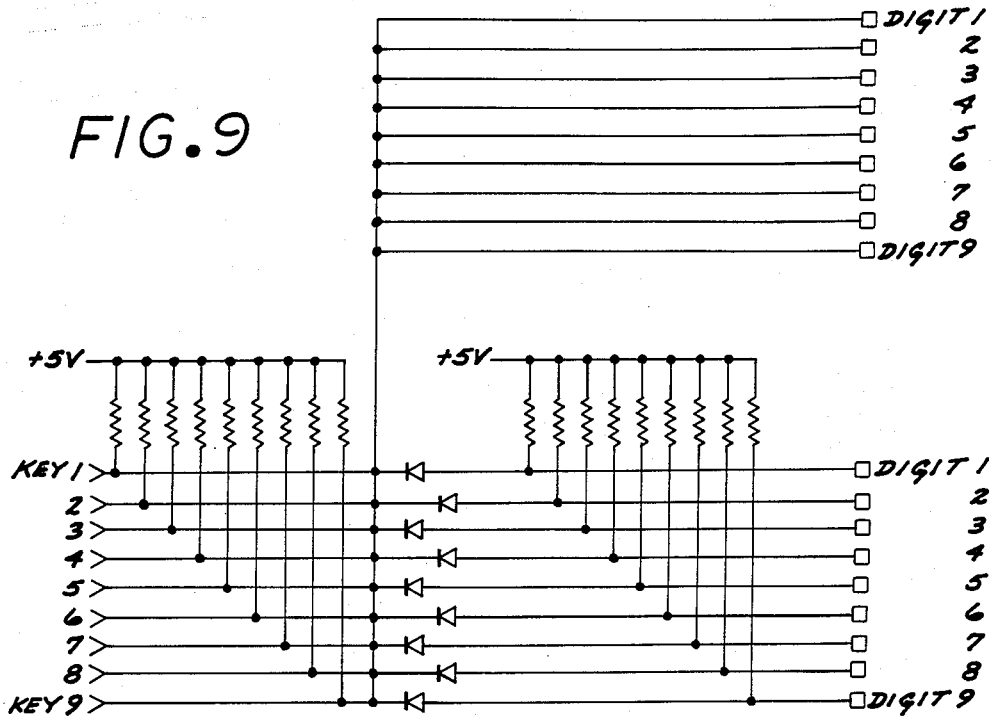
FIG. 9 is a schematic diagram of a key pad diode/resistor network employed with the controller of the alternate embodiment of the security system of FIG. 1.

Referring now to FIG. 9, a resistor-diode network is illustrated for converting the states of the key pad keys into usable signals for interrogation by the microcomputer 304. The network provides two sets of "digit" signals, one set for connection to device 312 and the other set for connection to the wirewrap network 322 (FIG. 8A).

Figure 10:
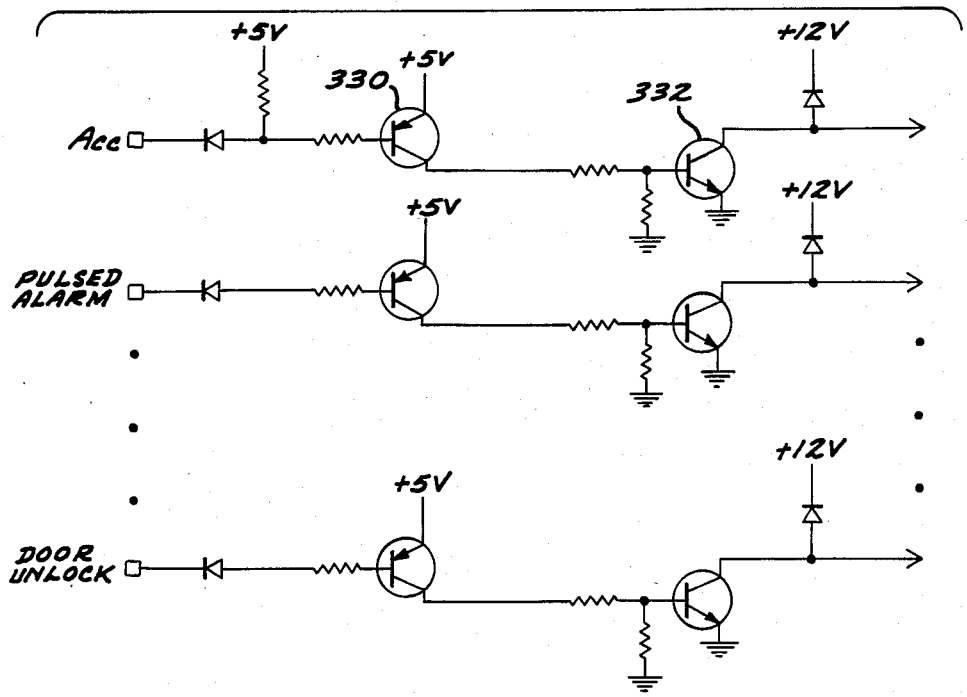
FIG. 10 is a schematic diagram of certain output driver circuits employed with the controller illustrated in FIGS. 8A-B.

FIG. 10 illustrates the circuits which convert the control signals for controlling the controlled devices comprising the accessory, pulsed alarm, hood release, ignition cutoff, door lock and unlock, and the like, into drive signals for operating these devices or relays associated therewith. Only exemplary ones of the circuits are illustrated, since the circuits are identical. For example, the circuit for providing the accessory drive signal comprises transistors 330 and 332 which cooperate to provide selectively a 12-volt drive signal.

The security system of the invention comprises a number of significant features and functions. One feature of the invention is a self-diagnostic capability for detecting defective sensors and trigger devices and thereafter disabling the defective sensor or trigger to allow the system to be armed. In the embodiment shown in FIGS. 2–6, any defective system sensor or trigger is found and automatically disabled each time the system is armed. Moreover, an audible notification is provided that a defective device has been located, and the particular defective device is identified by an LED flash code and or by an audible message generated by a voice synthesizer. In the embodiment of FIGS. 7–10, the system automatically locates and identifies any defective sensor each time the use seeks to arm the system. The system user may then manually and selectively bypass any identified defective sensor or trigger using the key pad if he does not wish to immediately service the defective device. Thus, in contrast to many conventional systems which can not even be armed if there is a defective sensor or trigger device, the present system automatically detects and identifies any defective sensor or trigger, and thereafter either automatically or user-selectively disables such devices to allow the system to be armed. Therefore, some security protection is still available, even though at some reduced level due to the disabled sensor or trigger.

Another feature of the present security system is that, upon disarming the system, a visual and audible indication is made to the system user if any intrusion has been detected while the system was in the preceding armed state. This is accomplished in the present embodiments by causing a first predetermined audio sound pattern (e.g., two chirps) to be generated if no intrusion was detected, and a second particular audio sound pattern (e.g., four chirps) to be generated if an intrusion was generated. In the case wherein the user has disarmed the system via the remote transmitter, this is an added safety feature by warning the user of the intrusion before he nears the vehicle. The point of intrusion is also identified by a visual signal, e.g., a particular LED flashcode corresponding to the tripped sensor or trigger device, or by a voice synthesized signal providing a speech message identifying the intrusion point (e.g., "the driver's door was opened").

Another novel feature of the present system is the user programmability of a personalized siren code. This allows a system owner to remotely determine whether a particular alarm signal being generated is from his system. Thus, if a system is employed as a vehicle security system for a vehicle parked in a crowded lot or parking structure, the owner can determine whether his vehicle has been tampered with simply by listening for his personal siren code. In these embodiments, siren codes in the form of short "dots" and long "dashes" are employed. Further, the user may programmably determine the duration of each alarm cycle, to thereby comply with local ordinance.

The system also includes means for detecting the disconnection or disabling of power to the system and automatically generating alarm signals when power is restored unless a switch (e.g., the ignition switch) has been set by the user. This prevents the system from being defeated by a thief through the technique of disconnecting and thereafter reconnecting the vehicle battery.

The system may be programmed to directly provide door locking and unlocking signal pulses of the correct duration for the particular vehicle. At present, depending on the vehicle manufacturer, either one or three second pulse durations are required. The installer of the system programs the controller to provide door lock and unlock control signals of the appropriate duration for the particular vehicle. This feature eliminates the need for the use of interface devices for driving the door locking systems, as has heretofore been required.

The system has two security modes, and the user may programmably select the desired security mode, depending on the security level desired. In one mode, with a lower security level, the system may be disarmed using only the remote transmitter to enter the user authorization code. In the second mode, with a higher security level, to disarm the system requires the use of the remote transmitter to enter the appropriate transmitter code and the subsequent entry of the appropriate authorization code via the system keypad. This allows the user to select the level of security provided by the system. Thus, when the vehicle is to be left in a low-risk area, the user may opt for the lower level of security, to gain the convenience of not having to enter manually the keyboard code to disarm the system.

Another safety and convenience feature of the security system is that the vehicle interior courtesy or dome light is automatically activated when the system is disarmed by the remote transmitter for a predetermined time interval or until the ignition switch is turned on. The system may be programmed to operated with sensors and triggers of either negative or positive polarity.

Figure 11:
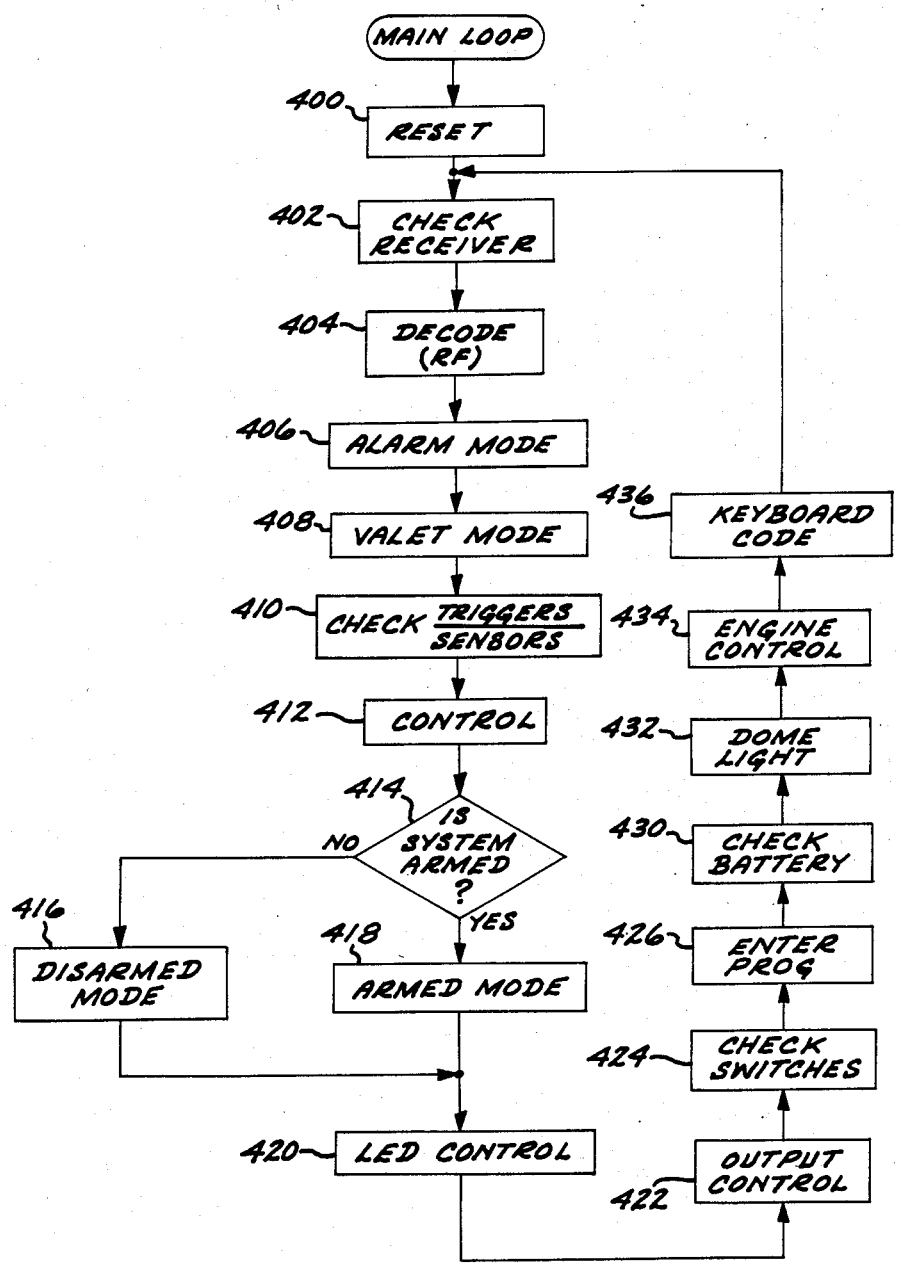
FIGS. 11-23 are flow diagrams illustrating the operation of the security system generally depicted in FIG. 1, and more specifically with respect to the embodiments of FIGS. 2–6 and 7–10.

To further explain the operation of the invention, a general flow diagram of the operation of the system is set forth in FIG. 11. As will be apparent to those skilled in the art, the desired operation of the system is achieved by appropriate programming of the controller 70 (or 304) to execute instructions achieving the functions indicated in the flow diagram.

The operation commences at step 400 on system powerup with the RESET function. This results in the reset circuit (FIG. 4) providing a reset signal to the controller to initialize the various parameters and flags utilized in the microcomputer. The reset function also provides a unique function, detecting whether power has been disconnected from the security system and then reconnected. The system will activate the alarm if the reconnection of power is unauthorized. The purpose of this feature is to prevent a thief from disconnecting power to the vehicle and therefore the security system by disconnecting the vehicle battery, and then reconnecting the power to defeat the security system since the system would otherwise be powered up in the unarmed mode, allowing the thief to enter the vehicle without activating the alarm. The "reset" feature of the system is more fully described with respect to FIG. 12.

The next function performed by the system is the "CHECK RECEIVER" function 402. This step is performed for the alternate embodiment of FIGS. 7-10, which employs an external decoder to determine whether the received message matches the predetermined code sequence. The microcomputer interrogates pin P23 of microcomputer 304 to determine whether the decoder (FIG. 7) has detected receipt of the appropriate code. This step is not employed by the embodiment of FIGS. 2-6, since the decoding operation in that embodiment is internal to the microcomputer 70.

The next step 404 in the general operational flow is to decode the received RF signal, in the case of the embodiment of FIGS. 2-6, wherein decoding internal to the microcomputer 70 is employed. This function is a correlation of the received sequence of digital data bits with the stored authorization code. If the received signal matches the stored code, then a flag is set indicative of the condition of a correctly entered user authorization code. The decode function for the internal decoder is interrupt driven, with assembly of the incoming data bits occurring in the background until a "dead period" is detected with no data coming in for a predetermined period of time. Then the received bit sequence is compared with the stored data, and flags are set accordingly. The internal decoding function is described more fully with respect to FIGS. 13A-C.

The next function to be performed is the ALARM mode function 406. Here, the alarm mode is commenced, if appropriate, as determined by the appropriate software flags, i.e, the "TRIP" or "PANIC" flags. Thus, if the alarm mode has been triggered, then controlled devices such as the siren, the dome and parking lights and the like as programmed to occur during an alarm event are activated. The alarm mode starts a timer for the alarm duration. If either the "PANIC" or "TRIP" flag is cleared during the timeout, the alarm mode ends immediately. Otherwise the flags are cleared at the end of the alarm interval. The alarm mode is described more fully with respect to FIG. 14.

The next function in the overall sequence is the VALET MODE function 408. During this mode the controller determines if the system is disarmed, and if disarmed, checks the ignition switch. The mode output is a VALET flag. The valet mode is entered by turning the ignition on and toggling the program "valet" switch. This sequence of events disables the alarm system. To exit the VALET mode, the vehicle ignition switch is turned on and the program "valet" switch is toggled to the off position. The valet mode allows the security system to be disabled so that the vehicles may be left in the care of an authorized person, such as a valet, service technician or the like. Thus, if the valet mode is properly entered, the VALET flag will be activated.

The next function 410 to be accomplished by the system is to check the triggers and sensors of the system. For the embodiment of FIGS. 2-6 this is accomplished by reading the states of the microcomputer 70 pins P1-P9. In the embodiment of FIGS. 7-10, this is accomplished by respectively activating the outputs of devices 310, 312 and 314, and by reading the states of the data pins P1-P8, and by reading pins P11-P16. For each active line or device, a flag is set. The flag will be cleared when the particular line or device is no longer active.

Figure 15A:
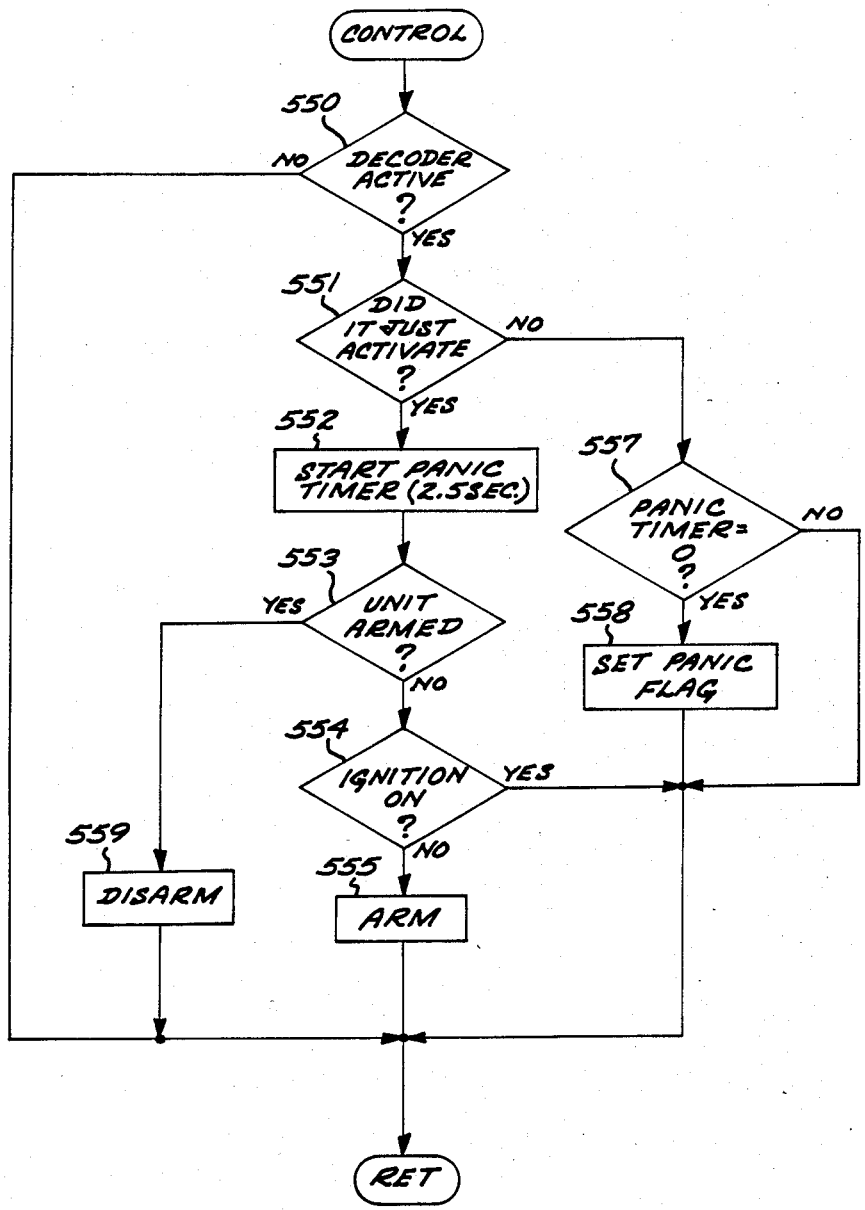
Figure 15B:
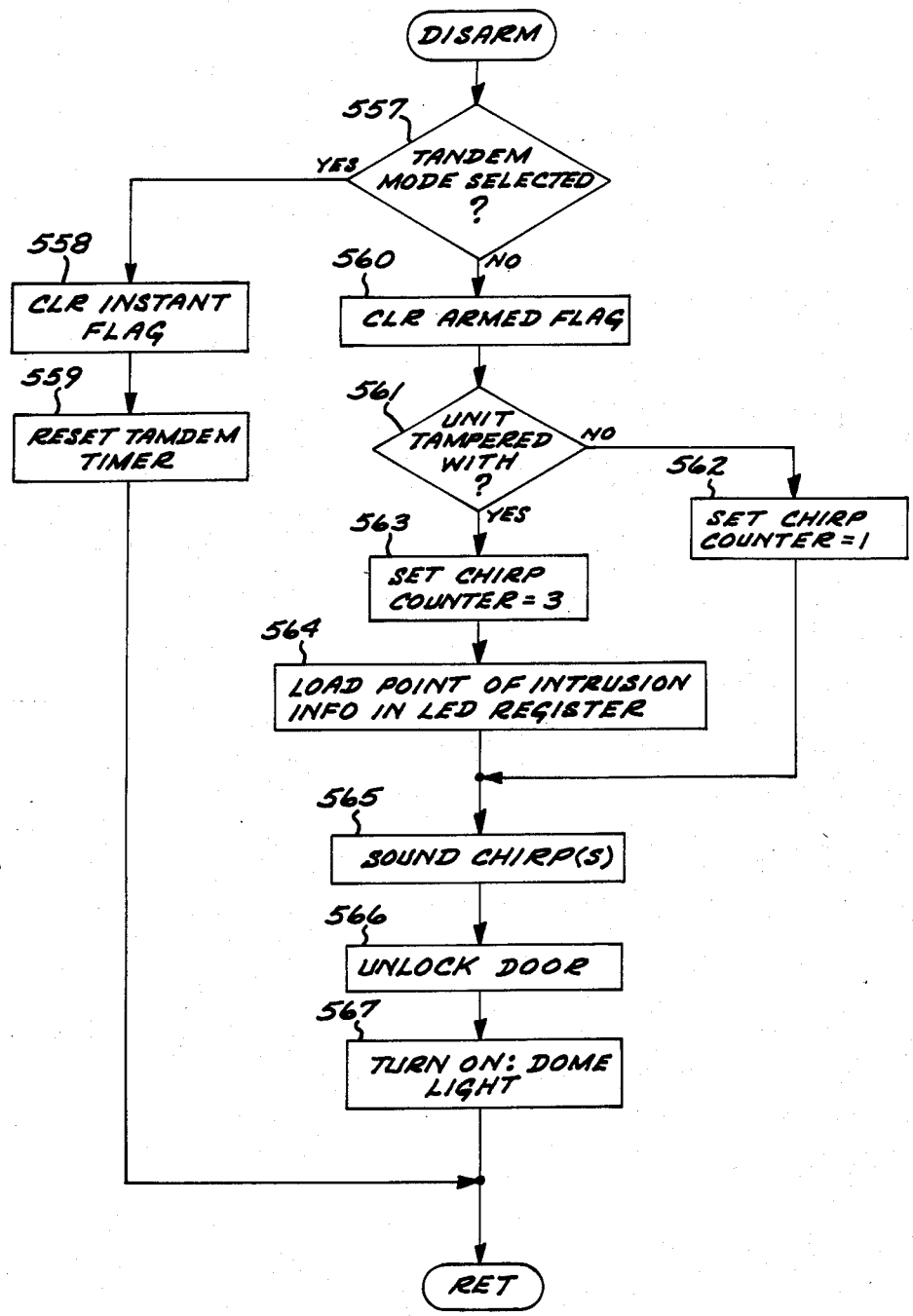

The next function in the main loop (FIG. 11) is the CONTROL function 412. This is described in detail with respect to FIGS. 15A-15C. In general, the control function responds to the decoder outputs. When the command is received to arm the system, the controller checks the sensor and trigger flags. If no sensor or trigger line is active, i.e., none of the device flags are set, then the controller enables two "chirps" (a chirp is sounded by a pulse applied to the siren 92) and then sets the ARMED flag. If there is an active trigger or sensor, four chirps are sounded and the controller provides information to an LED register comprising the controller 70, indicating which sensor is active, i.e., setting a flag which will be used to communicate visually to the user which sensor is defective. If the decoder signal is to disarm the system, then the controller sounds one chirp if there was no tampering with the controlled area. If tampering occurred during the time the system was armed, the chirp counter is set to 3 (step 563, FIG. 15B), the controller 70 provides the LED register with information as to which sensor or trigger was tampered with (step 564). During this function, the controller also recognizes whether the system is in the "panic" mode, which is set by a two and one-half second transmitted signal from the user transmitter, and sets the PANIC flag in this event. If during the panic mode the operator transmits the correct authorization code, then the controller terminates the panic mode. Otherwise the panic mode continues until the alarm timer runs out. During this function the controller also set the duration for the door unlock/lock control signal.

Once the CONTROL function has been completed, then at step 414, the decision is made as to whether the system is armed, by checking the ARMED flag. If the system is armed, then the next function is the armed mode function 418. If the system is not armed, the disarmed mode function 416 is performed.

A timer is initiated in the ARM mode (FIG. 15D) to disable the sensor "two" (e.g., a motion or shock detector or sound discriminator) line (coupled to pin P2 of the controller 70 in FIG. 3) for five seconds. After the initial five seconds, both trigger and sensor lines are enabled. A counter function is provided for counting how many times each sensor or trigger is activated consecutively. After ten consecutive alarms by a particular sensor or trigger, that device will be disabled. This prevents noise pollution and battery drain caused by what would otherwise be a continuing alarm signal. If a sensor or trigger is active, a TRIP flag is set and information is placed in a register which identifies the particular trigger or sensor which tripped the alarm. The LED control mode 420 responds to this data when the system is disarmed. The siren sound is activated here also so that the siren responds to the personalized siren bit pattern, as will be described below with respect to FIG. 19E, and sets the siren flag accordingly.

The DISARMED function 416 controls the passive arming of the system. This is described in further detail with respect to FIG. 15B.

The LED control function 420, when the system is armed, sets the red LED flag to flash with the appropriate message as indicated by the data stored in the LED register. If the system is disarmed, the green LED flag will be set to flash in the appropriate sequence. If the valet mode has been entered the green LED flag will be set. The LED control is described in further detail with respect to FIGS. 18A-C.

The next function in the general operation flow is the OUTPUT CONTROL function 422. Here the controller examines the flag for each output line of the controller 70 for a controlled device, and if set, will turn that output line on. If the flag for a particular output line is cleared, the controller will turn that line off. Thus, this function activates and deactivates the controlled devices 90, in dependence on the state of the software flag associated with the particular device.

The next function is the CHECK SWITCHES function 424. During this step, the controller checks the status of all switches other than sensors and triggers, i.e., the ignition switch, the program ("valet" and hood) switches 77, and the passive arming disable line. The controller sets flags as appropriate for each line.

The next function is the ENTER PROGRAM function 426. The purpose of this mode is to program information into the system, e.g., setting the duration of the alarm cycle (from 1 to 255 seconds), the pattern of the siren, as well as the other programmable features described more fully with respect to FIGS. 19A-L. For the embodiment of FIGS. 2-6, this mode is entered when the ignition switch is on and the program "valet" switch is toggled on and off within one second. The system chirps once to signify that the program mode has been entered and the green LED is turned on. The programming mode can be aborted by turning the ignition switch off.

Figures 20, 21:
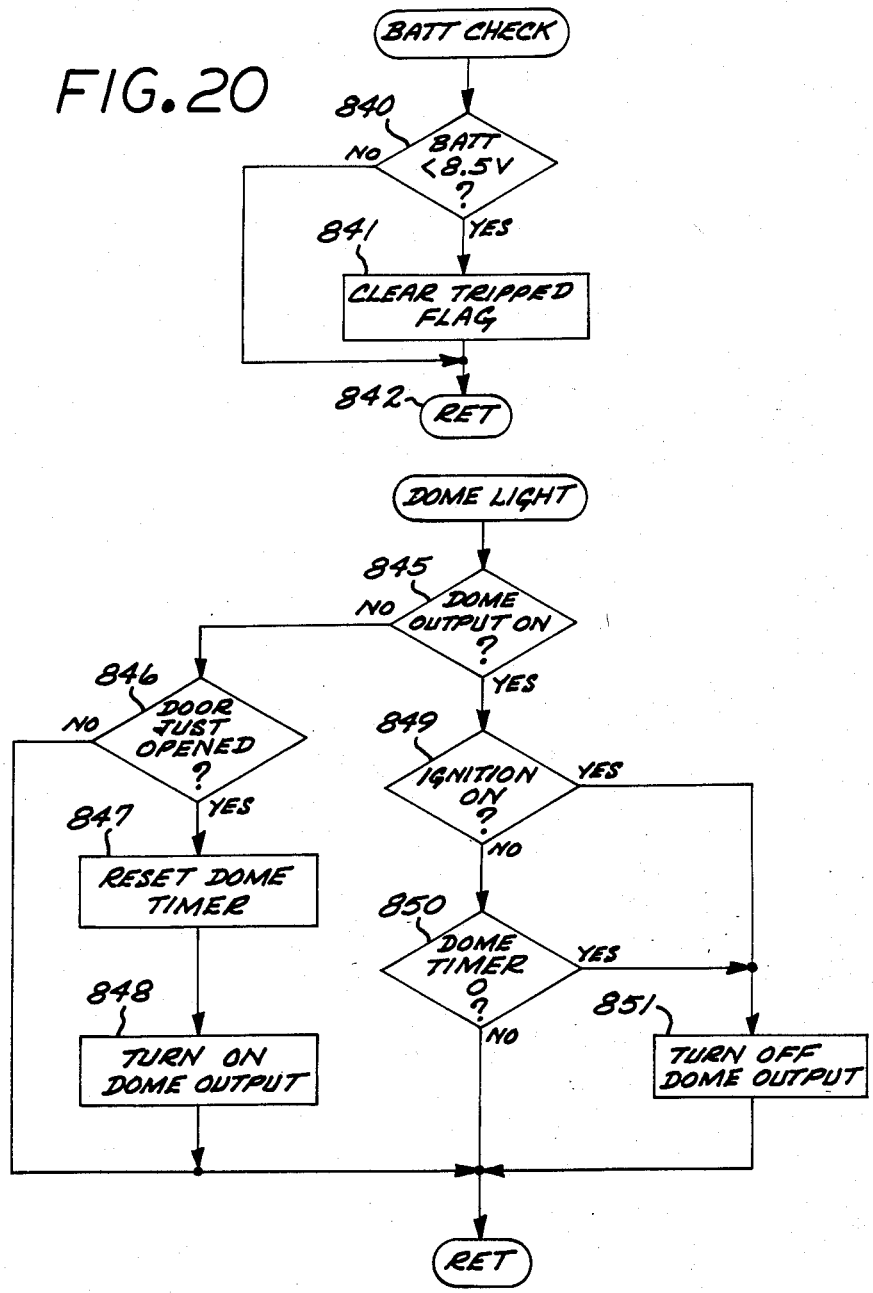

The CHECK BATTERY function (step 430), shown in FIG. 20 operates to detect the condition wherein +5 volts is not available to the security system, and disables the system in that event to avoid further draining the vehicle battery.

The DOME LIGHT function 432 allows the user to have the interior courtesy or dome light activated for a predetermined interval after the system is disarmed. This function is described in more detail with respect to FIG. 21.

Another function performed during the main loop is the "ENGINE CONTROL" function 434. As will be described hereinbelow with respect to FIG. 22, this function selectively disables the vehicle engine to prevent unauthorized operation of the vehicle.

The KEYBOARD CODE function (step 436) allows the user to enter an authorization code manually via the key pad 60. This function is discussed in further detail with respect to FIG. 23.

After step 436 has been performed, the operation flow loops back to step 402 to commence the loop again. The entire main loop takes only a short period of time to complete, on the order of milliseconds.

Figure 12:
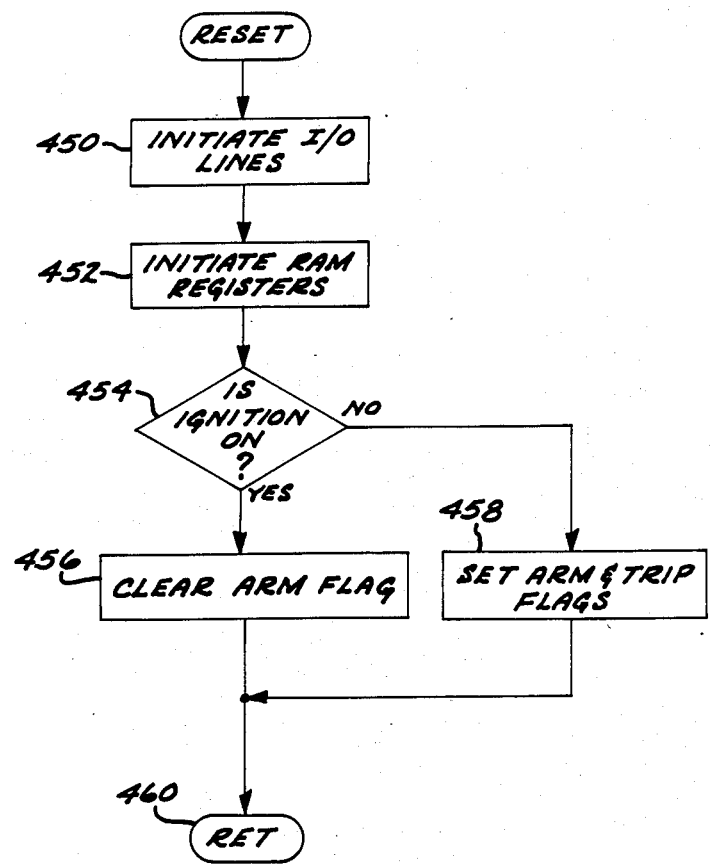

Selected ones of the particular functional modules described above will now be described in further detail. FIG. 12 shows the RESET module which is activated when the +5 volt power supply to the system 50 is interrupted and restored. Upon power up, the controller 70 input/output lines are initiated at step 450. At step 452, the registers of the random access memory of the controller are initialized. At step 454, the ignition switch state is read and if turned on, the ARM flag is cleared at step 456, and the program operation returns to step 402 of the main operation loop. If the ignition switch is not turned on, the ARM and TRIP flags are set, since this is interpreted as an unauthorized power up of the system, and program operation returns to step 402.

Figure 13A:
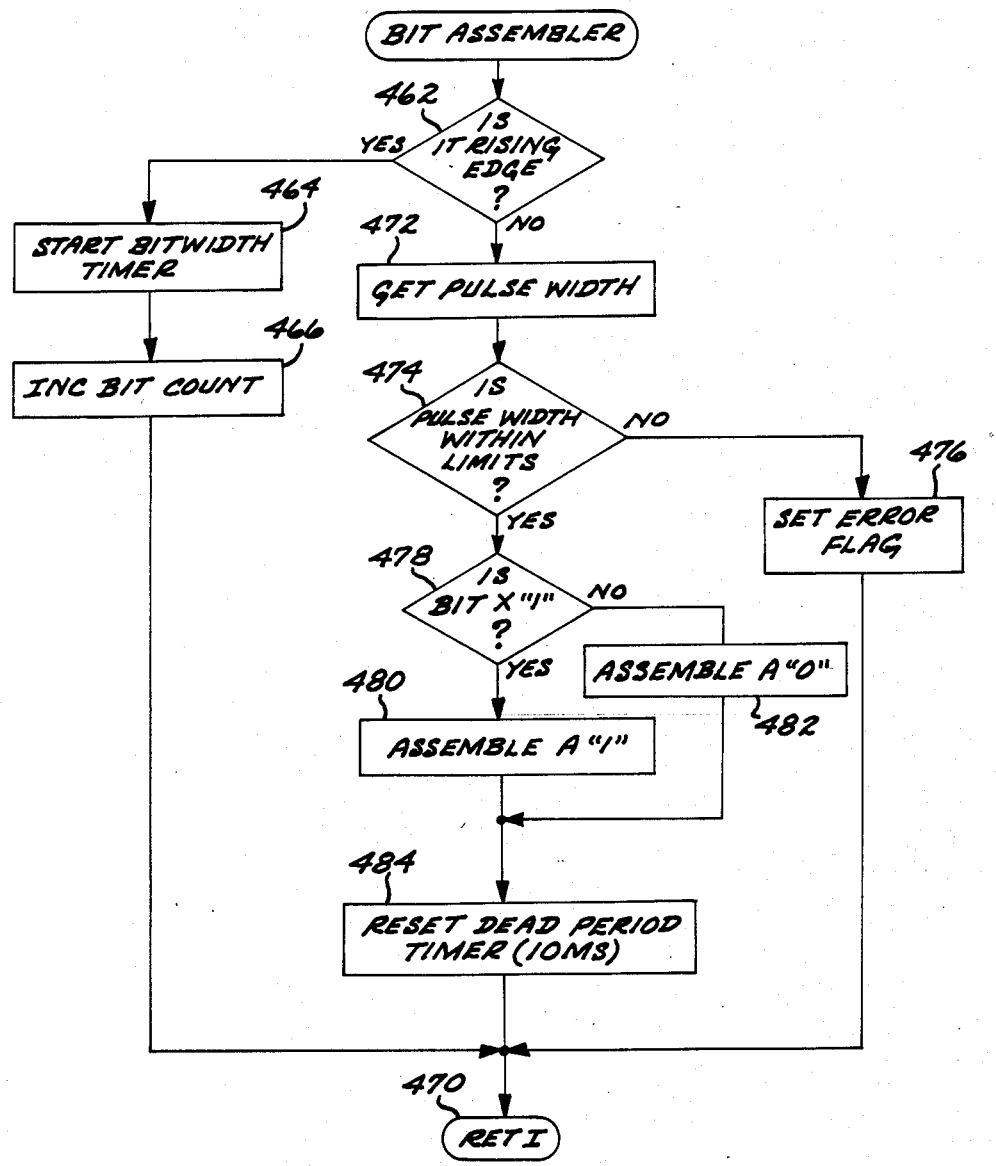
Figure 13B:
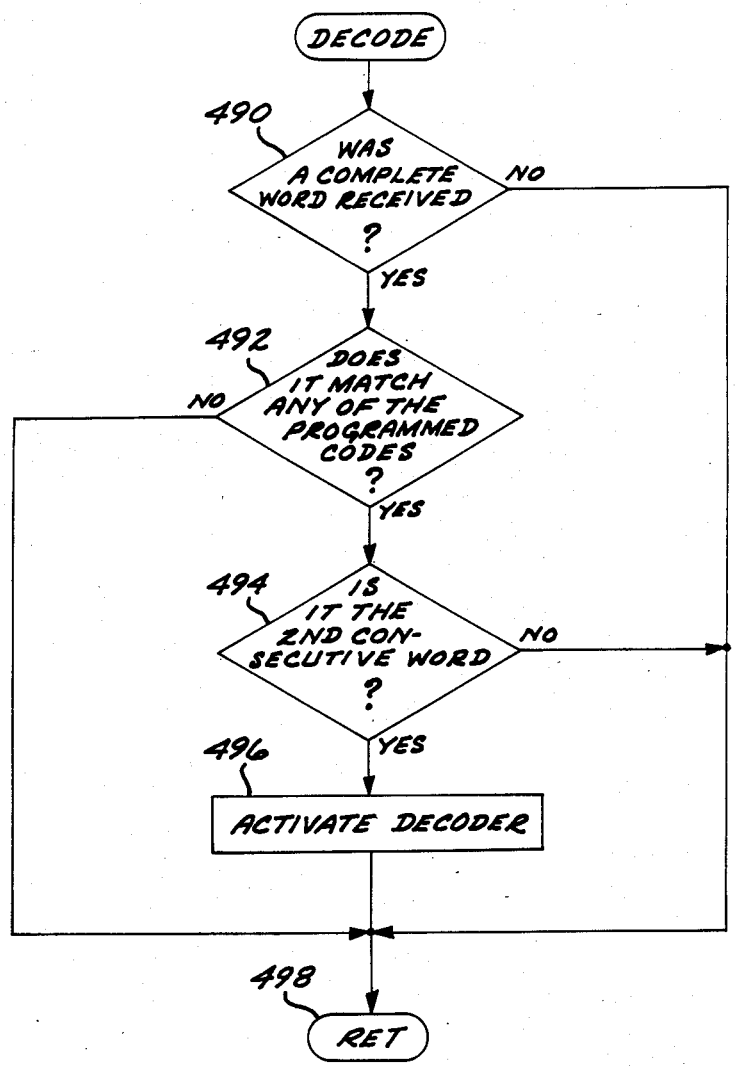

The internal DECODE module 404 is illustrated in further detail with respect to FIGS. 13A-B. FIG. 13A shows the bit assembly operation carried out by the controller 70 as data is being received by the receiver. This background operation is continuously performed, even as the operational flow is at various functions within the main loop of FIG. 11. The receipt of a bit (rising edge) from the receiver at pin P10 of controller 70 results in a hardware interrupt, which shifts operation to the bit assembler (FIG. 13A). At step 462, if a rising edge of a received pulse is detected, then at step 464 a "bit width" timer is started, the bit count for the particular received sequence of bits is incremented (step 466), and at step 470 operation returns to whatever step in the main loop in which the interrupt occurred. If at step 462, the rising edge of a pulse is not detected, then at step 472 the present pulse width is determined, and if not within the predetermined limits (step 474), then at step 476 an ERROR flag is set. At step 470 operation returns to the main loop step at which the interrupt occurred. If the pulse width is within limits, then at steps 478, 480 and 482 either a "1" or a "0" bit is assembled with the preceding data bits, as appropriate. At step 484, the "dead period" timer (10 milliseconds) is reset and at step 470 program operation returns to the main loop.

Referring now to the DECODE subroutine of FIG. 13B, the first step 490 is to determine whether a complete word has been received. This determination is made upon occurrence of a "dead" period by checking the bit count and comparing that current count with the length of the authorization code. If a complete word has not been received, then the subroutine returns to the main loop. If a complete word has been received, then at step 492, the received word is compared against the stored authorization codes to determine if there is a match. If not, the program operation returns to the main loop. If the received word matches any of the programmed authorization codes, then if the matching code has been received twice consecutively (step 494), the decoder is activated at step 496. If the matching code has not been received twice consecutively, program operation returns to the main loop without activating the decoder. The requirement that the matching code be received twice consecutively is a further security feature, against the user of code scanners.

Figure 13C:
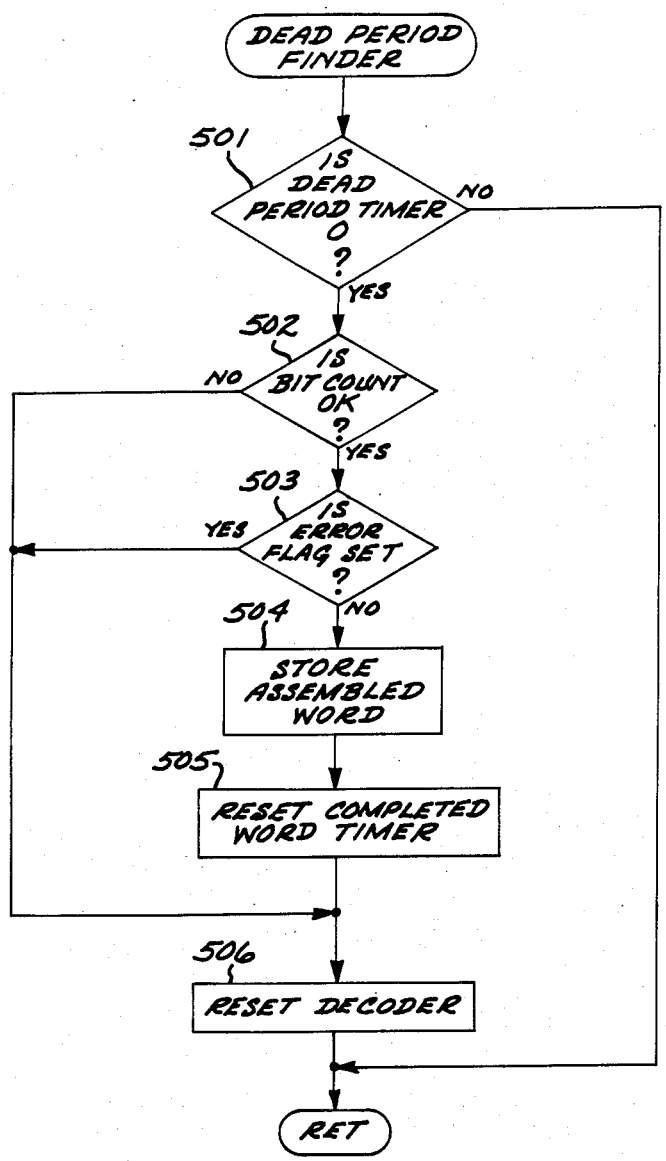

A "dead period" timer is employed as a "background" function, which on an interrupt basis monitors the receiver output to locate 10 millisecond time periods between received data. Such gaps indicate that a data word has been received. The dead period finder function is illustrated in FIG. 13C. The routine employs a 10 millisecond software timer, which is reset during the bit assembler operation (step 484, FIG. 13A). At step 501, this dead period timer is checked to determine if it has received the "0" timed-out state. If not, the operation returns to the particular function in the main loop at which the interrupt occurred. If the timer state has reached "0", then at step 502, the bit count is checked to see if the bit count is not equal to the maximum possible code bit length. If the count equals that maximum length, then the decoder is reset to the inactive state at step 506, and the operation returns to the main loop. If the bit count does not exceed this maximum length, then the error flag is checked at step 503, and if set, operation branches to step 506 to reset the decoder. If the error flag is not set, then at step 504, the assembled word is stored (step 504) in a buffer memory comprising the controller 70, the completed word timer is reset at step 505, the decoder is reset to the inactive state (step 506), and operation returns to the main loop.

The ALARM mode function (function 406 in FIG. 11) is shown in FIGS. 14A-D. This function is to activate and deactivate the alarm condition events at the appropriate times. At step 507, the alarm flag is checked. If set the alarm timer state is checked (step 508A) to determine whether it has reached the "0" or timed-out state. If the timer state is "0," then the ALARM, TRIPPED and PANIC flags are cleared (step 508B), the controller outputs for the controlled alarm devices are turned off (step 508C), and operation returns to the main loop. If the alarm flag is not set (step 507), the TRIPPED and PANIC flags are checked at step 509. If neither flag is set, no alarm devices are to be activated, and therefore operation returns to the main loop. If either the TRIPPED or the PANIC flag is set, then at step 510, the ALARM flag is set. At step 511, the alarm timer is loaded with the programmed alarm duration, and then the alarm outputs are turned on (step 512), including such controlled devices as, for example, the siren, pulsed alarm, autodialer and vehicle interior light. Steps 513 and 514 indicate the SIREN and PULSED ALARM subroutines, the former illustrated in FIGS. 14C-D. Operation then returns to the main loop.

The first step of the SIREN subroutine (FIG. 14B) is to determine whether the siren counter is at the "0" state (step 515). If not, the counter is decremented (sep 516) and its state is again checked. If the count is "0," at step 525, the timer variable TSIREN is set to 240 milliseconds, the siren output line is turned off (step 526). Operation then returns to the main loop. If at step 515, the counter is at "0," then the siren counter is reset (step 521), TSIREN is set to 2.5 seconds (step 522) and the siren is turned on (step 523) before operation returns to the main loop. At step 517, if the counter state is not zero, then through step 518, either the OFFSOUND or ONSOUND subroutines (FIG. 14C and 14D, respectively) will be accessed. At step 520, operation for the next bit in the personalized siren code is set up, and operation returns to the main loop.

Figure 14A:
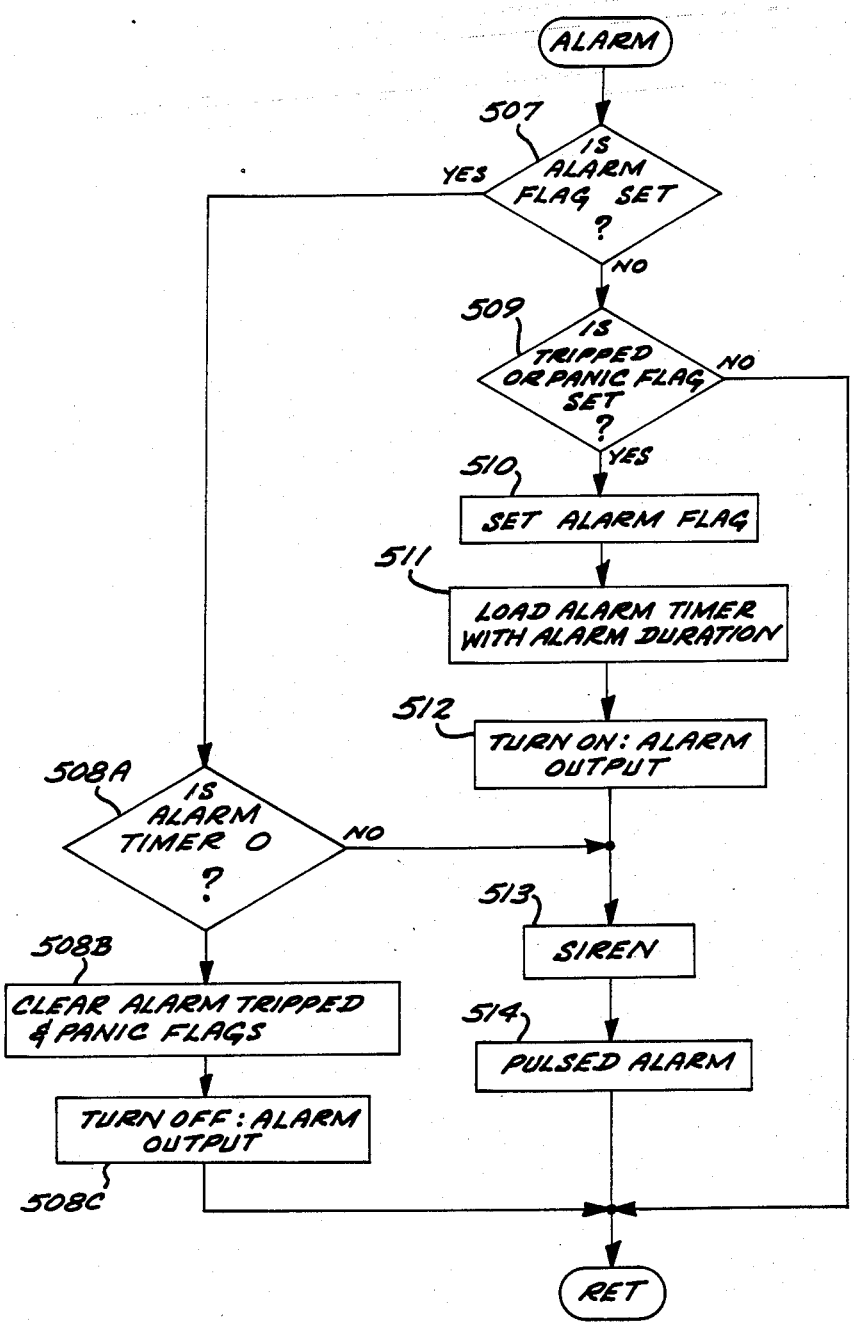
Figure 14B:
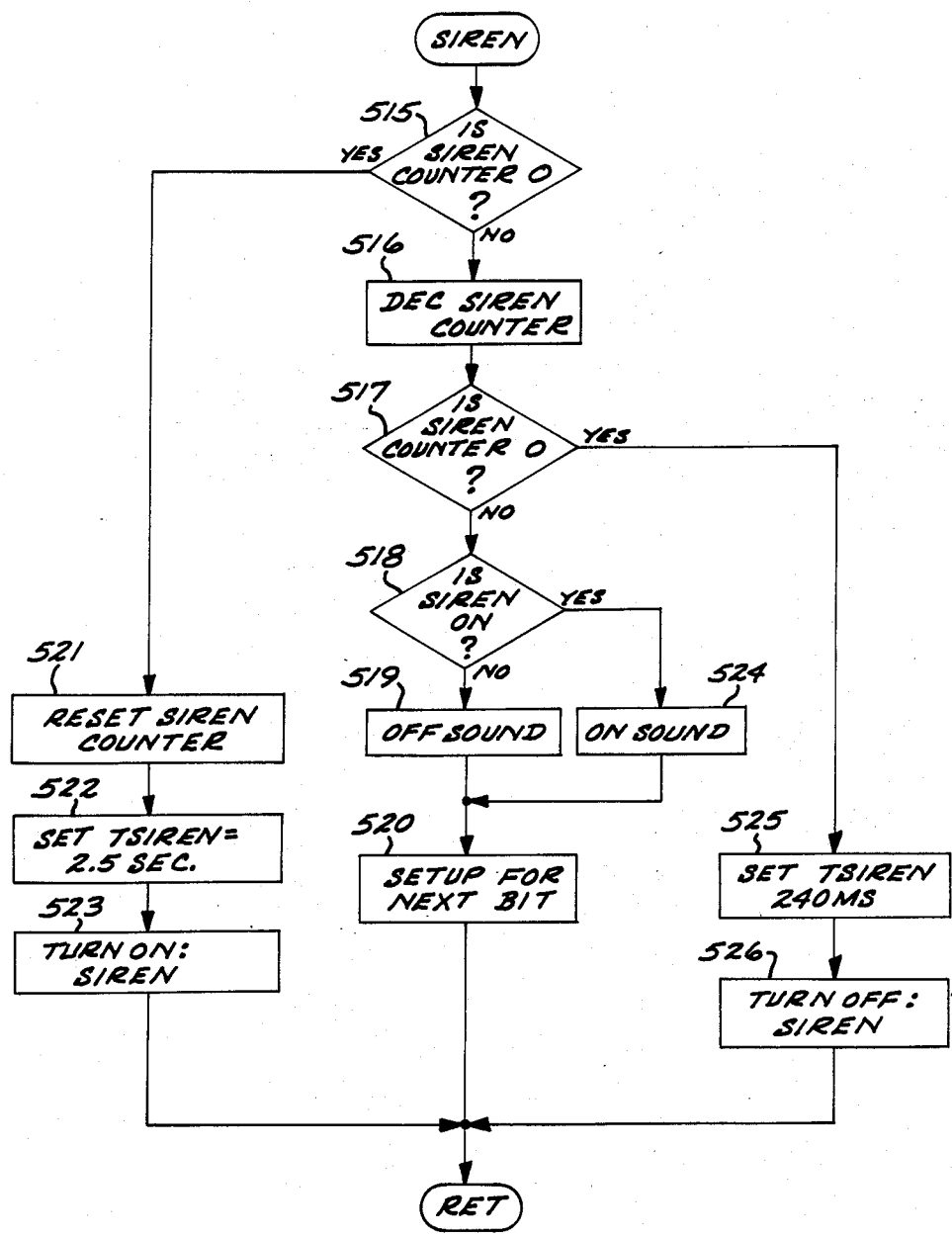
Figure 14C:
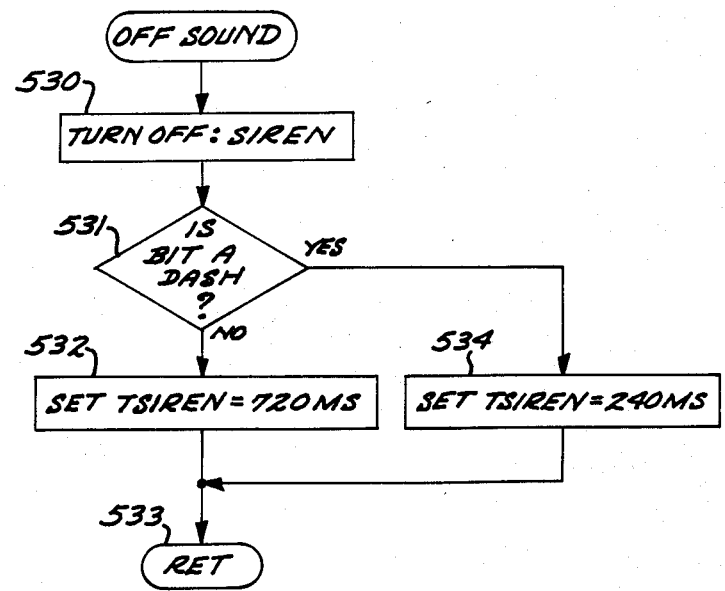
Figure 14D:
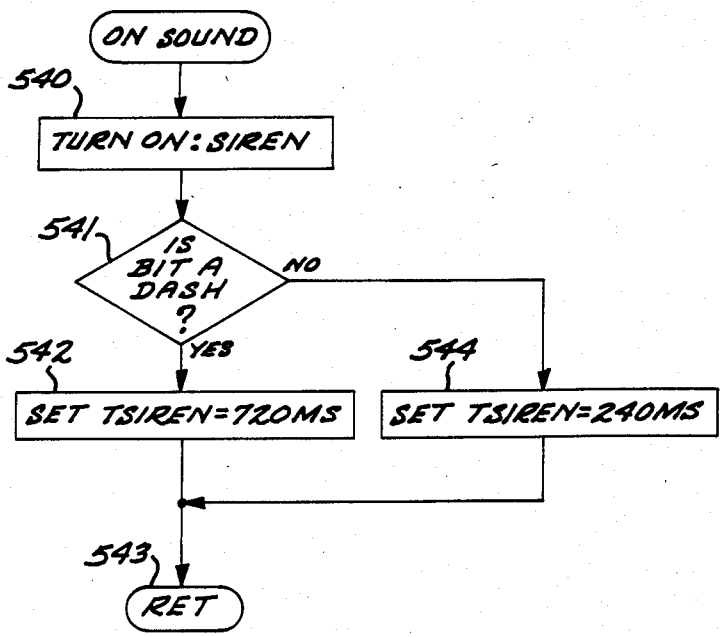

The first step 530 of the OFFSOUND routine (FIG. 14C) is to turn off the siren. The bit status of the programmed siren code is checked, and if it represents a dash, the TSIREN time variable is set to 720 milliseconds (step 532). Otherwise TSIREN is set to 240 milliseconds for a "dot." Operation then returns to step 520 (FIG. 14A).

The first step 540 of the ONSOUND routine (FIG. 14D) is to turn on the siren. The current siren code bit is checked, and if it represents a "dash," TSIREN is set to 720 milliseconds. Otherwise TSIREN is set to 240 milliseconds. Operation then returns (step 543) to step 520.

The SIREN subroutine therefore results in generation of the programmed personalized siren code at the appropriate time.

The CONTROL module is described in further detail with respect to FIGS. 15A-15D. At step 550 (FIG. 15A) the decoder is tested to determine if it is in the active state (step 498 of FIG. 13B). If not in the active state, then there is no decoder activity for the CONTROL module to respond to, and the operation returns to the main loop. If the decoder is active, then if it was just activated since the prior pass through the main loop, the panic timer is started (2.5 seconds) at step 552, and at step 553 the ARMED flag is checked to determine whether the system is armed. If armed, the DISARM subroutine (FIG. 15B) is entered. Otherwise the ignition switch is checked for its status and if turned on, the control function is ended and operation returns to the main loop. If the ignition switch is not turned on, then the ARM subroutine (FIG. 15C) is entered. Upon completion of either the DISARM or ARM subroutines, the control function is ended, and operation returns to the main loop. If, at step 551, the decoder was not just deactivated, then at step 557 the panic timer status is checked, and if "0" the PANIC flag is set at step 1558. Operation then returns to the main loop.

Upon entry of the DISARM subroutine (FIG. 15B), if the tandem security mode has been selected (step 557), then the INSTANT flag is cleared (step 558), the tandem timer is reset (step 559), and operation returns. If the tandem security mode has not been selected, then at step 560 the ARMED flag is cleared. At step 561, the trigger and sensor flags are checked to determine whether any tampering has occurred during the ARMED mode. If none of these flags are set, then at step 562 the audible chirp counter is set to 1, and at step 565 the appropriate chirp(s) is sounded. If tampering is indicated, than at step 563 the chirp counter is set to 3, and at step 564, the point of intrusion indicated by the particular active flag or flags is loaded into the LED register for display by the LED control function (step 420 of FIG. 11). Thus, the system will sound a first predetermined audible message (here, one chirp) if no tampering was detected, and a second predetermined audible message (here, three chirps) if tampering was indicated. Further, the point of intrusion will be indicated by the LED flash code generated during the LED CONTROL function.

After sounding the appropriate number of chirps by the SOUND CHIRPS subroutine (FIG. 15C), which indicate audibly that tampering has or has not been detected, then at step 566 the vehicle power door system is activated to unlock the vehicle doors, the dome light is turned on (step 567) and operation returns to the main loop. Thus, upon disarming the system the vehicle doors are automatically unlocked, and the vehicle dome light is activated for a predetermined time interval or until the ignition switch is activated.

Figure 15C:
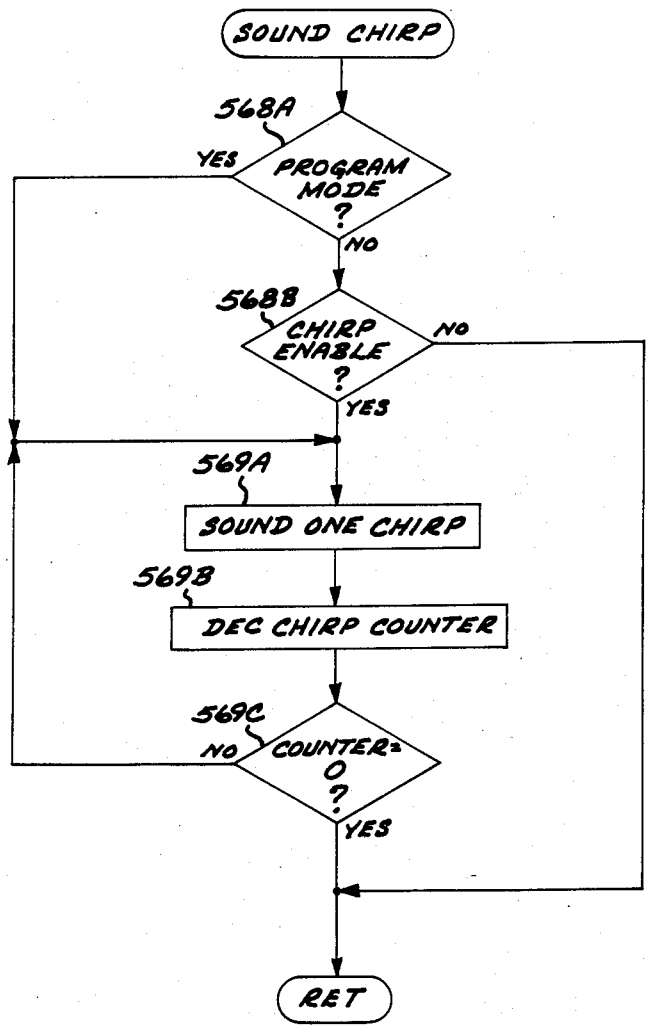
Figure 15D:
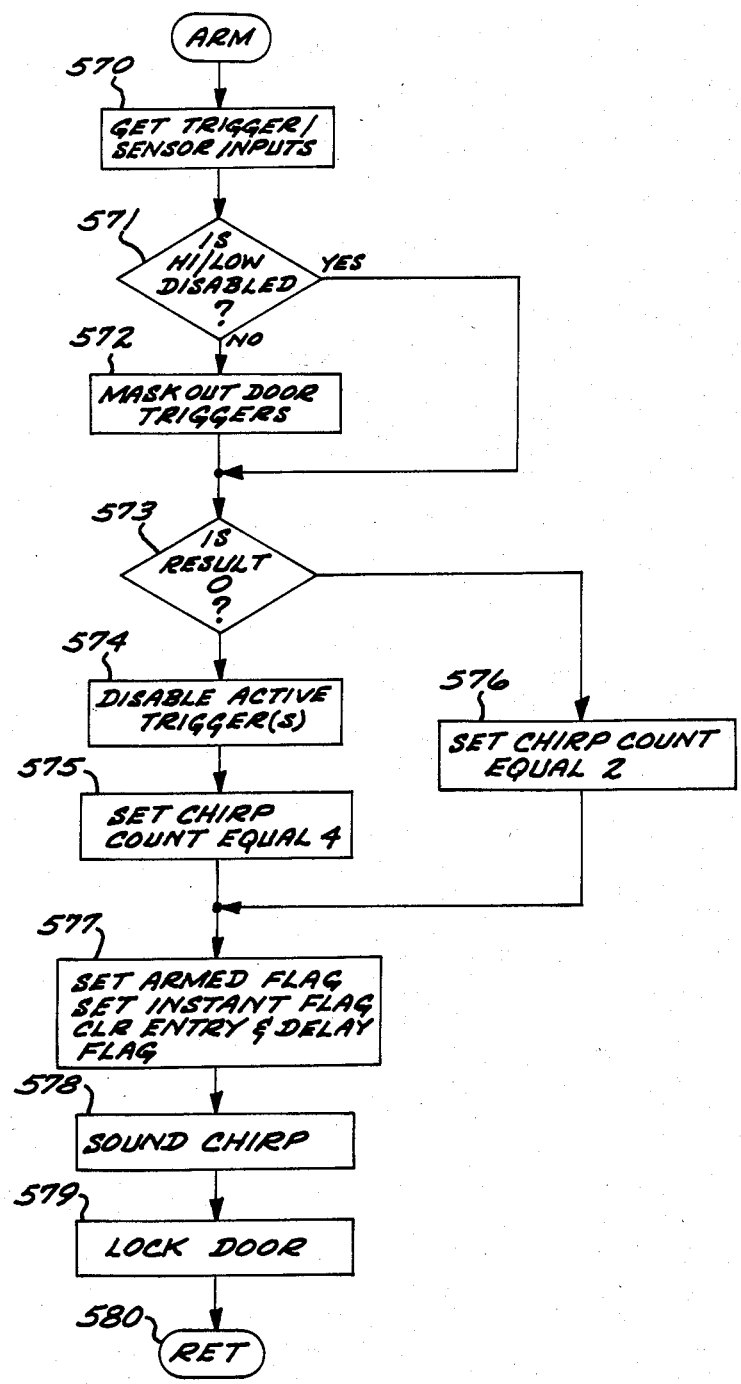

The SOUND CHIRPS subroutine is shown in FIG. 15C. If the system is determined to be in the PROGRAM mode (step 568A), then one chirp is sounded (step 569A), the chirp counter is decremented (step 569B) and the operation returns if the chirp counter state is zero, or otherwise loops back to step 569A. If the system is not in the PROGRAM mode, and if the CHIRP ENABLE flag is not set (step 568B), operation returns. If the flag is set, then operation proceeds to step 569A.

Upon entry of the ARM subroutine (FIG. 15D), at step 570, the controller gets the trigger and sensor inputs, i.e., checks the various flags corresponding to these devices, and at step 571 determines whether the "HI/LO" feature has been disabled. If so, then operation branches to step 573. Otherwise, the door triggers are masked out at step 572. At step 556 the remaining trigger and sensor flags (after the masking operation) are checked to determine whether any are active. If not active, then at step 576, the chirp count is set to 2. Otherwise the active trigger(s) is disabled, to allow the system to be armed without the disabled sensor or trigger. This disabling takes place by storing the disabled sensor or trigger device identification, and thereafter ignoring the state of these identified devices each time the sensor and trigger lines are interrogated by the controller 70. At step 575 the chirp count is set to 4 indicating that a defective device has been bypassed. At step 577 the ARMED and INSTANT flags are set and the ENTRY DELAY flag is cleared. At step 578 the appropriate number of chirps is sounded, and at step 579 the door lock output line is activated to automatically lock the vehicle doors. Thus, the system automatically activates the door power locking system when the system is armed. Operation then returns to the main loop.

The DISARMED module (step 416 of FIG. 11) is shown in more detail in FIGS. 16A–E. At step 581, the HOOD subroutine (FIG. 16B) is entered. At step 582, the ignition switch is checked. If it is activated, then at step 583, a test is performed to determine whether the ignition switch was activated since the last pass through the subroutine. If yes, then at step 585, the door lock system is activated to lock the doors. At step 583, the PROGRAM QUALIFY subroutine is entered which begins a 10 second timer after the ignition switch is turned on, during which interval the ENTER PROG module (step 426 of FIG. 11) can be entered by toggling the program "valet" switch 77. At step 587 the EXIT DELAY flag is cleared, ending the exit delay during which the user is provided the opportunity to exit the vehicle without activating the alarm. Operation then returns to the main loop. If the ignition switch was not on at step 582, then the valet flag is checked at step 588. The operation then proceeds to step 486 to clear the EXIT DELAY flag. Otherwise, the passive arming flag is checked at step 590 to see if this feature is disabled, and if so, operation proceeds to step 586. If passive arming is not disabled, then at step 592 the RECORD subroutine is entered.

Figure 16A:
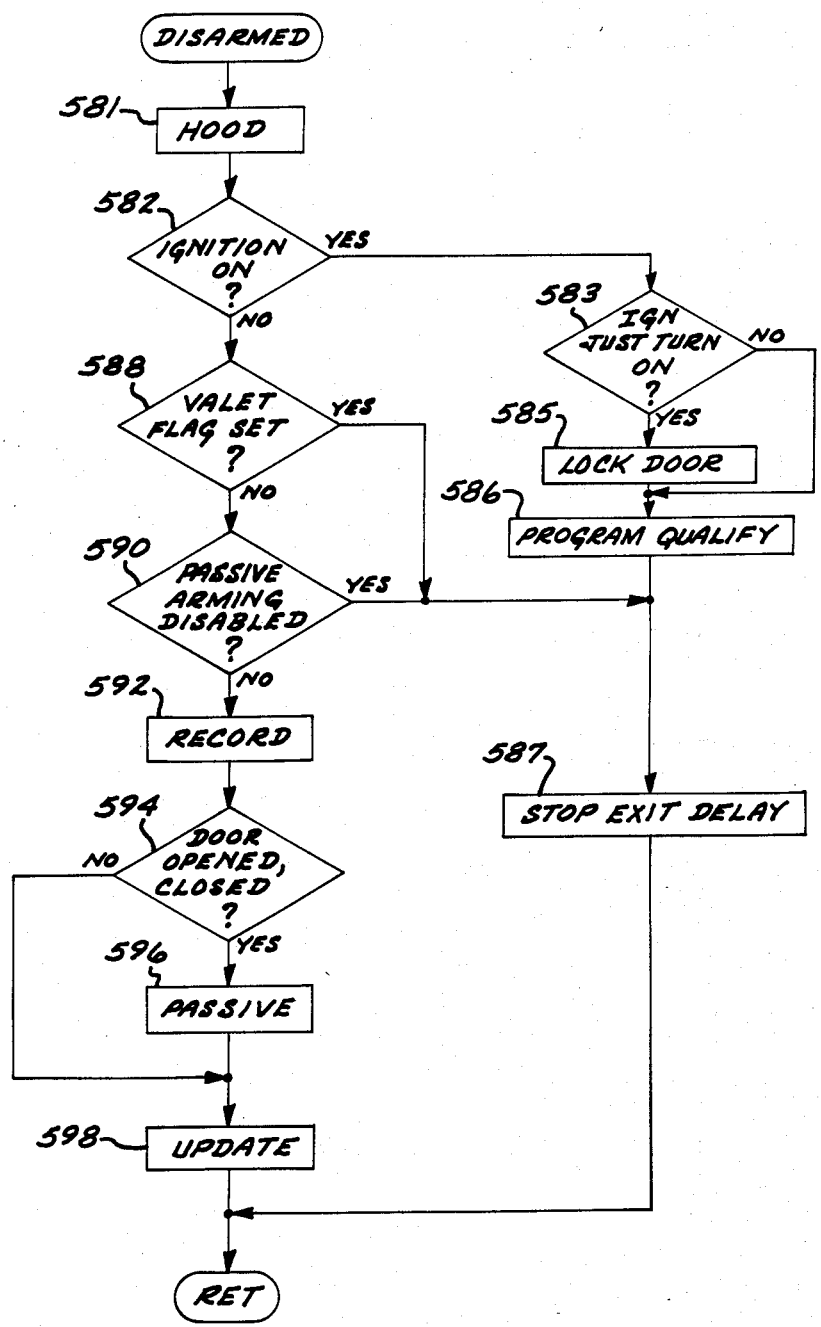
Figure 16B:
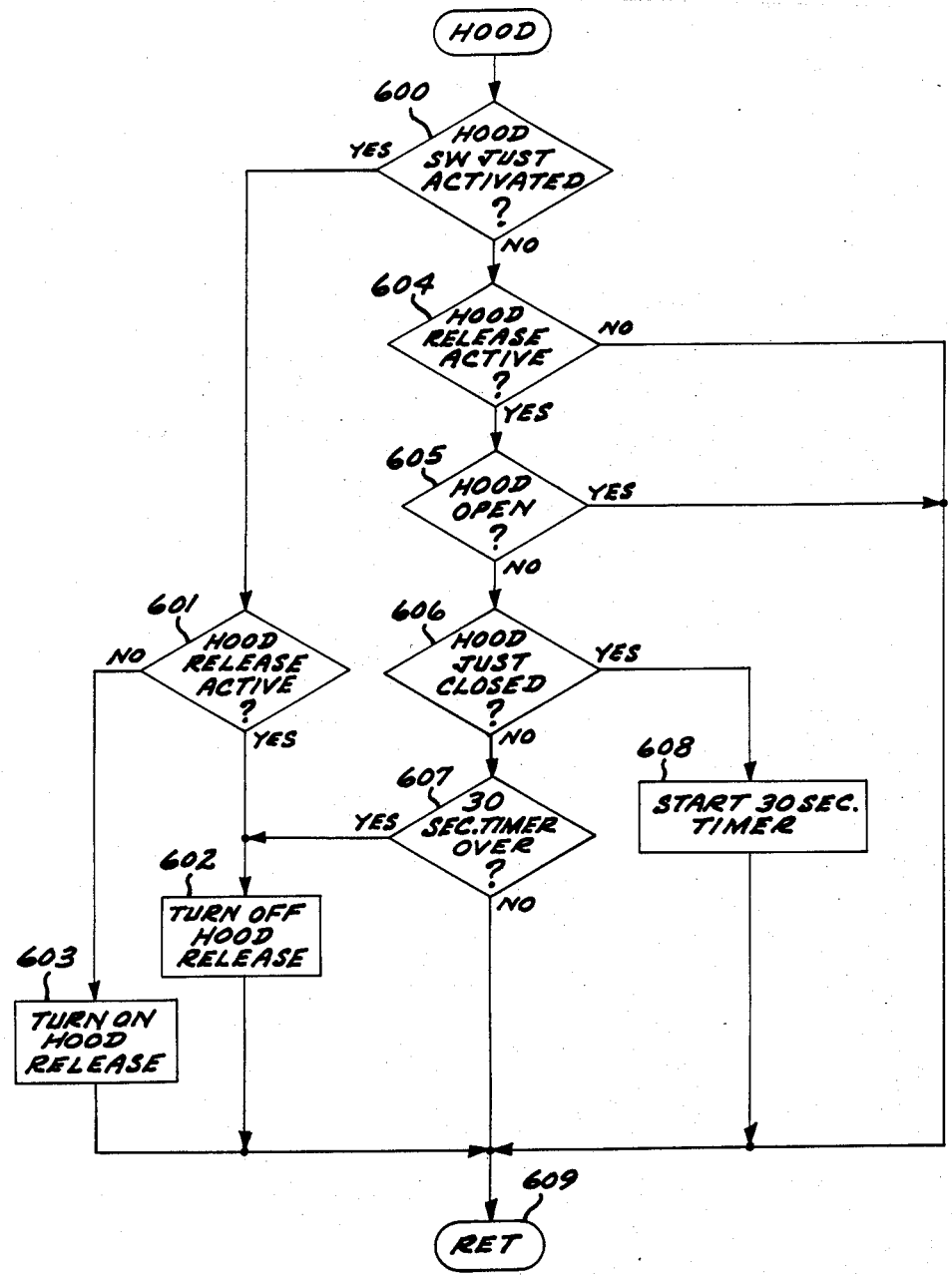

The HOOD subroutine is shown in FIG. 16B. At step 600, the status of the "hood" program switch (one of switches 77) is interrogated to determine whether the hood switch was just activated since the last pass through the subroutine. If yes, then the status of the hood release controlled device 96 is checked to see whether it is active (step 601). If active, it is turned off (step 602); if not active, the hood release device is turned on (step 603). Operation then returns. If the hood switch was not just activated (step 600), operation returns via step 604 if the hood release device is not active. If the hood release is active (step 604), the hood sensor is checked (step 605), and if open, operation returns. If not open, the determination is made at step 606 if the hood was closed since the last pass through the subroutine. If it was, a 30-second timer is started, and operation returns. If not, then at step 607, the 30 second timer is checked to determine whether it has timed out. If so, the hood release device is turned off, locking the hood, and operation then returns to step 582.

Figure 16C:
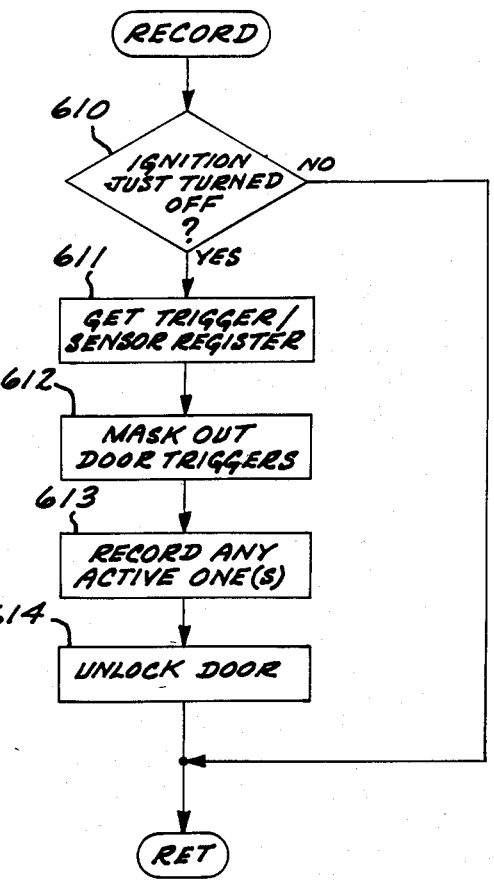

The RECORD subroutine is shown in FIG. 16C. The purpose of this routine is to record in the trigger/sensor register comprising the controller 70 any active triggers or sensors. Thus, at step 610, the ignition switch is checked to determine whether it was turned off since the last pass through the subroutine. If not, then operation returns. If so, then the contents of the trigger/sensor register maintained by the controller are accessed (step 611), and the door triggers are masked out at step 612. Then any active sensor or triggers, excepting the masked door triggers, are recorded in the register (step 613). The doors are unlocked (step 614) and operation then returns to step 594.

Figure 16E:
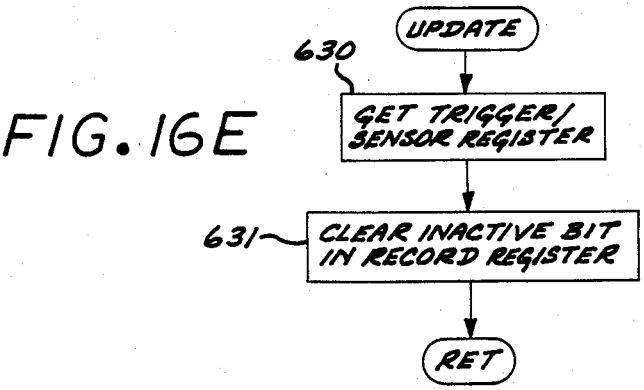
Figure 16D:
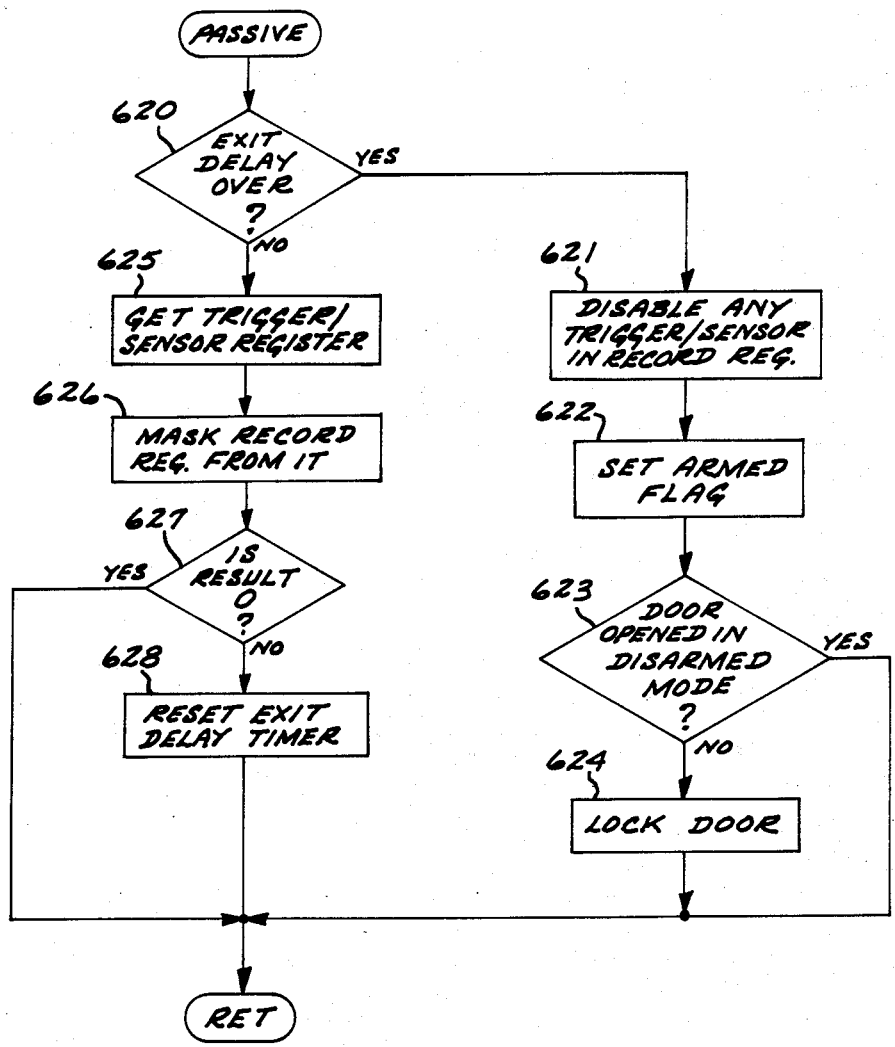

At step 594 of FIG. 16A, the door triggers are checked to determine whether the doors have been opened and closed. If not, operation proceeds to the UPDATE routine (FIG. 16E). Otherwise operation proceeds to the PASSIVE routine (FIG. 16D). In the latter routine, the exit delay timer is checked at step 620 to determine whether the exit delay is over. If it is, then at step 621, any triggers or sensors recorded in the trigger/sensor register are disabled, and at step 622 the ARMED flag is set. A determination is made as to whether the door was opened during the disarmed mode. If so, operation returns. If not, the door lock device 94 is activated to lock the doors (step 624). If the exit delay is not over (step 620), then at step 625 the contents of the trigger/sensor register are fetched, and at step 626 the contents of the "record" register are masked from the trigger/sensor register contents. If the result is a blank register, then the routine returns. Otherwise, the exit delay timer is reset before returning.

The UPDATE subroutine is illustrated in FIG. 16E. The purpose of this subroutine is to clear any bit in the record register that is inactive as illustrated in steps 630 and 631 in FIG. 16E.

The ARMED function 414 (FIG. 11) is illustrated in FIGS. 17A–F. The first step 640 (FIG. 17A) of this function is to determine the status of the triggers and sensors. At step 642, any sensors or triggers previously identified as disabled are masked out. The next steps 643–46 are to execute the subroutines DOOR, ENTRY, SENSOR and OTHER TRIGS which are shown in FIGS. 17B–E, so as to determine which active trigger or sensor elements should result in activating the alarm controlled elements. At step 647, the TRIPPED flag is checked, and if set, the SHUT OFF subroutine (FIG. 17F) is executed. Otherwise, the trip counter is reset (step 649) to 10. The purpose of the trip counter is to prevent alarms from continuing after ten successive passes due to the same trigger or sensor being active. This prevents noise pollution and conserves the vehicle battery. Operation then returns to the main loop.

Figure 17A:
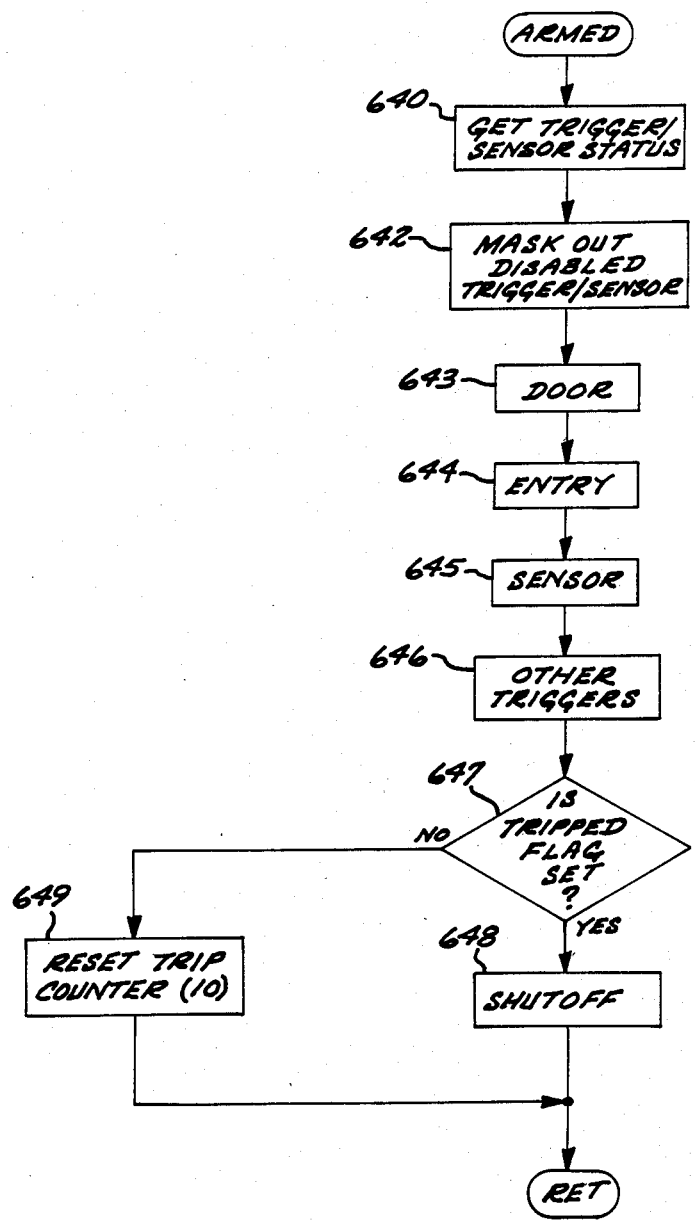
Figure 17B:
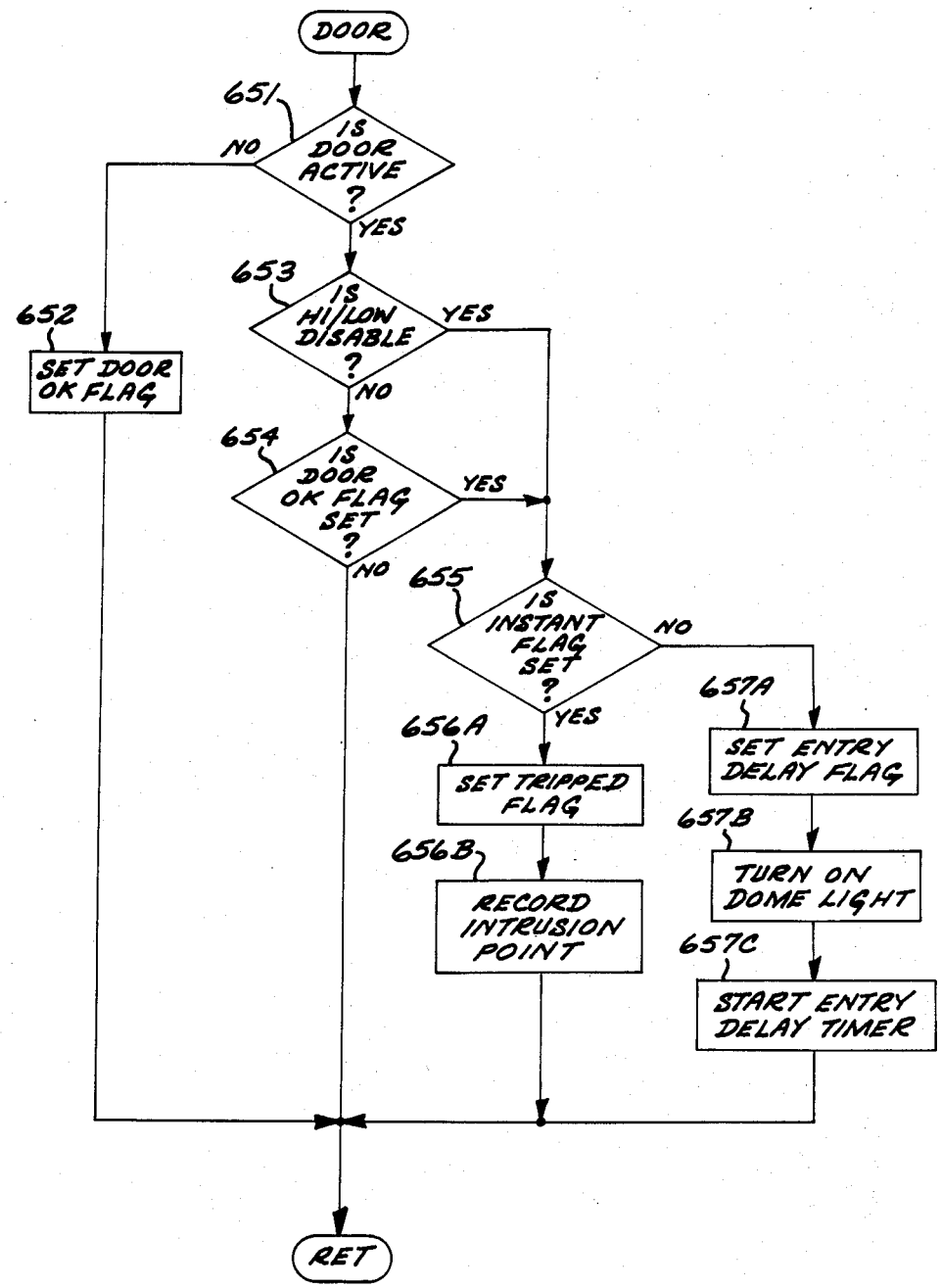
Figure 17F:
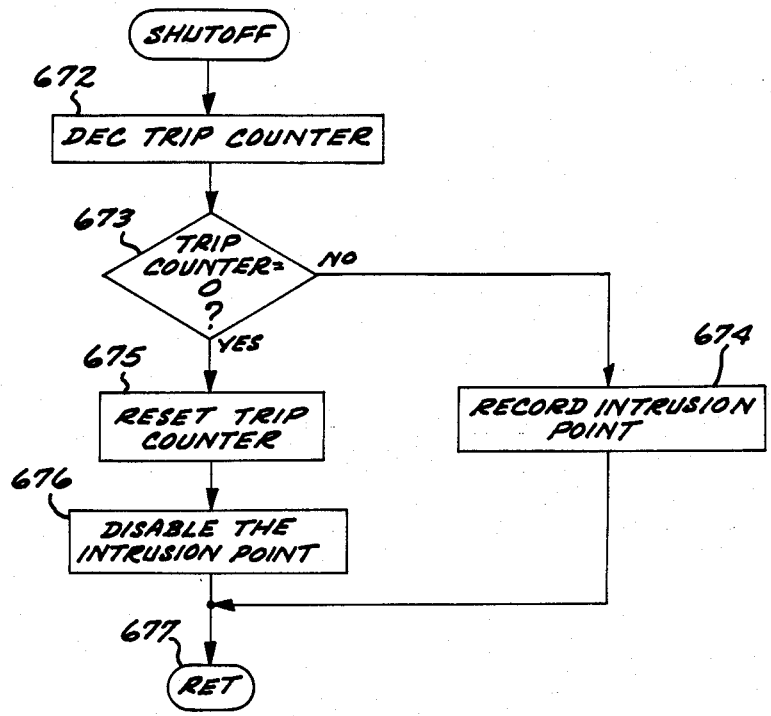

Referring now to FIG. 17B, the DOOR subroutine is depicted. The door triggers are checked at step 651, and if not active (i.e., the door are closed), then the DOOR OK flag is set (step 652) and operation proceeds to the ENTRY subroutine. If a door trigger is active, then if the "HI/LO" feature is not disabled, the DOOR OK flag is checked. If not set, operation proceeds to the ENTRY subroutine. If the "HI/LO" feature is disabled, or if the DOOR OK flag is set, then the INSTANT flag is checked (step 655), and if set, the door trigger active status is interpreted as an alarm condition, the TRIP flag is set (step 656A) and the intrusion point is recorded (step 656B) before proceeding to the ENTRY subroutine. If the INSTANT flag is not set, then at step 657A, the ENTRY DELAY flag is set, the dome light is turned on at step 657B, and the entry delay timer is started at step 657C.

The ENTRY subroutine is shown in FIG. 17C. The ENTRY DELAY flag is checked (step 658), and if not set, operation proceeds to the SENSOR subroutine. If the flag is set and if the entry delay timer state is "0." then the TRIPPED flag will be set. Operation otherwise proceeds to the SENSOR subroutine.

The first step 661 of the SENSOR subroutine (FIG. 17D) is to check the five-second timer initiated when the system was armed. If the timer has not timed out, the sensor lines or bits are masked out (step 662) and operation proceeds to the OTHER TRIGS subroutine (FIG. 17E). If the timer has reached zero, then the sensor lines are checked (step 663), and if none are active, operation proceeds to the OTHER TRIGS subroutine. If a sensor is active, the TRIPPED flag is set (step 664), and operation proceeds to the OTHER TRIGS subroutine.

In the OTHER TRIGS subroutine (FIG. 17D), the triggers other than the door triggers are checked. If none are active, operation proceeds to step 647 (FIG. 17A). If any other triggers are active, the TRIPPED flag is set at step 668, and operation proceeds to step 647.

The SHUTOFF subroutine (FIG. 17F) is entered if the TRIPPED flag has been set. Here, the trip counter is decremented (step 672) and if its state is not zero, the intrusion point is recorded (step 674), and operation returns to the main loop. If the trip counter has reached zero, it is reset (step 675), the intrusion point trigger or sensor is disabled, and operation returns to the main loop. Thus, once the trip counter reaches its zero state, an alarm will not be generated as a result of the active trigger or sensor device on the next pass through the main loop.

Figure 18A:
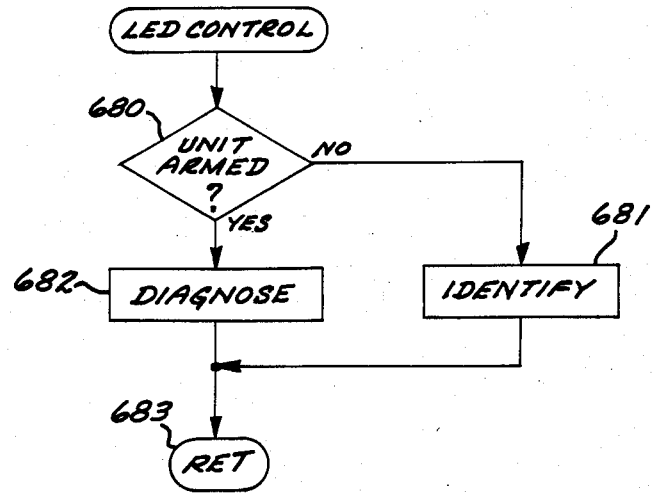
Figure 18B:
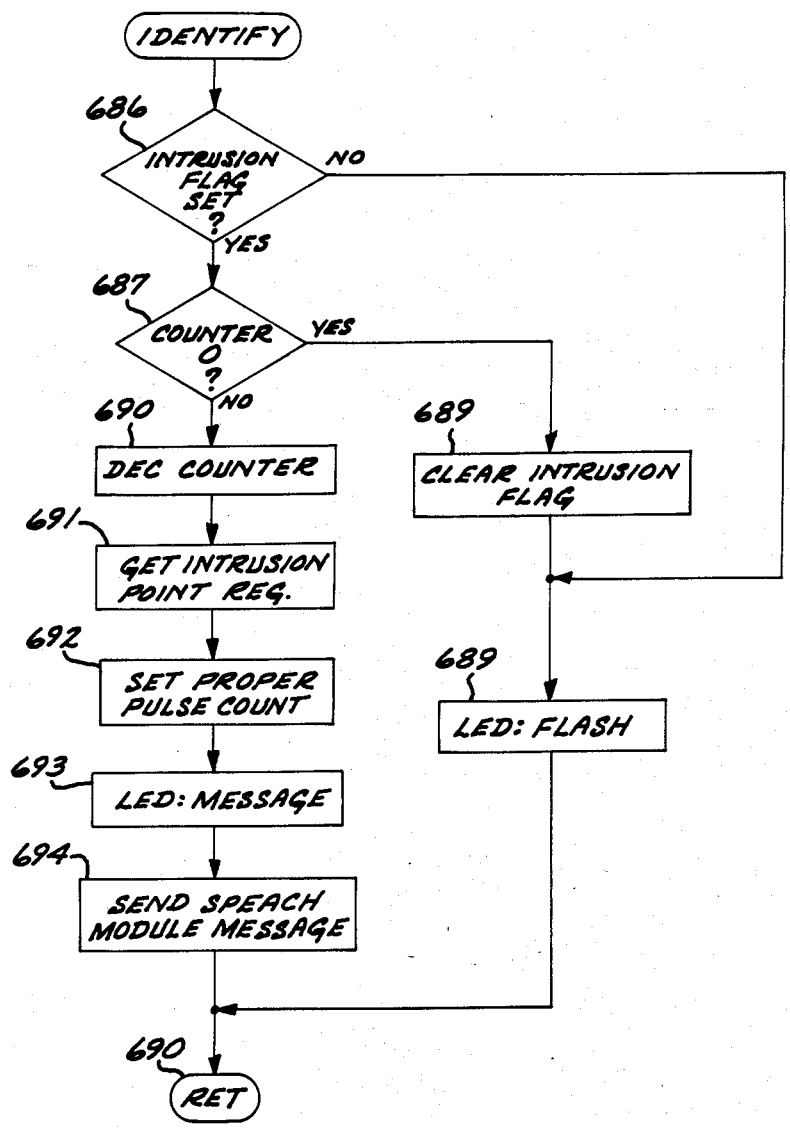
Figure 18C:
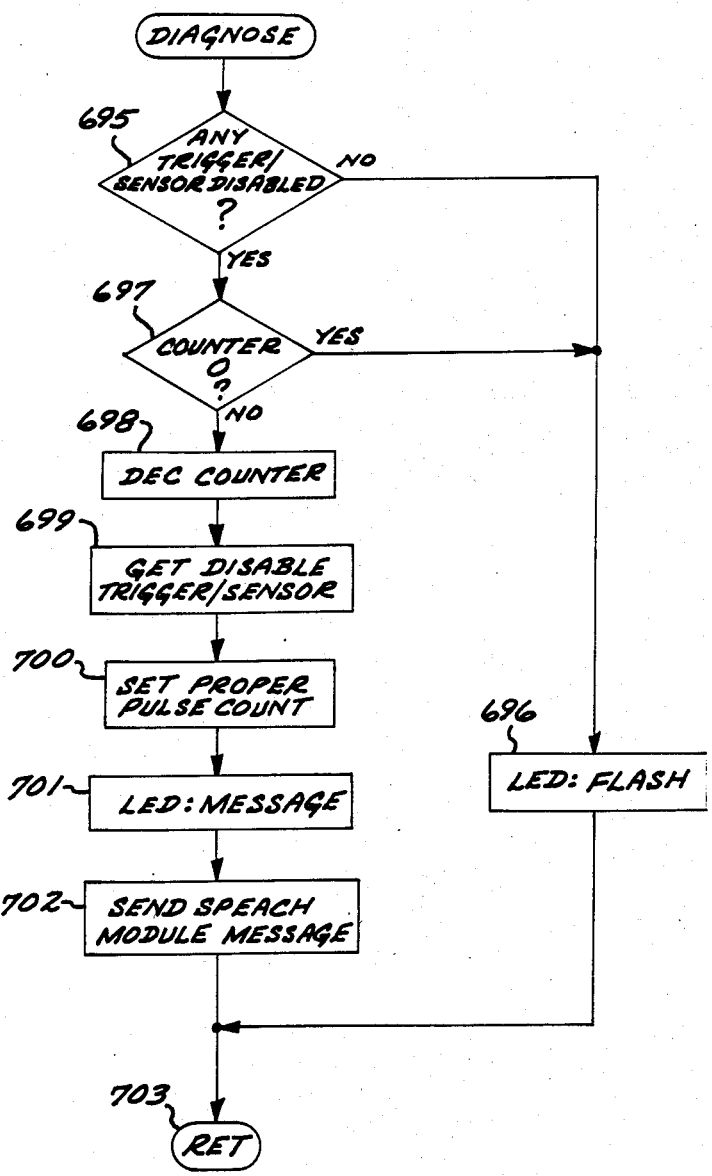

The LED CONTROL function (step 420 of FIG. 11) is shown in further detail in FIGS. 18A-C. At step 680 (FIG. 18A), the ARMED flag is checked to determine whether the system is in the armed mode. If not armed, the IDENTIFY subroutine is entered at step 681. Otherwise, the DIAGNOSE subroutine is entered at step 682 and thereafter operation returns to the main loop.

The IDENTIFY subroutine is shown in FIG. 18B. At step 686, the controller determines whether an intrusion was attempted while the system was armed. If not, then the green LED is flashed (step 689) and operation returns to the main loop. If an intrusion was attempted, then at step 687, the message counter is checked, and if zero, the INTRUSION flag is cleared (step 689), the green LED is flashed, and operation returns to the main loop. If the counter is not zero, then it is decremented (step 690). At step 691 the point of intrusion is established by reading the flags associated with the activated triggers and sensors stored in the register. The proper LED pulse count corresponding to the intrusion point is set (step 692), and at step 693, the appropriate LEDs are turned on. At step 694 the voice synthesizer is activated to announce audibly the intrusion point. It will be appreciated that the voice synthesizer is programmed to provide a plurality of messages, and that a particular message may be chosen and activated in correspondence to a particular control signal from the controller 70. Such a selection may be accomplished by a look-up table function, as where a particular intrusion point code selects the appropriate message. Voice synthesizers are known in the art having the capability of generating a selected one of a plurality of stored messages. Operation then returns to the main loop.

The DIAGNOSE subroutine is shown in FIG. 18C. At step 695, the controller determines whether there is a disabled trigger or sensor. If not, at step 696, a red LED is flashed, and operation then returns to the main loop. If a sensor or trigger is disabled, then the message counter is checked (step 697), and if "0," the LED is flashed, and operation returns. Otherwise, the counter is decremented (step 698), the data defining the disabled trigger or sensor is obtained (step 699), the proper pulse counter corresponding to the particular disabled sensor or trigger is set (step 700), and visible and audible messages identifying the disabled element are generated at steps 701 and 702 by the LED and voice synthesizer.

The ENTER PROG function (step 426 of FIG. 11) is shown in further detail in FIGS. 19A-L. At step 705, the 5 second program qualify timer (started at step 586, FIG. 16A) is checked. If its state has reached "0," operation returns to the main loop. If the counter has not reached "0," then the program "valet" switch is checked, and if toggled within one second, the PROGRAM MODE (FIGS. 19B-L) is entered at step 707.

Figure 19A:
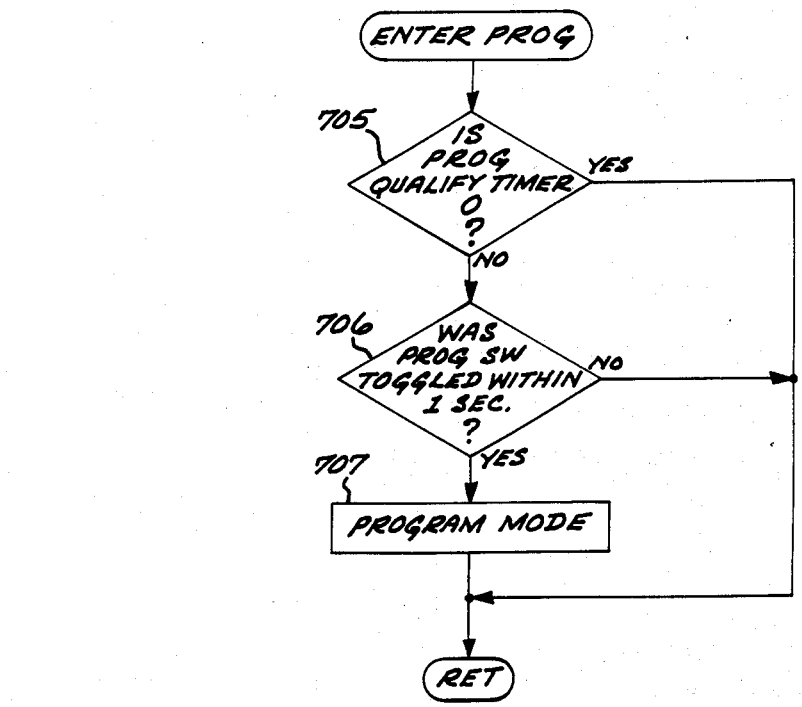
Figure 19B:
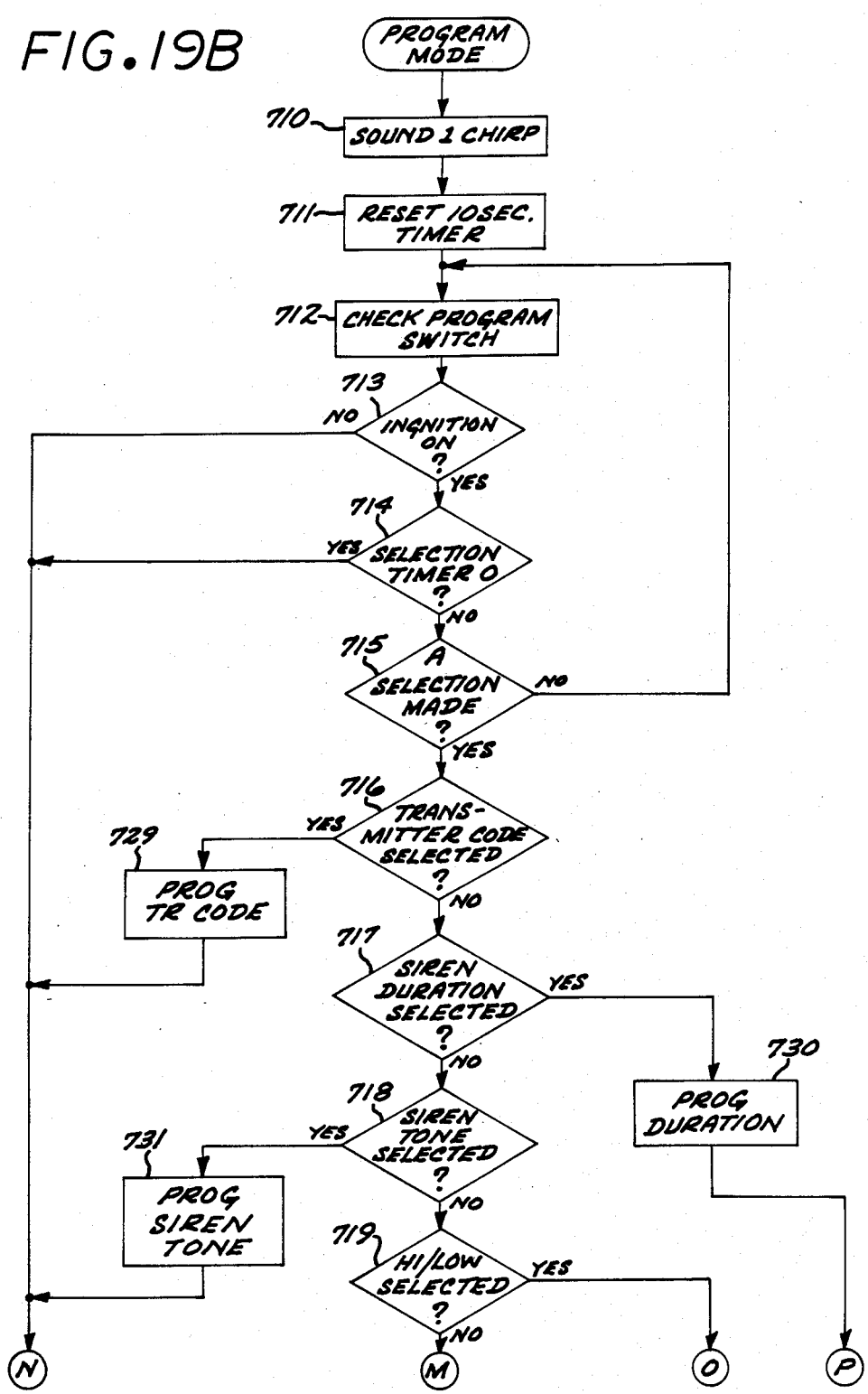
Figure 19C:
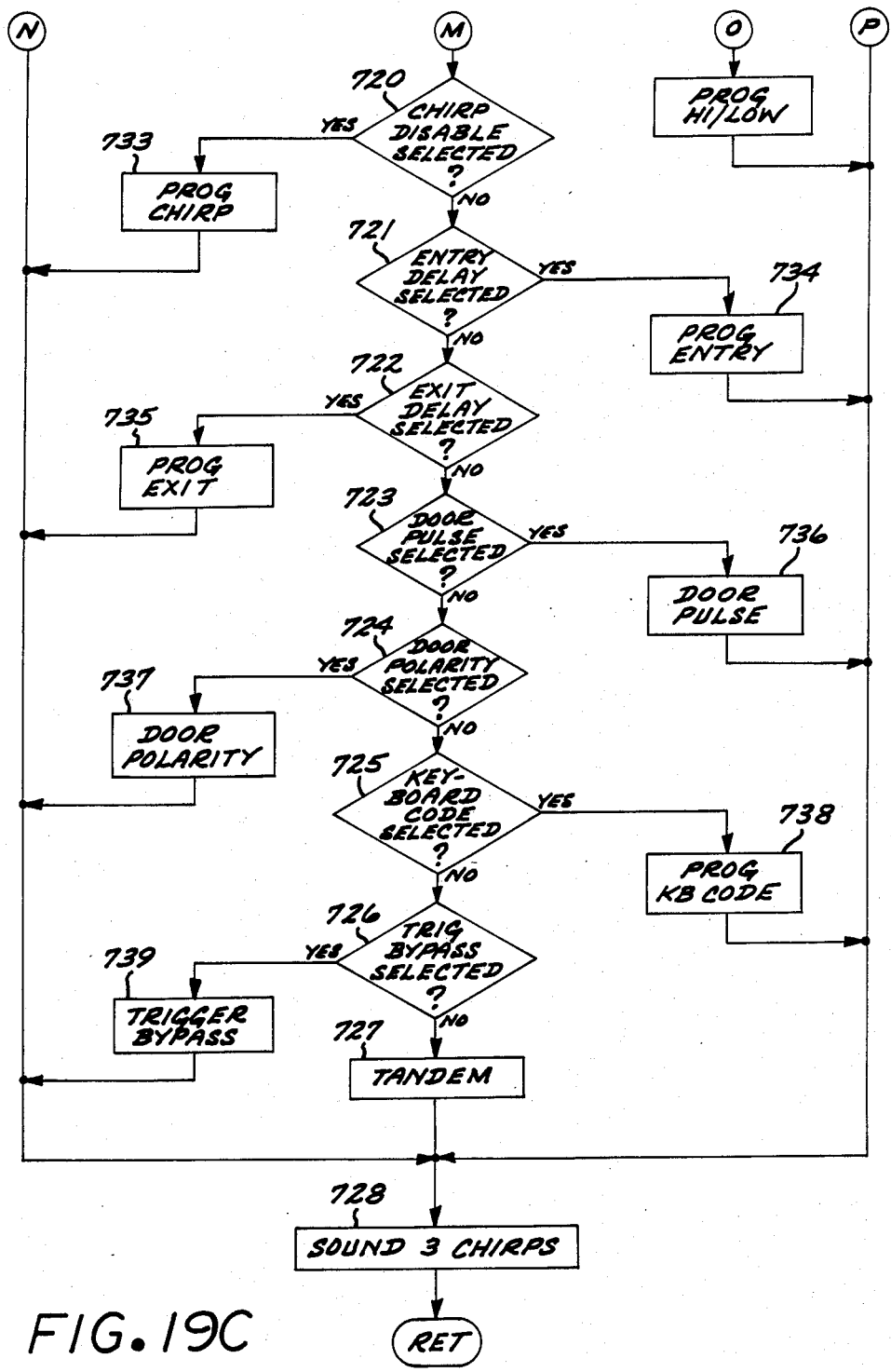
Figure 19D:
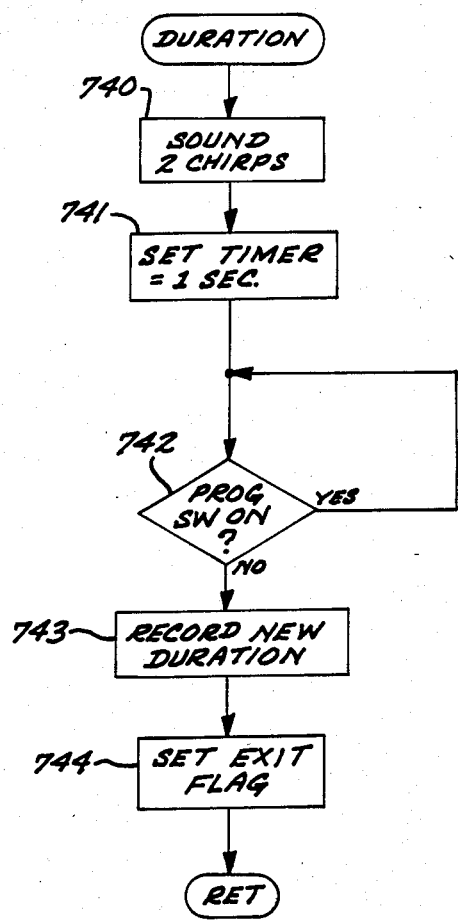

The PROGRAM MODE subroutine 426 is illustrated in further detail in FIGS. 19A-L. The overall module is illustrated in FIG. 19B-C. Upon entering the module, the system sounds a chirp to signal to the user that the program mode has been entered (step 710), and at step 711, a ten-second timer is reset. The program switch is interrogated at 712. The program switch is toggled by the user to select a particular programming option. By way of example, toggling the switch three times may result in selecting the siren duration programming option. Other means for making a programming option selection may be employed, such as using a key pad to enter a predetermined code. The ignition switch must be on in this embodiment to perform any programming, and, if the ignition switch is not on (step 713), operation return to the main loop. The selection timer is checked to determine whether it has timed out (step 714), and if so, operation returns to the main loop. If the timer is not zero, then a determination is made whether a programming selection has been made via the program switch. If not, then operation loops back to step 712, until the timer expires. Once a selection is made, then the remainder of the subroutine comprises executing the selected programmable option. Thus, steps 716-726 consist of determining whether particular programmable options were selected. The selected option is then programmed via the appropriate one of the programming subroutines set forth in 727 and 729-739.

The first programming option indicated in FIGS. 19A-B is the TRANSMITTER CODE option (step 729) which enables the system to program a new transmitter authorization code. This feature is described more fully in the co-pending application, Ser. No. 094,395, described above.

The SIREN DURATION programmable option (step 730) allows the user to program the length of each siren alarm interval, for any length from 1 to 255 seconds. At step 740 (FIG. 19D), the system sounds two chirps alerting the user that the programming option has been selected. A siren duration timer is set to one second (step 741), and at step 742, the operation loops with the timer running, until the program switch is no longer in the position. At that point, the new duration value, i.e., the timer state, is recorded. The EXIT flag is set at step 744, and operation returns.

Figure 19E:
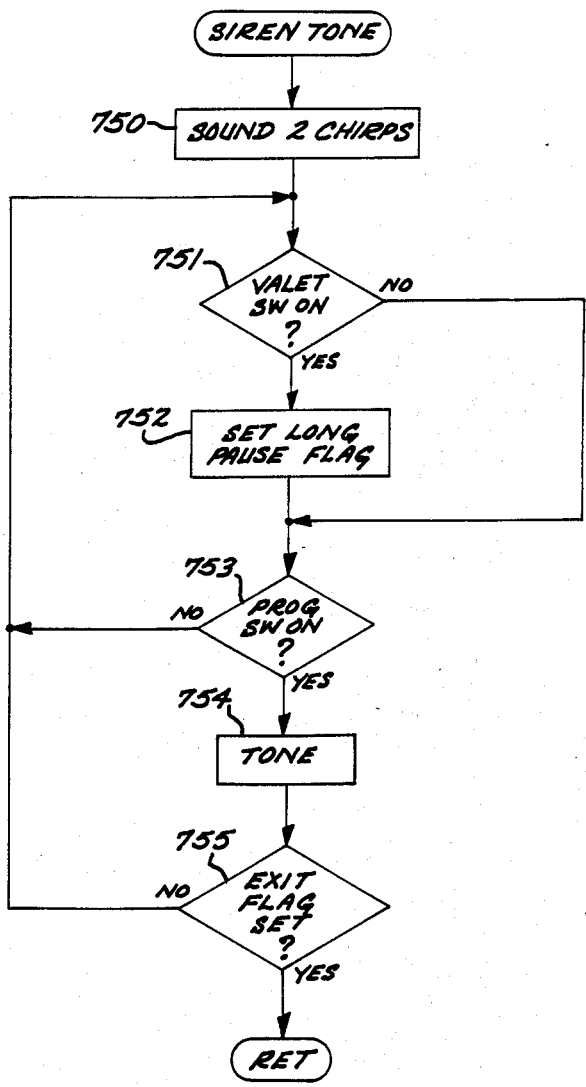
Figure 19F:
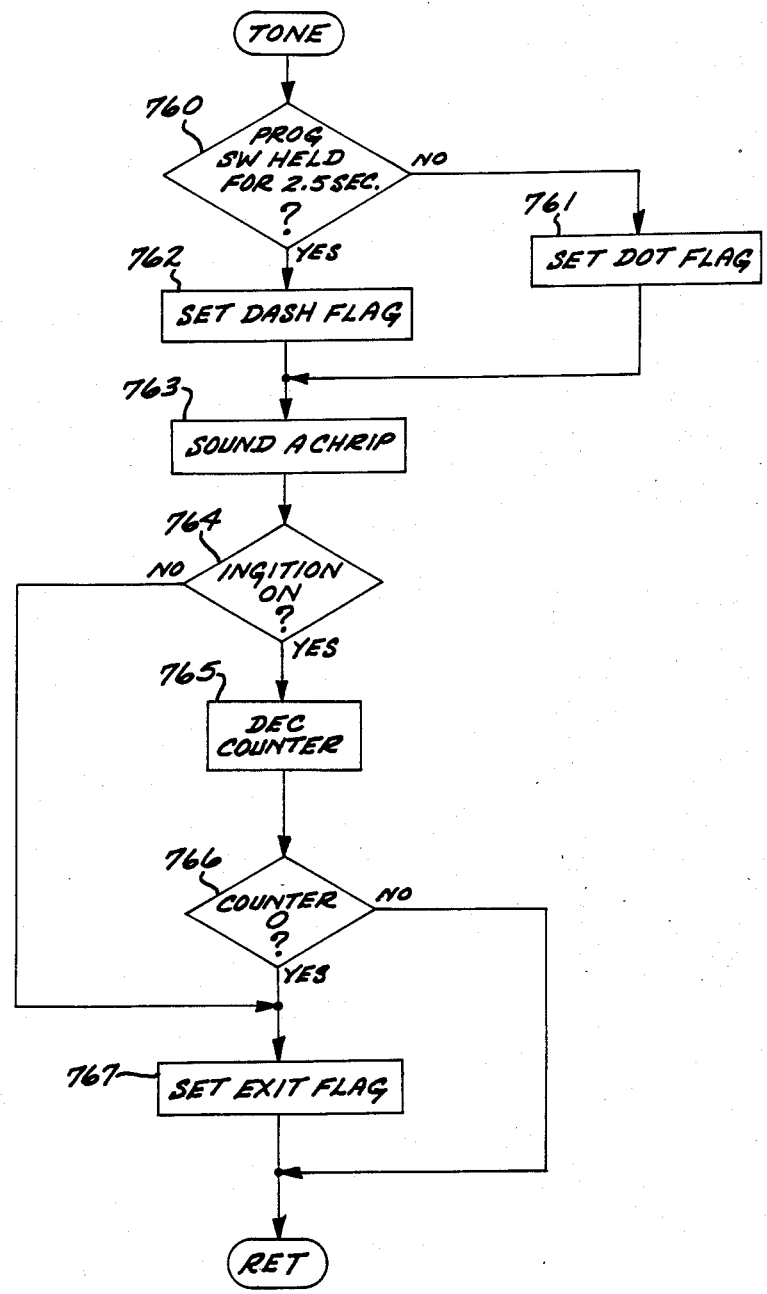

The SIRENTONE programmable option (step 731) is illustrated in further detail in FIG. 19E-F. The purpose of this module is to enable the user to program the system with a personalized siren code so that in the event of an alarm, the user may determine from a distance whether the audible alarm is emanating from his vehicle, and not from another vehicle, as for example, in the case where the vehicle is parked in a crowded parking lot or structure. At step 750, the system sounds two chirps. At step 751, the program "valet" switch is checked to determine whether it is in the "on" position. If so, then at step 752 the LONG PAUSE flag is set. Otherwise the operation branches to step 753, where the program switch is checked. If it is not on, then the operation loops back to step 751. If the program switch is on, ten at step 753, the TONE subroutine is entered (FIG. 19E). At step 755, the exit flag is checked, and if not set, operation loops back to step 751. If the exit flag is set, then operation returns to step 728.

The TONE subroutine (FIG. 19E) commences with a check of the program switch to determine whether it was held for 2.5 seconds (step 760). If not, then at step 761 the DOT flag is set. Otherwise, the DASH flag is set at step 762. At step 763 the system sounds a chirp, and at step 714 the ignition switch is checked. If it is on, then the counter is decremented at step 765. At step 766 the counter state is checked for the zero state and if not zero, the operation returns to step 755. If the ignition switch was not on at step 753, then the exit flag is set at step 767, and operation returns to step 755. This allows the user to program a personalized siren code made up of "dots" and "dashes."

The next programmable option is the HI/LO option (step 732). This feature allows the system installer to connect the door trigger line to the vehicle interior courtesy light switch, instead of a specially installed door trigger. This option per se forms no part of the present invention.

Figure 19G:
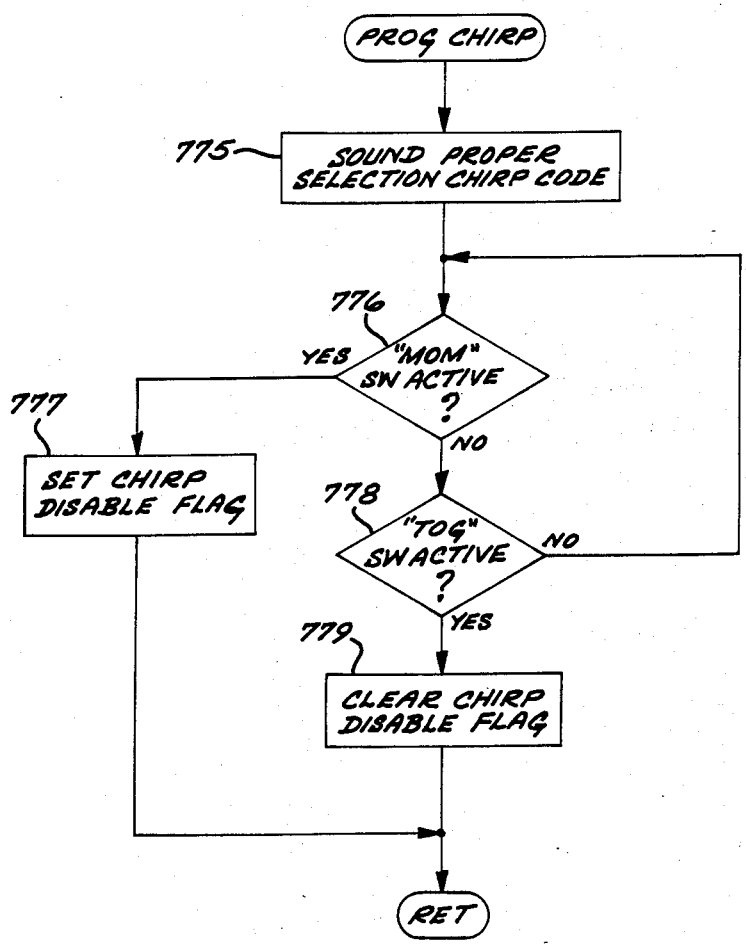

The next programmable option (step 733) is the PROG CHIRP option, shown in FIG. 19G. This option allows the system user to selectively disable the audible chirps which are sounded when the system is armed or disarmed. At step 775, the system sounds an appropriate selection chirp code, uniquely signifying that this option has been selected. At step 776, the momentary program switch is interrogated, and if active, the CHIRP DISABLE flag is set (step 777). If the momentary program switch is not active, then at the toggle program switch is interrogated. If it is not active, operation loops back to step 776. If the toggle program switch is active, then the CHIRP DISABLE flag is cleared (step 779).

The next programmable option is the PROG ENTRY option (step 734). This option enables the system user to program the entry timer duration, i.e., the time duration between opening the vehicle door and the entry of an appropriate code to disable the alarm. A similar programmable option is the PROG EXIT option (step 735). This option enables the system user to program the duration of the exit delay, i.e., the time between actively initiating the arming of the system by closing the last vehicle door, and the actual arming of the system. This delay gives the user time to exit the vehicle and to close the vehicle doors without triggering the alarm. The PROG ENTRY and PROG EXIT features per se form no part of this invention.

Figure 19H:
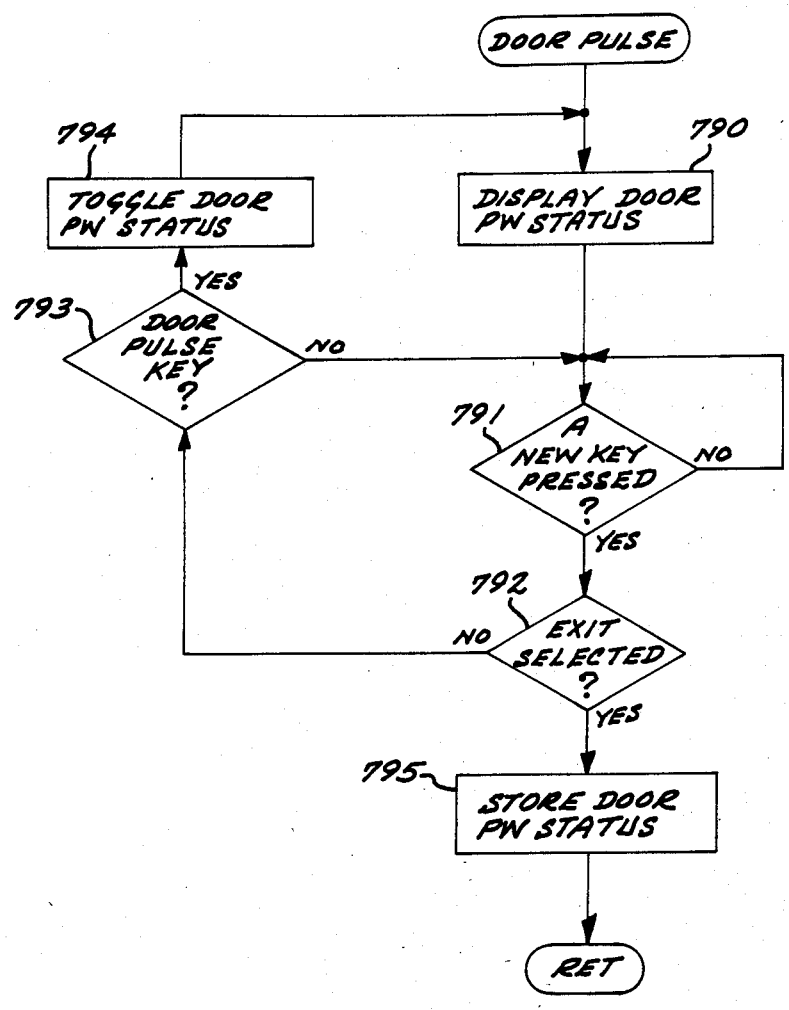

The next programmable option is the DOOR PULSE option (step 736) shown in FIG. 19H. The purpose of this option is to enable the installer of the system to select the duration of the door lock and unlock controlled signals. In general, vehicle power door locking systems are actuated by either a one second or a three second pulse, depending on the vehicle manufacturer. In the past, alarm systems have required the use of an interface module to actuate the door locking system because of the two types of signals. With the invention, the system installer programs the system to provide the pulse width required for the particular vehicle. Thus, at step 790, the door pulse width status is displayed, e.g., by activating a dedicated LED if the present status is to generate the long pulse, or not activating the status LED if the short pulse is selected. At step 791, the operation loops until new keys have been selected. If the new key is the key needed to exit this programmable option, then the door pulse width status is stored in the controller memory (step 795), and operation returns. If the new key selected is the door pulse key, then the pulse width status is toggled (step 794) and operation return to step 790. The result is that the controller 70 will activate the appropriate output control line for the "door lock" and "door unlock" functions when appropriate for the selected time duration, here either one or three seconds.

Figure 19I:
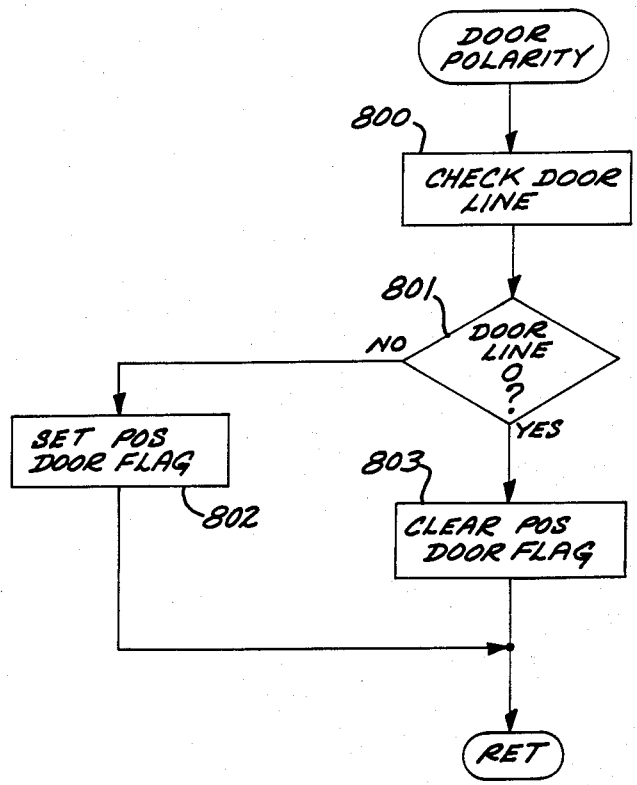

The next programmable option is the DOOR POLARITY option (step 737), shown in FIG. 19I. This allows the system to be programmably adapted to a door trigger device having either positive or negative polarity. Thus, with the driver's door opened, thereby activating the door trigger, the controller checks the door trigger line (step 800), and if low or "0," the positive POS DOOR flag is cleared (step 803); otherwise, the positive POS DOOR flag is set (step 802). This allows the installer to connect the door trigger to a predetermined terminal of the input buffer 80 without regard to the particular polarity of the trigger, thereby simplifying the installation.

Figure 19J:
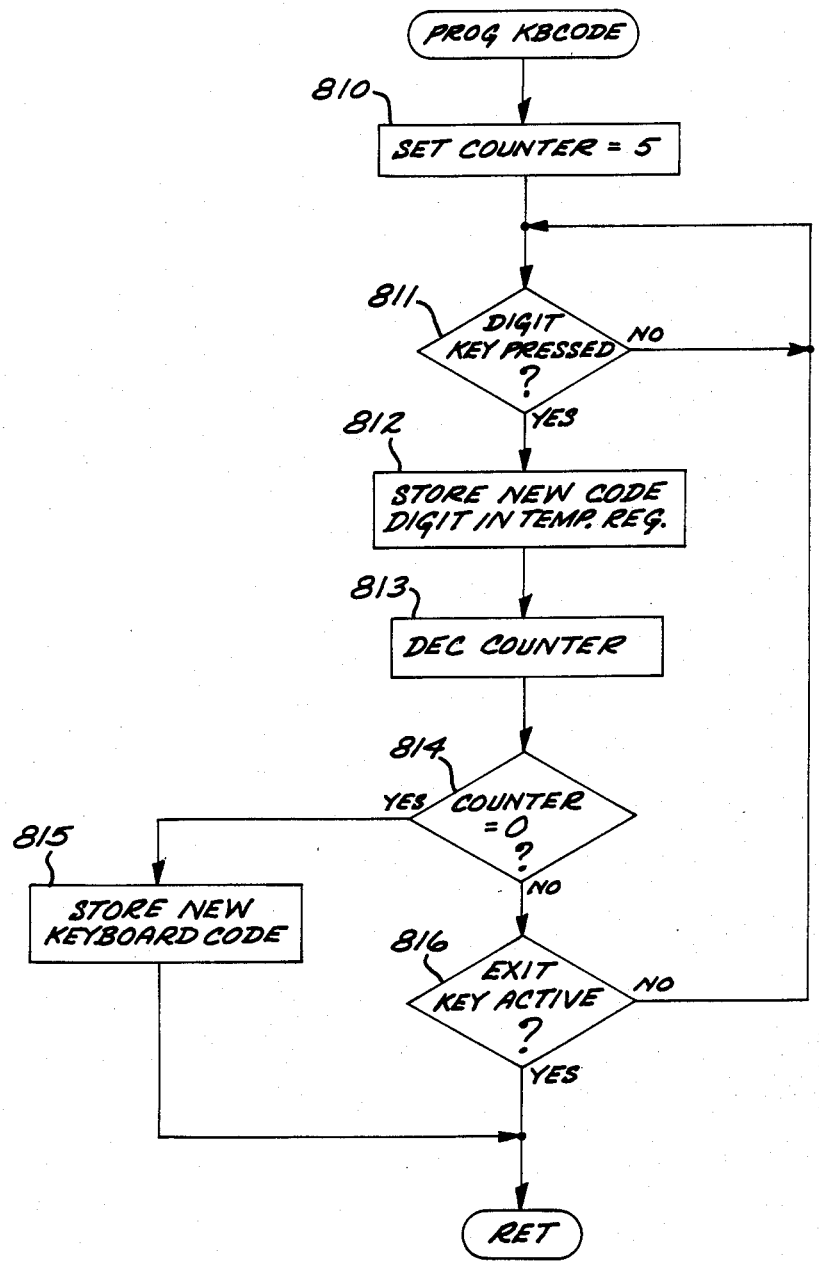

The next programmable option is the PROG KBCODE option (step 738), shown in FIG. 19J. This option enables the system user to program a new user authorization code into the system via the key pad. For the sake of example, the user authorization code bit length is 5 bits. Then, at step 810, the code bit length counter is set to 5, and if a digit key on the keypad is pressed (step 811), this new code digit is stored in a temporary register (step 812). The counter is decremented at step 813, and f the resulting counter state is not "0" (step 814), and the exit key for exiting this option is not active (step 816), the operation loops back to step 811. If the counter has reached the "0" state, indicating that a complete code word has been entered (step 814), the new code is stored in memory (step 815) and operation returns (FIG. 19B).

Figure 19K:
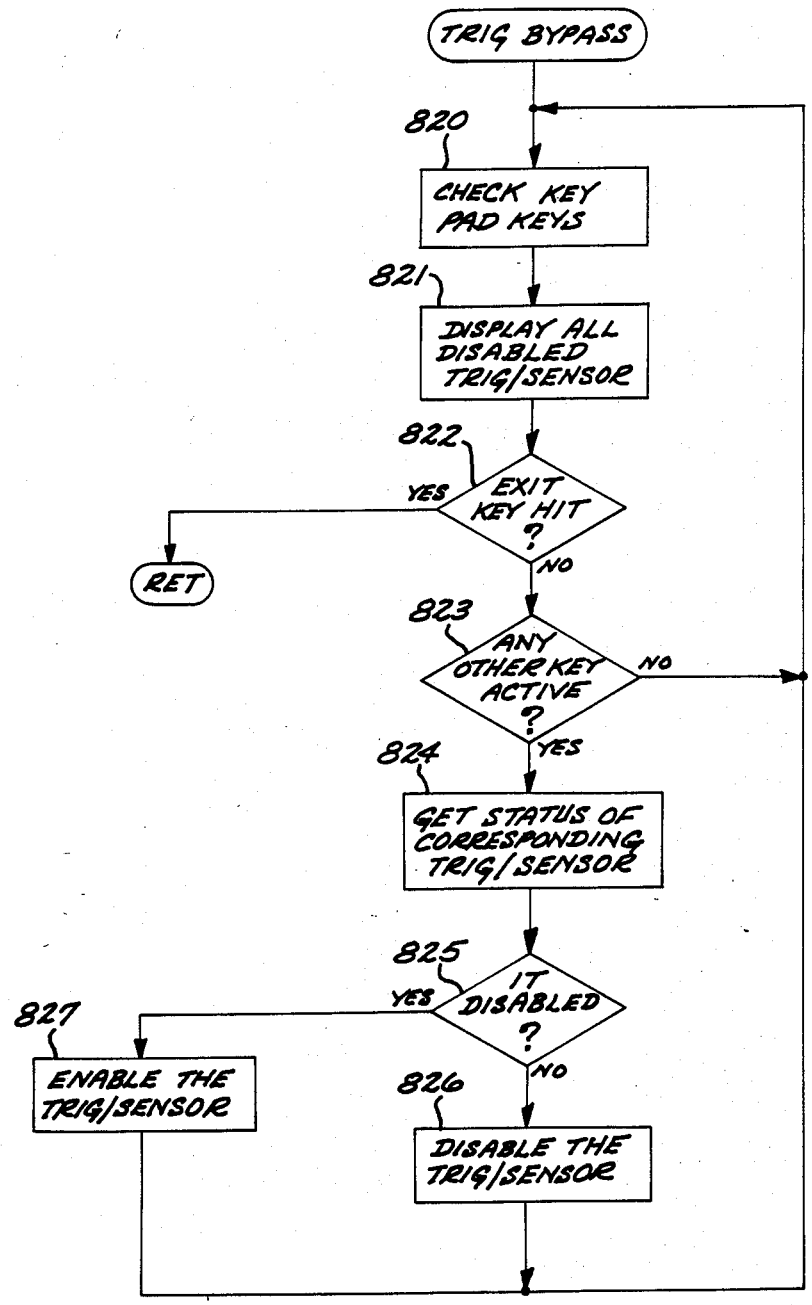

The next programmable option is the TRIG BYPASS option (step 739), shown in FIG. 19K. This option enables the system user to selectively bypass defective sensor or triggers, thereby allowing the system to be used even though one or more triggers or sensors may be defective. Thus, the sensors and triggers may be either selectively bypassed by the user, or automatically bypassed, as discussed above. At step 820 the key pad keys are interrogated. All disabled triggers and sensors are visually displayed, e.g., by utilizing the appropriate key pad LED. If the key for exiting this option is activated at step 822, operation returns. Otherwise, if there are no other active keys, operation loops back to step 820. If there are active keys, then at step 824, the enabled/disabled status of the trigger or sensor corresponding to the active key is obtained. If that trigger or sensor is disabled, its status is changed to the enabled state (step 827). If the particular trigger or sensor is not disabled, then its status will be changed to the disabled state (step 826).

Figure 19L:
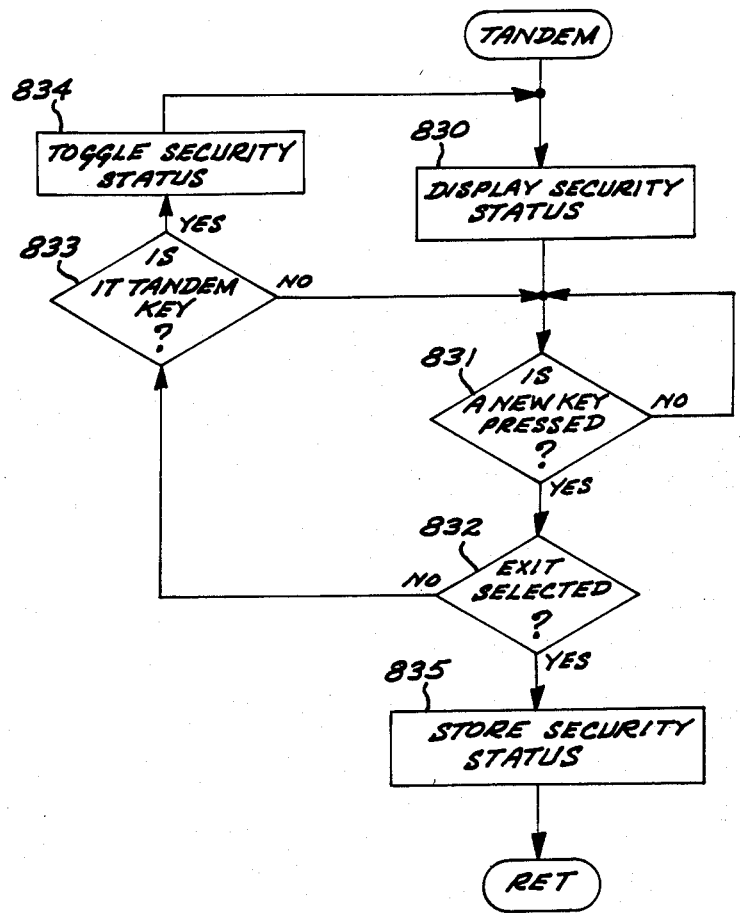

The final programmable option for this embodiment is the TANDEM option (step 727), shown in FIG. 19L. This provides the user with the capability of selecting the level of security provided by the system, in that the user selects the disarming functions required as either (1) entry of the authorization code via the transmitter, or (2) entry of the authorization code via the transmitter and subsequent manual entry of the authorization code via the keypad. Thus, access to the vehicle or secured area when the latter alternative is selected requires that the user have the transmitter and also know the key pad authorization code. Once the programmable option is selected, the present security status is displayed (step 830), i.e., whether or not the tandem disarming functions are selected. The display may be via a dedicated LED which is activated only if the "tandem" security mode has been selected. The operation then essentially "waits" until a new keypad key is selected. If the new key is that key for exiting the option, then the security status is stored and operation returns. If the new key is the key for changing the security status (step 833), then the security status is toggled (step 834), and operation returns to step 830.

The system sounds three chirps at step 728, indicate to the user that the PROGRAM MODE has been exited. Operation then returns to the main loop.

The BATTERY CHECK function module is shown in FIG. 20. This module prevents the system from draining the battery when an alarm condition is detected. Thus, at step 840, the error signal from the 5 volt power supply (node E, FIG. 6) is tested to determine whether it is active, signifying that the 5 volt supply is not available, and if so, the tripped flag is cleared and the operation returns to the main loop. Thus, no matter what the condition of the system, the low battery voltage results in clearing the alarm status.

The DOME LIGHT function module is shown in FIG. 21. The purpose of this module is to provide the capability of turning the vehicle courtesy light on and leaving it on for a predetermined period of time after the system has been disarmed. At step 845, the dome light output line of the controller is checked, and if not on, then at step 846 the controller determines whether the vehicle driver's door was just opened. If not, then operation returns to the main loop. If the door was just opened, then the dome timer is reset at step 847, and the dome light output is turned on by the controller at step 848. If at step 845, the dome output is on, then the ignition is checked at step 849, and if not on, then the dome timer is checked and if not zero, the operation returns to the main loop. Otherwise, the controller dome output is turned off (step 851).

Figure 22:
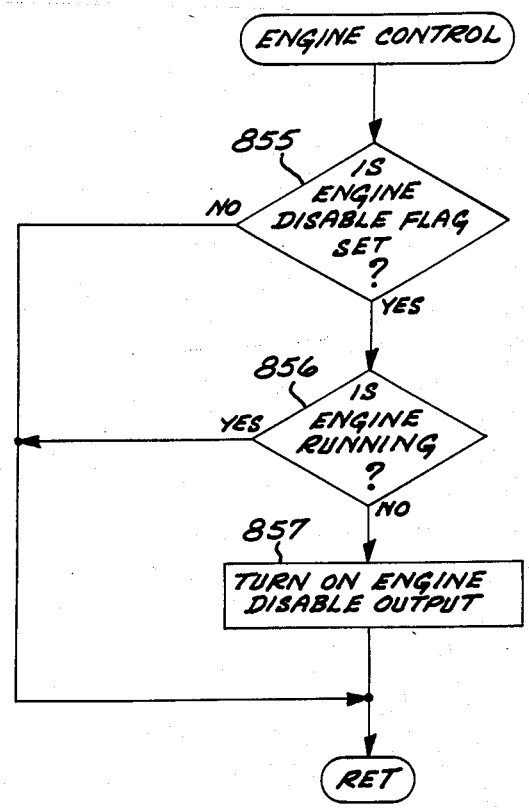

The next function performed during the main loop (FIG. 11) is the ENGINE CONTROL function (step 434), shown more fully in FIG. 22. This function allows the vehicle engine to be disabled from unauthorized starting. At step 855 the ENGINE DISABLE flag is checked, and if not set, operation returns to the main loop. If the flag is set, then at step 856, the ignition switch is checked to determine whether the engine is running. If it is running, operation returns to the main loop. If the engine is not running, then at step 857, the ENGINE DISABLE controller output is turned on. This is coupled to the engine, e.g., to a bypass relay on the engine starter, to disable the engine starting function. Thus, this function is only activated if the vehicle ignition is turned off, preventing a possible hazard arising from inadvertent ignition bypass when the vehicle is in operation.

Figure 23:
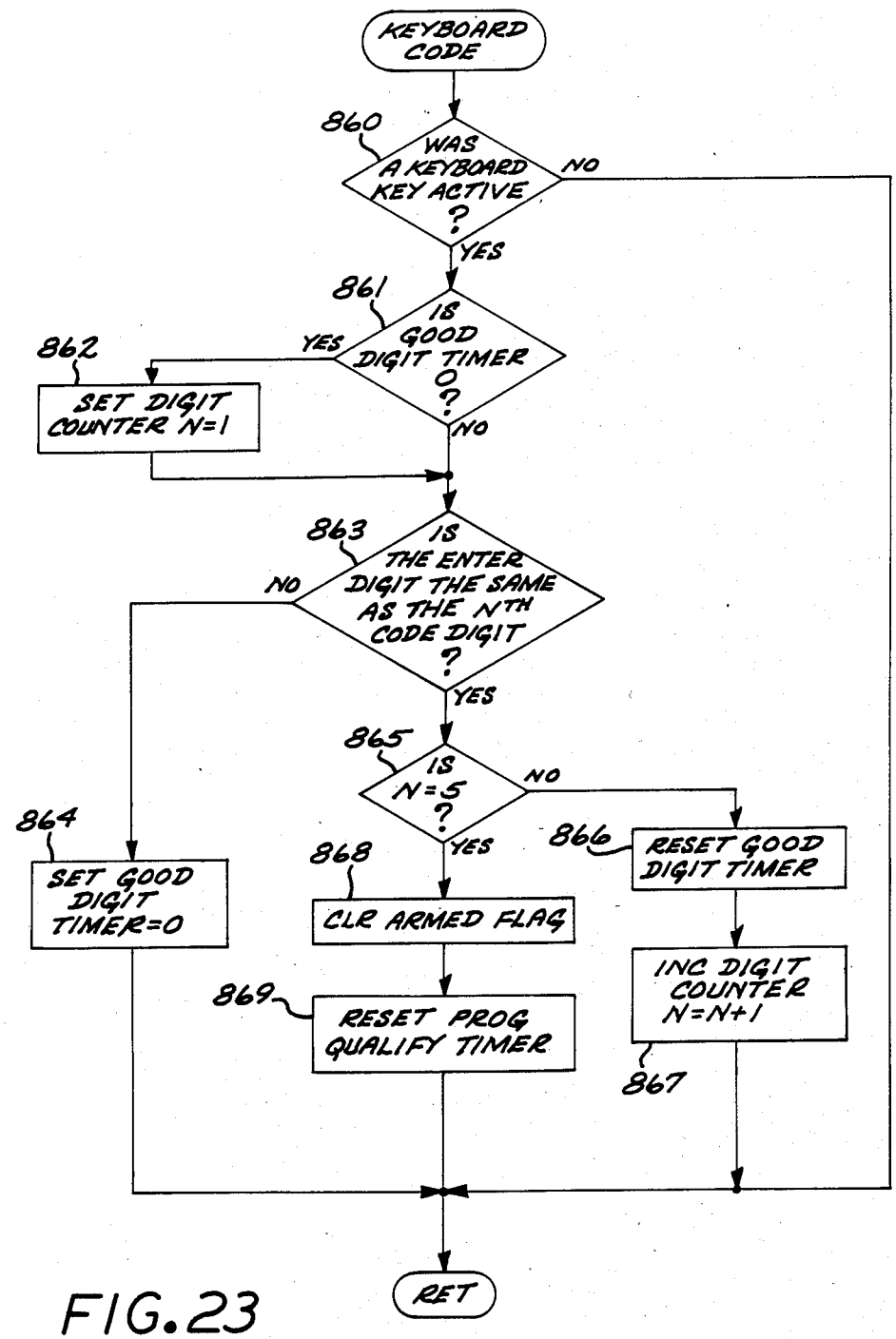

The KEYBOARD CODE function is shown in FIG. 23. IF a keyboard or key pad key is not determined to be actuated (step 860), operation returns to the main loop. If a key is activated, then the "good digit" time is checked (step 861). This timer requires that successive digits be entered within a predetermined time interval. If the timer is zero, the digit counter index is set to "1" (step 862). At step 863, the entered digit is compared with the Nth digit of the key pad authorization code. If the entered digit is not the same, the good digit timer is set to zero, and operation returns to the main loop. If the entered digit is the same as the Nth code digit, then at step 865, the counter is checked, and if not equal to the number of bits in the authorization code (here 5), the timer is reset (step 866), and the counter is incremented at step 867 before operation returns to the main loop. If, at step 865, the counter index equals the code length, then the ARMED flag is cleared (step 868) and the PROG QUALIFY timer is reset (step 869).

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. A security system for monitoring and controlling access to a protected area and having self-diagnostic capability, comprising:
   a plurality of sensor devices, each for sensing an intrusion event and providing a sensor activated signal when the event is detected;
   means for communicating alert signals;
   a controller for controlling the operation of said security system so that said system may be operated in an armed mode wherein said controller monitors said sensor devices and causes said communicating means to issue an alert signal in response to a sensor activated signal, or in a disarmed mode wherein said system is disabled from communicating alert signals, said controller comprising:
   (i) means for monitoring the state of each of said sensor devices;
   (ii) means responsive to a system arming signal when the system is in the disarmed mode for identifying any sensor device providing a sensor activated signal; and
   (iii) means for bypassing each of said identified sensor devices and placing the system in the armed mode wherein the state of said bypassed sensor devices does not prevent the system from being armed and wherein said bypassed sensor devices will not cause activation of said communicating means during said armed mode.

2. The security system of claim 1 wherein said sensor device identifying means comprises means for providing a visual signal indicative of said identified sensor device providing a sensor activated signal.

3. The system of claim 1 wherein said bypassing means of said controller automatically bypasses predetermined ones of said identified sensor devices without system user intervention.

4. The security system of claim 1 wherein said sensor device identifying means comprises means for generating a voice synthesized audio signal indicative of said identified sensor device.

5. The security system of claim 1 further comprising user-operated means for communicating with said controller, said user-operated communicating means comprising means for selectively providing a bypass signal to said controller indicating that selected ones of said identified sensor devices are to be bypassed.

6. The security system of claim 5 wherein said user-operated communicating means comprises a key pad accessible to a user for entering data to the system controller, and wherein said sensor device identifying means further comprises means for providing a visual identifying signal to a user indicative of the identified sensor providing a sensor device activated signal.

7. The security system of claim 1 wherein said controller further comprises means responsive to sensor activated signals and to user activation signals, said user activation signals for changing the system mode from the armed mode to the disarmed mode, for generating an indication signal that an unauthorized intrusion into said protected area has been attempted.

8. The security system of claim 7 wherein said indication signal comprises an audible signal, and said means for generating an indication signal further comprises means for providing a visual signal indicative of the particular intrusion point.

9. The security system of claim 7 wherein said indication signal comprises a visible indication signal identifying the particular intrusion point.

10. The security system of claim 1 wherein said means for generating alert signals comprises means for generating audible alert signals, and wherein said controller further comprises means for generating alert control signals which determine the duration of said audible alert signals during an alarm condition, and user programmed means activated during a system programming mode for receiving user-programmed duration signals which determine the duration of said audible alert signals during said alarm condition.

11. The security system of claim 10 further comprising a user-activated data input means for providing said duration signals to said controller during said programming mode.

12. The security system of claim 1 wherein said means for generating alert signals comprises means for generating audible alert sounds, and wherein said controller further comprises means for generating control signals for controlling said audible sound generating means to generate audible alert signals during an alarm signal cycle, and user programmable means activated during a system programming mode for receiving user-programmed code signals, said alert code signals capable of defining a distinctive user-personalized pattern of audible alert sounds corresponding to said code signals, and said controller is responsive to said code signals for generating user-personalized control signals in dependence on said user-programmed code signals, thereby causing said alert signal generating means to generate a user-personalized distinctive pattern of audible alert signals during said alarm cycle duration.

13. The security system of claim 12 wherein said user-personalized pattern of audible sounds takes the form of as distinctive pattern of audible "dots" and "dashes".

14. The security system of claim 12 wherein said means for generating audible alert signals comprises a siren device, and said audible sounds take the form of a user-personalized siren code made up of audible "dots" and "dashes."

15. The security system of claim 12 further comprising a user-activated data input means for providing said code signals to said controller during said programming mode.

16. The security system of claim 1 wherein at least one of said sensor devices is of the type wherein said sensor activated signal is either a first polarity output signal or a second polarity output signal, said sensor device providing an output signal of a particular one of said polarities as said sensor activated signal, and wherein said monitoring means of said controller is polarity programmable during a system programming mode to selectively recognize for said sensor device said particular polarity output signal as said sensor activated signal.

17. The security system of claim 16 further comprising means for putting said system in a system programming mode for sensor polarity programming, means for activating said sensor to simulate an intrusion event, and Wherein said controller further comprises means for reading the state of said sensor device output signal during said programming mode and programming means responsive to said state of said sensor device output signal for recording and recognizing said output state as said sensor activated signal.

18. The system of claim 1 further comprising audio signal means for generating a first audio signal indicative of the armed mode when the system is toggled from the disarmed mode and a second audio signal indicative of the disarmed mode when the system is toggled from the armed to the disarmed mode, and further comprising user programmable means operable during a system programming mode for selectively disabling said audio signal means, whereby said system may be selectively programmed to toggle between said armed and disarmed modes without providing said audio signals.

19. The system of claim 1 wherein said said protected area comprises the interior of a vehicle, and said vehicle further comprises a power door locking and unlocking system for locking the vehicle door or doors in response to a "door lock" signal and for unlocking the doors in response to a "door unlock" signal, and wherein said controller further comprises means for providing said "door lock" signals to said power locking and unlocking system in response to the toggling of the system from the disarmed mode to the armed mode, means for providing said "door unlock" signals in response to the toggling of the system from the armed mode to the disarmed mode, and programmable means for selecting the duration of said "door lock" and "door unlock" signals during a system programming mode to match the security system to the particular power door locking and unlocking system.

20. The security system of claim 19 further comprising installer-activated means for putting said system in a system programming mode for selection of said signal duration, and said means for providing said "door lock" signal comprises first means for generating said "door lock" signals having a first predetermined duration and second means for generating said "door lock" signals having a second predetermined duration, said means for providing said "door unlock" signals comprises first means for providing said "door unlock" signals having a first predetermined duration and second means for providing said "door unlock" signals having a second predetermined duration, and said programmable means comprises installer-activated switch for selecting at will either said first respective means or said second respective means.

21. The security system of claim 19 further comprising installer-activated switch for putting said system in a system programming mode for selection of said signal duration, and said programmable means comprises installer-activated switch for selecting a first signal duration or a second signal duration.

22. The security system of claim 21 wherein said first signal duration is about one second, and said second signal duration is about three seconds.

23. A vehicle security system for generating a user-personalized audible alert signal in the event an intrusion event is detected, comprising:
   at least one sensor device for sensing an intrusion event and providing a sensor activated signal when the event is detected;
   means for communicating audible alert signals for an alarm cycle duration in response to alert control signals;
   a controller for controlling the operation of said security system so that said system may be operated in an armed mode wherein said controller monitors said at least one sensor device and causes said communicating means to issue an alert signal in response to a sensor activated signal, or in a disarmed mode wherein said system is disabled from communicating alert signals, said controller comprising:
   (i) user programmable means activated during a system programming mode for receiving and storing user-programmable alert code signals, said alert code signals capable of defining a distinctive user-personalized pattern of audible alert signals corresponding to said alert code signals; and
   (ii) means responsive to said sensor activated signals for generating said alert control signals in dependence on said user-programmed alert code signals, thereby causing said alert communicating device to generate a distinctive pattern of user-personalized audible alert signals during said alarm cycle duration.

24. The security system of claim 23 wherein said user-personalized pattern of audible alert signals take the form of distinctive patterns of audible "dots" and "dashes."

25. The security system of claim 23 wherein said controller activates said alert communicating signals for a particular alarm period in response to a sensor activated signal, and said controller further comprises user programmed means activated during a system programming mode for receiving user-programmed siren duration signals for defining the duration of said alarm period.

26. The vehicle security system of claim 23 wherein said means for communicating audible alert signals comprises a siren device, and said audible sounds take the form of user-personalized audible siren code comprising audible "dots" and "dashes."

27. The vehicle security system of claim 23 further comprising a user-activated data input means for providing said alert code signals to said controller during said programming mode.

28. A security system for monitoring and controlling access to a vehicle, comprising:
   at least one sensor device for sensing an intrusion event and providing a sensor activated signal when the event is detected;
   means for communicating alert signals;
   a power source for supplying voltage at a predetermined level to said security system;
   means for monitoring the voltage level of said power source and generating a voltage error signal when said predetermined voltage level is not available to said system;
   a user-activated switch device for providing a switch signal when activated;
   a controller for controlling the operation of said security system so that said system may be operated in an armed mode wherein said controller monitors said sensor devices and causes said communicating means to issue an alert signal in response to a sensor activated signal, or in a disarmed mode wherein said system is disabled from communicating alert signals, said controller further comprising means responsive to receipt and termination of said error signal and to said switch signal for causing an alert signal to be communicated after receipt and termination of said error signal if said switch signal is not present upon termination of said error signal.

29. The vehicle security system of claim 28 wherein said vehicle comprises an ignition switch having at least "on" and "off" positions, and wherein said user-activated switch device comprises said ignition switch, whereby disconnection of said power supply from the system will result in communication of an alert signal upon reconnection of said power supply at said predetermined voltage level unless said ignition switch is in the "on" position.

30. A vehicle security system for monitoring and controlling access to a vehicle, comprising:
   at least one sensor device for sensing an intrusion event and providing a sensor activated signal when the event is detected, said sensor device being of the type wherein said sensor activated signal is either a first polarity output signal or a second polarity output signal, said sensor device providing an output signal of a particular one of said polarities as said sensor activated signal;
   means for communicating alert signals;
   a controller for controlling the operation of said security system so that said system may be operated in an armed mode wherein said controller monitors said sensor device and causes said communicating means to issue an alert signal in response to a sensor activated signal, or in a disarmed mode wherein said system is disabled from communicating alert signals, said controller comprising:
   (i) means for monitoring the state of each of said sensor devices; and
   (ii) means for polarity programming said monitoring means during a system programming mode to selectively recognize for said sensor device said particular polarity output signal as said sensor activated signal.

31. The vehicle security system of claim 30 wherein said sensor device is a door trigger for providing binary-valued output signals indicating the open/closed status of one or more vehicle doors, said sensor activated signal indicating the open status of said door.

32. The vehicle security system of claim 30 further comprising means for putting said system in a system programming mode for programming the polarity of said sensor device, means for activating said sensor to generate said sensor activated signal during said programming mode, and wherein said controller further comprises means for reading the state of said sensor device output signal during said programming mode and programming means responsive to said state of said sensor device output signal for recording and recognizing said output signal state as said sensor activated signal.

33. A security system for monitoring and controlling access to a protected area and having self-diagnostic capability, comprising:
   a plurality of sensor devices, each for sensing an intrusion event and providing a sensor activated signal when the event is detected;
   means for communicating alert signals;
   a controller for controlling the operation of said security system so that said system may be operated in an armed mode wherein said controller monitors said sensor devices and causes said communicating means to issue an alert signal in response to a sensor activated signal, or in a disarmed mode wherein said system is disabled from communicating alert signals, said controller comprising:
   (i) means for monitoring the state of each of said sensor devices;
   (ii) means responsive to a system arming signal when the system is in the disarmed mode for identifying any sensor providing a sensor activated signal;
   (iii) means for bypassing each of said identified sensor devices and placing the system in the armed mode wherein the state of said bypassed sensor devices does not prevent the system from being armed and wherein said bypassed sensor devices will not cause activation of said communicating means during said armed mode; and
   (iv) means responsive to sensor activated signals and to user activation signals for generating an indication signal that an unauthorized intrusion into said protected area has been attempted, said indication signal comprising an audio signal indicative of the particular intrusion point.

34. The security system of claim 33 wherein said means for generating an indication signal comprises a voice synthesizer for generating an audible voice message indicative of the particular intrusion point.

35. A security system for monitoring and controlling access to a protected area and having self-diagnostic capability, comprising:
   a plurality of sensor devices, each for sensing an intrusion event and providing a sensor activated signal when the event is detected;
   means for communicating alert signals;
   a controller for controlling the operation of said security system so that said system may be operated in an armed mode wherein said controller monitors said sensor devices and causes said communicating means to issue an alert signal in response to a sensor activated signal, or in a disarmed mode wherein said system is disabled from communicating alert signals, said controller comprising:
   (i) means for monitoring the state of each of said sensor devices;
   (ii) means responsive to a system arming signal when the system is in the disarmed mode for identifying any sensor providing a sensor activated signal; and
   (iii) means for bypassing each of said identified sensor devices and placing the system in the armed mode wherein the state of said bypassed sensor devices does not prevent the system from being armed and wherein said bypassed sensor devices will not cause activation of said communicating means during said armed mode;
   a portable transmitter device for transmitting information encoded RF signals;
   a receiver device mounted in said protected area for receiving and decoding said information-encoded RF signals and providing decoded signals indicative of said encoded information;
   first user-activated means located within said protected area for manually entering a predetermined user authorization code into the system; and
   second user-activated means for selecting a first disarming mode or a second disarming mode during a system programming mode; and
   wherein said controller further comprises:
   (i) a first disarming means responsive to said decoded signals for toggling the system mode from the armed mode to the disarmed mode;
   (ii) a second disarming means responsive to said decoded signals and said user authorization code for toggling the system mode from its present armed mode or disarmed mode to the other mode in dependence upon receipt of said decoded signals and subsequent receipt of said user authorization code within a predetermined time interval; and
   (iii) means for selecting either said first or second disarming means in dependence on said selected disarming mode such that said first disarming means is activated while said first disarming mode is selected and said second disarming means is activated while said second disarming mode is selected.

36. A vehicle security system, comprising:
   a plurality of sensor devices, each for sensing an intrusion event involving the vehicle and providing a sensor activated signal when the event is detected;
   means for communicating alert signals;
   power supply means for supplying electrical power to said system;
   means for detecting the disabling of power to said system;
   a user-activated switch device for providing a switch signal to said controller;
   a controller for controlling the operation of said security system so that said system may be operated in an armed mode wherein said controller monitors said sensor devices and causes said communicating means to issue an alert signal in response to a sensor activated signal, or in a disarmed mode wherein said system is disabled from communicating alert signals, said controller comprising:
   (i) means for monitoring the state of each of said sensor devices;
   (ii) means responsive to a system arming signal when the system is in the disarmed mode for identifying sensor devices providing a sensor activated signal;
   (iii) means for bypassing identified sensor devices and placing the system in the armed mode wherein the state of said bypassed sensor devices does not prevent the system from being armed and wherein said bypassed sensor devices will not cause activation of said communicating means during said armed mode; and
   (iv) means responsive to said detecting means and to said switch signal for causing said alert signal to be communicated when power is restored to said system after said disabling of power unless said switch signal is present upon restoration of power to said system, whereby disabling of power to said system will result in communication of an alert signal upon restoration of power unless said switch device is activated to provide said switch signal to said controller, and no alert signal will be generated upon restoration of power if said switch device is activated.

37. A vehicle security system, comprising:
a plurality of sensor devices, each for sensing an intrusion event involving the vehicle and providing a sensor activated signal when the event is detected;
means for communicating alert signals;
a controller for controlling the operation of said security system so that said system may be operated in an armed mode wherein said controller monitors said sensor devices and causes said communicating means to issue an alert signal in response to a sensor activated signal, or in a disarmed mode wherein said system is disabled from communicating alert signals, said controller comprising:
(i) means for monitoring the state of each of said sensor devices;
(ii) means responsive to a system arming signal when the system is in the disarmed mode for identifying sensor devices providing a sensor activated signal, said means comprising a light source and means for activating said light source to provide a light flash code indicative of said identified sensor providing said sensor activated signal; and
(iii) means for bypassing identified sensor devices and placing the system in the armed mode wherein the state of said bypassed sensor devices does not prevent the system from being armed and wherein said bypassed sensor devices will not cause activation of said communicating means during said armed mode.

38. A security system for monitoring and controlling access to a protected area and having self-diagnostic capability, comprising:
a plurality of sensor devices, each for sensing an intrusion event and providing a sensor activated signal when the event is detected;
means for communicating alert signals;
power supply means for supplying power to said system;
means for detecting the disabling of said power to said system and generating an error signal when said power disabling is detected;
a user-activated switch device for providing a switch signal to said controller;
a controller for controlling the operation of said security system so that said system may be operated in an armed mode wherein said controller monitors said sensor devices and causes said communicating means to issue an alert signal in response to a sensor activated signal, or in a disarmed mode wherein said system is disabled from communicating alert signals, said controller comprising:
(i) means for monitoring the state of each of said sensor devices;
(ii) means responsive to a system arming signal when the system is in the disarmed mode for identifying any sensor device providing a sensor activated signal;
(iii) means for bypassing each of said identified sensor devices and placing the system in the armed mode wherein the state of said bypassed sensor devices does not prevent the system from being armed and wherein said bypassed sensor devices will not cause activation of said communicating means during said armed mode; and
(iv) means responsive to said error signal and to said switch signal for causing said alert signal to be communicated when power is restored to said system after said disabling of power unless said switch signal is present upon restoration of power to said system, whereby disabling of power to said system will result in communication of an alert signal upon restoration of power unless said switch device is activated to provide said switch signal to said controller.

39. The security system of claim 38 wherein said protected area comprises a vehicle having an engine and an ignition switch having at least "on" and "off" positions, and wherein said user-activated switch device comprises said ignition switch, whereby disconnection of said power supply from the system will result in communication of an alert signal upon reconnection of said power supply at said predetermined voltage level unless said ignition switch is in the "on" position.

40. A multi-function vehicle security system, comprising:
at least one sensor device for sensing an intrusion event and providing a sensor activated signal when an event is detected;
means for communicating alert signals;
a portable transmitter device for transmitting information-encoded RF signals;
a receiver device mounted in said vehicle for receiving and decoding said information-encoded RF signals and providing decoded signals indicative of said encoded information;
user-activated means mounted within said vehicle for manually entering a predetermined user authorization code into the system;
user-actuated means for selecting a first disarming mode or a second disarming mode during a system programming mode;
a controller for controlling the operation of said security system so that said system may be operated in an armed mode wherein said controller monitors said at least one sensor device and causes said communicating means to issue an alert signal in response to a sensor activated signal, or in a disarmed mode wherein said system is disabled from communicating alert signals, said controller comprising:
(i) a first disarming means responsive to said decoded signals for toggling the system mode from the armed mode to the disarmed mode;
(ii) a second disarming means responsive to said decoded signals and said user authorization code for toggling the system mode from its present armed or disarmed mode to the other mode in dependence upon receipt of said decoded signals and subsequent receipt of said user authorization code within a predetermined time interval; and
(iii) means for selecting either said first or second disarming means in dependence on said selected disarming mode such that said first disarming means is activated while said first disarming mode is selected and said second disarming means is activated while said second disarming mode is selected.

41. The vehicle security system of claim 40 wherein said user-activated means mounted within said vehicle comprises a keypad having a plurality of switch keys mounted thereon.

42. The vehicle security system of claim 40 wherein said user-activated means for selecting a first disarming mode or a second disarming mode during a system programming mode comprises a user-activated data input means for providing electrical data signals to said controller indicating entry of a programming mode in order to select either said first or said second disarming mode, and said means for selecting said either first or second disarming means is responsive to said electrical data signals to perform said selection during said programming mode.

43. A security system for monitoring and controlling access to a protected area and having self-diagnostic capability, comprising:
 a plurality of sensor devices, each for sensing an intrusion event and providing a sensor activated signal when the event is detected;
 means for communicating alert signals;
 a controller for controlling the operation of said security system so that said system may be operated in an armed mode wherein said controller monitors said sensor devices and causes said communicating means to issue an alert signal in response to a sensor activated signal, or in a disarmed mode wherein said system is disabled from communicating alert signals, said controller comprising:
  (i) means for monitoring the state of each of said sensor devices;
  (ii) means responsive to a system arming signal when the system is in the disarmed mode for identifying any sensor device providing a sensor activated signal, said sensor identifying means comprising means for providing a visual signal indicative of said identified sensor device providing a sensor activated signal, comprising a light source and means for activating the light source to provide a light flash code indicative of said identified sensor device; and
  (iii) means for bypassing each of said identified sensor devices and placing the system in the armed mode wherein the state of said bypassed sensor devices does not prevent the system from being armed and wherein said bypassed sensor devices will not cause activation of said communicating means during said armed mode.

44. A vehicle security system for monitoring and controlling access to a vehicle, comprising:
 at least one sensor device for sensing an intrusion event and providing a sensor activated signal when the event is detected;
 means for communicating alert signals;
 a power door locking and unlocking system for locking the vehicle door or doors in response to a "door lock" signal and for unlocking the doors in response to a "door unlock" signal;
 a controller for controlling the operation of said security system so that said system may be operated in an armed mode wherein said controller monitors said sensor devices and causes said communicating means to issue an alert signal in response to a sensor activated signal, or in a disarmed mode wherein said system is disabled from communicating alert signals, said controller comprising:
  (i) means for providing said "door lock" signals to said power locking and unlocking system in response to the arming of the system;
  (ii) means for providing said "door unlock" signals in response to the disarming of the system;
  (iii) programmable means for selecting the duration of said "door lock" and "door unlock" signals during a system programming mode to match the security system to the particular power door locking and unlocking system of the vehicle.

45. The vehicle security system of claim 44 further comprising installer-activated means for putting said system in a system programming mode for selection of said signal duration, and said programmable means comprises installer-activated means for selecting a first signal duration or a second signal duration.

46. The vehicle security of claim 45 wherein said first signal duration is about one second, and said second signal duration is about three seconds.

47. The vehicle security system of claim 44 further comprising:
 a portable transmitter device for transmitting information coded RF signals;
 a receiver device mounted in said vehicle for receiving and decoding said information-encoded RF signals and providing decoded signals indicative of said encoded information; and
  (i) arming means responsive to said decoded signals when the system is in the disarmed mode for placing the system in the armed mode; and
  (ii) disarming means responsive to said decoded signals when the system is in the armed mode for placing the system in the armed mode.

48. A vehicle security system, comprising:
 at least one sensor device for sensing an intrusion event and providing a sensor activated signal when the event is detected;
 means for communicating alert signals in response to alert control signals;
 a controller for controlling the operation of said security system so that said system may be operated in an armed mode wherein said controller monitors said sensor devices and causes said communicating means to issue an alert signal of a predetermined duration in response to a sensor activated signal, or in a disarmed mode wherein said system is disabled from communicating alert signals, said controller comprising:
  means for generating alert control signals indicative of said predetermined duration during an alarm condition, and user programmed means activated during a system programming mode for receiving user-programmed alert duration signals for defining said alert control signals to determine said duration of said alert signals during said alarm condition.

49. A security system for monitoring and controlling access to a vehicle, comprising:
 at least one sensor device for sensing an intrusion event and providing a sensor activated signal when the event is detected;
 means for communicating alert signals;
 a power source for supplying voltage at a predetermined level to said security system;
 means for providing a reset signal upon application of power to said system;
 a user-activated switch device for providing a switch signal when activated;
 a controller for controlling the operation of said security system so that said system may be operated in an armed mode wherein said controller monitors said at least one sensor devices and causes said communicating means to issue an alert signal in response to a sensor activated signal, or in a disarmed mode wherein said system is disabled from communicating alert signals, said controller further comprising means responsive to receipt of said reset signal and to said switch signal for causing an alert signal to be communicated after receipt of said reset signal if said switch signal is not present upon receipt of said reset signal.

50. The vehicle security system of claim 49 wherein said vehicle includes an ignition switch, and said switch device comprises said vehicle ignition switch, whereby an alert signal will be communicated upon receipt of a reset signal unless an ignition switch signal is present.

51. A vehicle security system, comprising:
a plurality of sensor devices, each for sensing an intrusion event involving the vehicle and providing a sensor activated signal when the event is detected;
means for communicating alert signals;
a controller for controlling the operation of said security system so that said system may be operated in an armed mode wherein said controller monitors said sensor devices and causes said communicating means to issue an alert signal in response to a sensor activated signal, or in a disarmed mode wherein said system is disabled from communicating alert signals, said controller comprising:
(i) means for monitoring the state of each of said sensor devices;
(ii) means responsive to a system arming signal when the system is in the disarmed mode for identifying sensor devices providing a sensor activated signal; and
(iii) means for bypassing identified sensor devices and placing the system in the armed mode wherein the state of said bypassed sensor devices does not prevent the system from being armed and wherein said bypassed sensor devices will not cause activation of said communicating means during said armed mode.

52. The security system of claim 51 wherein said sensor device identifying means further comprises means for providing a visual signal indicative of said identified sensor device providing a sensor activated signal.

53. The system of claim 51 wherein said bypassing means of said controller automatically bypasses each of said identified sensor devices without system user intervention.

54. The security system of claim 51 wherein said sensor device identifying means comprises means for generating a voice synthesized audio signal indicative of said identified sensor device.

55. The security system of claim 51 further comprising user-operated means for communicating with said controller, said user-operated communicating means comprising means for selectively providing a bypass signal to said controller indicating that selected ones of said identified sensor devices are to be bypassed.

56. The security system of claim 55 wherein said user-operated communicating means comprises a key pad accessible to a user for entering data to the system controller, and wherein said sensor device identifying means further comprises means for providing a visual identifying signal to a user indicative of the identified sensor device providing a sensor activated signal.

57. The security system of claim 51 wherein said controller further comprises means responsive to sensor activated signals and to a system disarming signal changing the system mode from the armed mode to the disarmed mode, said means for generating an indication signal that an unauthorized intrusion into said protected area has been attempted.

58. The security system of claim 57 wherein said indication signal comprises an audible signal.

59. The security system of claim 57 wherein said means for generating an indication signal further comprises means for generating a visible indication signal identifying the particular intrusion point.

60. The security system of claim 57 wherein said means for generating an indication signal comprises a voice synthesizer for generating an audible voice message.

61. The security system of claim 51 wherein said means for generating alert signals comprises means for generating audible alert sounds, and wherein said controller further comprises means for generating control signals for controlling said audible sound generating means to generate audible alert sounds during an alarm signal cycle, and user programmable means activated during a system programming mode for receiving user-programmed code signals, said alert code signals capable of defining a distinctive user-personalized pattern of audible alert sounds corresponding to said code signals, and said controller is responsive to said code signals for generating user-personalized control signals in dependence on said user-programmed code signals, thereby causing said alert signal generating means to generate a distinctive pattern of user-personalized audible alert signals during said alarm cycle duration.

62. The security system of claim 61 wherein said user-personalized pattern of audible sounds take the form of distinctive pattern of audible "dots" and "dashes."

63. The security system of claim 51 wherein said means for generating alert signals comprises means for generating audible alert signals, and wherein said controller further comprises means for generating alert control signals which determine the duration of said audible alert signals during an alarm condition, and user programmed means activated during a system programming mode for receiving user-programmed duration signals which determine the duration of said audible alert signals during said alarm condition.

64. The system of claim 51 further comprising audio signal means for generating a first audio signal indicative of the armed mode when the system is toggled from the disarmed mode and a second audio signal indicative of the disarmed mode when the system is toggled from the armed to the disarmed mode, and further comprising user programmable means operable during a system programming mode for selectively disabling said audio signal means, whereby said system may be selectively programmed to toggle between said armed and disarmed modes without providing said audio signals.

65. The security system of claim 51 wherein at least one of said sensor devices comprises means for providing an output signal state having respective high and low voltage states, and wherein a particular one of said output signal states represents said sensor activated signal for said sensor device, said system further comprising means for causing said sensor device to generate said sensor activated signal during a system programming mode, and wherein said monitoring means of said controller is programmable during said system mode to recognize said particular output signal state as said sensor activated signal.

66. The security system of claim 63 wherein said vehicle includes one or more vehicle doors, and said at least one of said sensor devices comprises a door trigger for indicating the open/closed status of at least one vehicle door.

67. The system of claim 51 wherein said vehicle further comprises a power door locking and unlocking system for locking the vehicle door or doors in response to a "door lock" signal and for unlocking the doors in response to a "door unlock" signal, and wherein said controller further comprises means for providing said "door lock" signals to said power locking and unlocking system in response to the toggling of the system from the disarmed mode to the armed mode, means for providing said "door unlock" signals in response to the toggling of the system from the armed mode to the disarmed mode, and programmable means for selecting the duration of said "door lock" and "door unlock" signals during a system programming mode to match the security system to the particular power door locking and unlocking system.

* * * * *